(12) United States Patent
Yang et al.

(10) Patent No.: US 12,229,396 B2
(45) Date of Patent: *Feb. 18, 2025

(54) WEATHER USER INTERFACE

(71) Applicant: Apple Inc., Cupertino, CA (US)

(72) Inventors: Lawrence Y. Yang, Bellevue, WA (US); Wan Si Wan, Sunnyvale, CA (US); Alan C. Dye, San Francisco, CA (US); Christopher Patrick Foss, San Francisco, CA (US); Kevin Lynch, Woodside, CA (US); Brian Schmitt, Venice, CA (US); Christopher Wilson, Sonoma, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,825

(22) Filed: Mar. 1, 2024

(65) Prior Publication Data

US 2024/0201838 A1 Jun. 20, 2024

Related U.S. Application Data

(63) Continuation of application No. 17/987,731, filed on Nov. 15, 2022, now Pat. No. 11,922,004, which is a
(Continued)

(51) Int. Cl.
*G06F 3/048* (2013.01)
*G06F 3/01* (2006.01)
(Continued)

(52) U.S. Cl.
CPC ............ *G06F 3/0485* (2013.01); *G06F 3/016* (2013.01); *G06F 3/0362* (2013.01);
(Continued)

(58) Field of Classification Search
CPC ...... G06F 3/0485; G06F 3/016; G06F 3/0362; G06F 3/04847; G06F 3/0488;
(Continued)

(56) References Cited

U.S. PATENT DOCUMENTS

| 872,200 A | 11/1907 | Rowe |
| 3,148,500 A | 9/1964 | Thomas |

(Continued)

FOREIGN PATENT DOCUMENTS

| AU | 2010249319 A1 | 6/2012 |
| AU | 2015101019 A4 | 9/2015 |

(Continued)

OTHER PUBLICATIONS

Advisory Action received for U.S. Appl. No. 14/841,606, mailed on Feb. 28, 2019, 3 pages.

(Continued)

*Primary Examiner* — Mahelet Shiberou
(74) *Attorney, Agent, or Firm* — DLA Piper LLP (US)

(57) ABSTRACT

Reduced-size user interfaces for providing weather information are disclosed. At an electronic device with a touch-sensitive display, indications of a location and a temperature at the location may be displayed. In some examples, a user may provide input through a touch on the touch-sensitive display and/or through a rotation of a rotatable input mechanism to display additional weather information, such as weather information for another location, another temperature, another time, and so forth. In some examples, the device may obtain data representing an upcoming activity, determine whether the activity is to begin within a threshold amount of time, and display weather information based on the upcoming activity. In some examples, the device may display an affordance at a position to indicate the time of day for which a weather condition is provided.

24 Claims, 38 Drawing Sheets

Related U.S. Application Data continuation of application No. 17/341,839, filed on Jun. 8, 2021, now Pat. No. 11,550,465, which is a continuation of application No. 16/659,507, filed on Oct. 21, 2019, now Pat. No. 11,042,281, which is a continuation of application No. 14/821,667, filed on Aug. 7, 2015, now Pat. No. 10,452,253.

(60) Provisional application No. 62/129,890, filed on Mar. 8, 2015, provisional application No. 62/038,079, filed on Aug. 15, 2014.

(51) Int. Cl.
| | | |
|---|---|---|
| *G06F 3/0362* | (2013.01) | |
| *G06F 3/04847* | (2022.01) | |
| *G06F 3/0485* | (2022.01) | |
| *G06F 3/0488* | (2022.01) | |
| *G06F 3/04883* | (2022.01) | |
| *H04M 1/72451* | (2021.01) | |
| *H04M 1/72454* | (2021.01) | |
| *H04M 1/72457* | (2021.01) | |

(52) U.S. Cl.
CPC ........ *G06F 3/04847* (2013.01); *G06F 3/0488* (2013.01); *G06F 3/04883* (2013.01); *H04M 1/72451* (2021.01); *H04M 1/72454* (2021.01); *H04M 1/72457* (2021.01)

(58) Field of Classification Search
CPC .......... G06F 3/04883; H04M 1/72457; H04M 1/72451; H04M 1/72454
See application file for complete search history.

(56) References Cited

U.S. PATENT DOCUMENTS

| | | |
|---|---|---|
| 4,205,628 A | 6/1980 | Null |
| 4,355,380 A | 10/1982 | Huguenin et al. |
| 4,597,674 A | 7/1986 | Thompson, III |
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,455,808 A | 10/1995 | Grupp et al. |
| 5,500,835 A | 3/1996 | Born |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,297,795 B1 | 10/2001 | Kato et al. |
| 6,353,449 B1 | 3/2002 | Gregg et al. |
| 6,359,839 B1 | 3/2002 | Schenk et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,690,623 B1 | 2/2004 | Maano |
| 6,728,533 B2 | 4/2004 | Ishii et al. |
| 6,806,893 B1 | 10/2004 | Kolawa et al. |
| 6,809,724 B1 | 10/2004 | Shiraishi et al. |
| 6,871,076 B2 | 3/2005 | Samn et al. |
| 7,036,025 B2 | 4/2006 | Hunter |
| 7,113,809 B2 | 9/2006 | Noesgaard et al. |
| 7,203,380 B2 | 4/2007 | Chiu et al. |
| 7,257,254 B2 | 8/2007 | Tunney et al. |
| 7,302,650 B1 | 11/2007 | Allyn et al. |
| 7,378,954 B2 | 5/2008 | Wendt et al. |
| 7,479,949 B2 | 1/2009 | Jobs et al. |
| 7,515,509 B2 | 4/2009 | Klein et al. |
| 7,515,903 B1 | 4/2009 | Cast |
| 7,619,615 B1 | 11/2009 | Donoghue et al. |
| 7,637,204 B2 | 12/2009 | Sumser et al. |
| 7,716,057 B2 | 5/2010 | Horvitz |
| 7,751,285 B1 | 7/2010 | Cain et al. |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 7,971,153 B2 | 6/2011 | Satoh |
| 8,041,968 B2 | 10/2011 | Tupman |
| 8,046,617 B2 | 10/2011 | Fleck et al. |
| 8,238,876 B2 | 8/2012 | Teng et al. |
| 8,245,143 B2 | 8/2012 | Yach et al. |
| 8,364,855 B2 | 1/2013 | James et al. |
| 8,405,663 B2 | 3/2013 | Wikkerink et al. |
| 8,462,997 B2 | 6/2013 | Soldan et al. |
| 8,584,031 B2 | 11/2013 | Moore et al. |
| 8,595,649 B2 | 11/2013 | Sherrard et al. |
| 8,635,475 B2 | 1/2014 | Lin et al. |
| 8,725,842 B1 | 5/2014 | Al-Nasser |
| 8,732,609 B1 | 5/2014 | Bayersdorfer et al. |
| 8,768,648 B2 | 7/2014 | Panther et al. |
| 8,775,844 B1 | 7/2014 | Peterson |
| 8,847,903 B2 | 9/2014 | Stokes et al. |
| 8,854,925 B1 | 10/2014 | Lee et al. |
| 8,884,874 B1 | 11/2014 | Kim et al. |
| 8,924,894 B1 | 12/2014 | Yaksick et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 8,996,639 B1 | 3/2015 | Faaborg et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,171,268 B1 | 10/2015 | Penilla et al. |
| 9,173,052 B2 | 10/2015 | Hauser et al. |
| 9,197,738 B2 | 11/2015 | Peev et al. |
| 9,237,855 B2 | 1/2016 | Hong et al. |
| 9,239,605 B1 | 1/2016 | Nanda et al. |
| 9,244,562 B1 | 1/2016 | Moscovich et al. |
| 9,259,615 B2 | 2/2016 | Weast et al. |
| 9,292,310 B2 | 3/2016 | Chaudhri et al. |
| 9,354,768 B2 | 5/2016 | Oh et al. |
| 9,369,537 B1 | 6/2016 | Mathew et al. |
| 9,377,762 B2 | 6/2016 | Hoobler et al. |
| 9,436,269 B2 | 9/2016 | Yang |
| 9,448,685 B1 | 9/2016 | Somin et al. |
| 9,459,781 B2 | 10/2016 | Kocienda et al. |
| 9,542,070 B2 | 1/2017 | Xu et al. |
| 9,547,425 B2 | 1/2017 | Kocienda et al. |
| 9,557,806 B2 | 1/2017 | Väyrynen |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,606,695 B2 | 3/2017 | Matas |
| 9,625,987 B1 | 4/2017 | Lapenna et al. |
| 9,753,436 B2 | 9/2017 | Ely et al. |
| 9,756,172 B2 | 9/2017 | Piemonte et al. |
| 9,794,397 B2 | 10/2017 | Min et al. |
| 9,939,872 B2 | 4/2018 | Graham et al. |
| 10,019,599 B1 | 7/2018 | Moran et al. |
| 10,062,133 B1 | 8/2018 | Mishra et al. |
| 10,268,432 B2 | 4/2019 | Kyung |
| 10,282,078 B2 | 5/2019 | Choi |

(56) References Cited

U.S. PATENT DOCUMENTS

| | | |
|---|---|---|
| 10,304,347 B2 | 5/2019 | Wilson et al. |
| 10,317,977 B2 | 6/2019 | Yang |
| 10,356,070 B2 | 7/2019 | Cha et al. |
| 10,459,887 B1 | 10/2019 | Dvortsov et al. |
| 10,489,508 B2 | 11/2019 | Zhai et al. |
| 10,620,590 B1 | 4/2020 | Guzman et al. |
| 10,643,246 B1 | 5/2020 | Suprasadachandran Pillai |
| 10,684,592 B2 | 6/2020 | Chang et al. |
| 10,721,711 B2 | 7/2020 | Kirov et al. |
| 10,761,702 B2 | 9/2020 | Block et al. |
| 10,788,797 B1 | 9/2020 | Guzman et al. |
| 10,807,005 B2 | 10/2020 | Dugan et al. |
| 10,817,981 B1 | 10/2020 | Belkin |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,009,833 B2 | 5/2021 | Essery |
| 11,023,090 B2 | 6/2021 | Xu et al. |
| 11,050,873 B2 | 6/2021 | Kim et al. |
| 11,061,372 B1 | 7/2021 | Chen et al. |
| 11,435,887 B1 | 9/2022 | Mirho et al. |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0099452 A1 | 7/2002 | Kawai |
| 2002/0131331 A1 | 9/2002 | Molander et al. |
| 2003/0002391 A1 | 1/2003 | Biggs et al. |
| 2003/0027621 A1 | 2/2003 | Libby et al. |
| 2003/0067497 A1 | 4/2003 | Pichon et al. |
| 2003/0074647 A1 | 4/2003 | Andrew et al. |
| 2003/0107603 A1 | 6/2003 | Clapper |
| 2003/0135769 A1 | 7/2003 | Loughran |
| 2003/0140309 A1 | 7/2003 | Saito et al. |
| 2003/0164847 A1 | 9/2003 | Zaima et al. |
| 2003/0169306 A1 | 9/2003 | Makipaa et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0047244 A1 | 3/2004 | Iino et al. |
| 2004/0066710 A1 | 4/2004 | Yuen et al. |
| 2004/0075699 A1 | 4/2004 | Franchi et al. |
| 2004/0075700 A1 | 4/2004 | Liu et al. |
| 2004/0083474 A1 | 4/2004 | McKinlay et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear et al. |
| 2005/0124389 A1 | 6/2005 | Yang |
| 2005/0125744 A1 | 6/2005 | Hubbard et al. |
| 2005/0139852 A1 | 6/2005 | Chen et al. |
| 2005/0156873 A1 | 7/2005 | Walter et al. |
| 2005/0188856 A1 | 9/2005 | Sumser et al. |
| 2005/0190653 A1 | 9/2005 | Chen |
| 2005/0195173 A1 | 9/2005 | McKay |
| 2005/0198319 A1 | 9/2005 | Chan et al. |
| 2005/0200611 A1 | 9/2005 | Goto et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0020904 A1 | 1/2006 | Aaltonen et al. |
| 2006/0035628 A1 | 2/2006 | Miller et al. |
| 2006/0035632 A1 | 2/2006 | Sorvari et al. |
| 2006/0055700 A1 | 3/2006 | Niles et al. |
| 2006/0085765 A1 | 4/2006 | Peterson et al. |
| 2006/0087502 A1 | 4/2006 | Karidis et al. |
| 2006/0092770 A1 | 5/2006 | Demas |
| 2006/0123362 A1 | 6/2006 | Keely |
| 2006/0166708 A1 | 7/2006 | Kim et al. |
| 2006/0214935 A1 | 9/2006 | Boyd et al. |
| 2006/0239640 A1 | 10/2006 | Watanabe et al. |
| 2006/0277469 A1 | 12/2006 | Chaudhri et al. |
| 2007/0004451 A1 | 1/2007 | C. Anderson |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0055947 A1 | 3/2007 | Ostojic et al. |
| 2007/0057775 A1 | 3/2007 | O'Reilly et al. |
| 2007/0082707 A1 | 4/2007 | Flynt et al. |
| 2007/0094330 A1 | 4/2007 | Russell et al. |
| 2007/0101279 A1 | 5/2007 | Chaudhri et al. |
| 2007/0113181 A1 | 5/2007 | Blattner et al. |
| 2007/0146344 A1 | 6/2007 | Martin et al. |
| 2007/0162872 A1 | 7/2007 | Hong et al. |
| 2007/0192718 A1 | 8/2007 | Voorhees et al. |
| 2007/0211042 A1 | 9/2007 | Kim et al. |
| 2007/0213955 A1 | 9/2007 | Ishida et al. |
| 2007/0226653 A1 | 9/2007 | Moore et al. |
| 2007/0236475 A1 | 10/2007 | Wherry |
| 2007/0239754 A1 | 10/2007 | Schnitman et al. |
| 2007/0250772 A1 | 10/2007 | Milosevski |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0005599 A1 | 1/2008 | Theocharous et al. |
| 2008/0046839 A1 | 2/2008 | Mehra et al. |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0098031 A1 | 4/2008 | Ducharme |
| 2008/0127268 A1 | 5/2008 | Bergeron et al. |
| 2008/0130421 A1 | 6/2008 | Akaiwa et al. |
| 2008/0143729 A1 | 6/2008 | Wyatt et al. |
| 2008/0150959 A1 | 6/2008 | Marui et al. |
| 2008/0151700 A1 | 6/2008 | Inoue et al. |
| 2008/0155428 A1 | 6/2008 | Lee |
| 2008/0167834 A1 | 7/2008 | Herz et al. |
| 2008/0168396 A1 | 7/2008 | Matas et al. |
| 2008/0174606 A1 | 7/2008 | Rengarajan et al. |
| 2008/0186808 A1 | 8/2008 | Lee |
| 2008/0192021 A1 | 8/2008 | Lim et al. |
| 2008/0195961 A1 | 8/2008 | Bae et al. |
| 2008/0201438 A1 | 8/2008 | Mandre et al. |
| 2008/0201647 A1 | 8/2008 | Lagerstedt et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0270934 A1 | 10/2008 | Firebaugh et al. |
| 2009/0005882 A1 | 1/2009 | Boyer et al. |
| 2009/0012988 A1 | 1/2009 | Brown |
| 2009/0016168 A1 | 1/2009 | Smith |
| 2009/0016492 A1 | 1/2009 | Tsuchiya |
| 2009/0017800 A1 | 1/2009 | Middleton |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0068984 A1 | 3/2009 | Burnett |
| 2009/0070675 A1 | 3/2009 | Li |
| 2009/0077497 A1 | 3/2009 | Cho et al. |
| 2009/0100342 A1 | 4/2009 | Jakobson et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0198581 A1 | 8/2009 | Lidestri |
| 2009/0199130 A1 | 8/2009 | Tsern et al. |
| 2009/0231356 A1 | 9/2009 | Barnes et al. |
| 2009/0249247 A1 | 10/2009 | Tseng et al. |
| 2009/0254624 A1 | 10/2009 | Baudin et al. |

(56) References Cited

U.S. PATENT DOCUMENTS

| | | |
|---|---|---|
| 2009/0259958 A1 | 10/2009 | Ban |
| 2009/0262088 A1 | 10/2009 | Moll-Carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2010/0015774 A1 | 1/2010 | Shimamune et al. |
| 2010/0016771 A1 | 1/2010 | Jardine et al. |
| 2010/0026640 A1 | 2/2010 | Kim et al. |
| 2010/0060586 A1 | 3/2010 | Pisula et al. |
| 2010/0062905 A1 | 3/2010 | Rottler et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0088597 A1 | 4/2010 | Shin et al. |
| 2010/0100841 A1 | 4/2010 | Shin et al. |
| 2010/0110082 A1 | 5/2010 | Myrick et al. |
| 2010/0123724 A1 | 5/2010 | Moore et al. |
| 2010/0124152 A1 | 5/2010 | Lee |
| 2010/0141606 A1 | 6/2010 | Bae et al. |
| 2010/0146437 A1 | 6/2010 | Woodcock et al. |
| 2010/0146463 A1 | 6/2010 | Cho et al. |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0205563 A1 | 8/2010 | Haapsaari et al. |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0248688 A1 | 9/2010 | Teng et al. |
| 2010/0251176 A1 | 9/2010 | Fong et al. |
| 2010/0257469 A1 | 10/2010 | Kim et al. |
| 2010/0281374 A1 | 11/2010 | Schulz et al. |
| 2010/0289723 A1 | 11/2010 | London |
| 2010/0295789 A1 | 11/2010 | Shin et al. |
| 2010/0309149 A1 | 12/2010 | Blumenberg et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0016425 A1 | 1/2011 | Homburg et al. |
| 2011/0018695 A1 | 1/2011 | Bells et al. |
| 2011/0022294 A1 | 1/2011 | Apley |
| 2011/0025719 A1 | 2/2011 | Yanase et al. |
| 2011/0029870 A1 | 2/2011 | May et al. |
| 2011/0047014 A1 | 2/2011 | De |
| 2011/0061010 A1 | 3/2011 | Wasko et al. |
| 2011/0070924 A1 | 3/2011 | Kim et al. |
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0115721 A1 | 5/2011 | Li et al. |
| 2011/0119610 A1 | 5/2011 | Hackborn et al. |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahlakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202834 A1 | 8/2011 | Mandryk et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0248992 A1 | 10/2011 | Van et al. |
| 2011/0256848 A1 | 10/2011 | Bok et al. |
| 2011/0261079 A1 | 10/2011 | Ingrassia et al. |
| 2011/0265002 A1 | 10/2011 | Hong et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0013552 A1 | 1/2012 | Ahn |
| 2012/0017180 A1 | 1/2012 | Flik et al. |
| 2012/0026110 A1 | 2/2012 | Yamano et al. |
| 2012/0028707 A1 | 2/2012 | Raitt et al. |
| 2012/0036220 A1 | 2/2012 | Dare et al. |
| 2012/0047447 A1 | 2/2012 | Haq |
| 2012/0059787 A1 | 3/2012 | Brown et al. |
| 2012/0062470 A1 | 3/2012 | Chang et al. |
| 2012/0077554 A1 | 3/2012 | Ahn et al. |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0110438 A1 | 5/2012 | Peraza et al. |
| 2012/0113762 A1 | 5/2012 | Frost |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0150327 A1 | 6/2012 | Altman et al. |
| 2012/0154156 A1 | 6/2012 | Kuntzel |
| 2012/0154293 A1 | 6/2012 | Hinckley et al. |
| 2012/0159380 A1 | 6/2012 | Kocienda et al. |
| 2012/0167008 A1 | 6/2012 | Zaman et al. |
| 2012/0182226 A1 | 7/2012 | Tuli |
| 2012/0197523 A1 | 8/2012 | Kirsch |
| 2012/0210263 A1 | 8/2012 | Perry et al. |
| 2012/0212495 A1 | 8/2012 | Butcher et al. |
| 2012/0218201 A1 | 8/2012 | Tamas et al. |
| 2012/0223935 A1 | 9/2012 | Renwick et al. |
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0320081 A1 | 12/2012 | Kim et al. |
| 2012/0323933 A1 | 12/2012 | He et al. |
| 2012/0324390 A1 | 12/2012 | Tao et al. |
| 2013/0007665 A1 | 1/2013 | Chaudhri et al. |
| 2013/0014019 A1 | 1/2013 | Kim et al. |
| 2013/0019175 A1 | 1/2013 | Kotler et al. |
| 2013/0021236 A1 | 1/2013 | Bender et al. |
| 2013/0024781 A1 | 1/2013 | Douillet et al. |
| 2013/0024802 A1 | 1/2013 | Zeng et al. |
| 2013/0030892 A1 | 1/2013 | Liu et al. |
| 2013/0044072 A1 | 2/2013 | Kobayashi et al. |
| 2013/0044080 A1 | 2/2013 | Chiang |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0067391 A1 | 3/2013 | Pittappilly et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |

(56) References Cited

U.S. PATENT DOCUMENTS

| | | |
|---|---|---|
| 2013/0111550 A1 | 5/2013 | Naveh et al. |
| 2013/0111579 A1 | 5/2013 | Newman et al. |
| 2013/0116967 A1 | 5/2013 | Akcasu et al. |
| 2013/0117383 A1 | 5/2013 | Hymel et al. |
| 2013/0121119 A1 | 5/2013 | Umamoto |
| 2013/0132888 A1 | 5/2013 | Tijssen |
| 2013/0141365 A1 | 6/2013 | Lynn et al. |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0157646 A1 | 6/2013 | Ferren et al. |
| 2013/0169870 A1 | 7/2013 | Lee et al. |
| 2013/0185813 A1 | 7/2013 | Shim et al. |
| 2013/0191785 A1 | 7/2013 | Wu et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0234929 A1 | 9/2013 | Libin |
| 2013/0234964 A1 | 9/2013 | Kim et al. |
| 2013/0234969 A1 | 9/2013 | Yeh et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0263043 A1 | 10/2013 | Sarbin et al. |
| 2013/0275875 A1 | 10/2013 | Gruber et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0332721 A1 | 12/2013 | Chaudhri et al. |
| 2013/0332856 A1 | 12/2013 | Sanders et al. |
| 2013/0345978 A1 | 12/2013 | Lush et al. |
| 2013/0345980 A1 | 12/2013 | Van Os et al. |
| 2014/0013414 A1 | 1/2014 | Bruck et al. |
| 2014/0013945 A1 | 1/2014 | Tanaka et al. |
| 2014/0022183 A1 | 1/2014 | Ayoub et al. |
| 2014/0037109 A1 | 2/2014 | Ban |
| 2014/0043367 A1 | 2/2014 | Sakaino et al. |
| 2014/0047525 A1 | 2/2014 | Bonhoff |
| 2014/0055388 A1 | 2/2014 | Yook et al. |
| 2014/0055495 A1 | 2/2014 | Kim et al. |
| 2014/0059493 A1 | 2/2014 | Kim |
| 2014/0063049 A1 | 3/2014 | Armstrong-Muntner |
| 2014/0068755 A1 | 3/2014 | King et al. |
| 2014/0074570 A1 | 3/2014 | Hope et al. |
| 2014/0080465 A1 | 3/2014 | Cho |
| 2014/0082533 A1 | 3/2014 | Kelley et al. |
| 2014/0086123 A1 | 3/2014 | Deivasigamani et al. |
| 2014/0094224 A1 | 4/2014 | Lozovoy et al. |
| 2014/0101169 A1 | 4/2014 | Kurata et al. |
| 2014/0123005 A1 | 5/2014 | Forstall et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0136089 A1 | 5/2014 | Hranac et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143682 A1 | 5/2014 | Druck et al. |
| 2014/0143737 A1 | 5/2014 | Mistry et al. |
| 2014/0149878 A1 | 5/2014 | Mischari et al. |
| 2014/0157167 A1 | 6/2014 | Zhu |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0164955 A1 | 6/2014 | Thiruvidam et al. |
| 2014/0171132 A1 | 6/2014 | Ziemianska et al. |
| 2014/0173439 A1 | 6/2014 | Gutierrez et al. |
| 2014/0179272 A1 | 6/2014 | Zhang et al. |
| 2014/0181219 A1 | 6/2014 | Wang et al. |
| 2014/0189577 A1 | 7/2014 | Haslam et al. |
| 2014/0189578 A1 | 7/2014 | Shuttleworth et al. |
| 2014/0189584 A1 | 7/2014 | Weng et al. |
| 2014/0195476 A1 | 7/2014 | Sxhmidt |
| 2014/0195972 A1 | 7/2014 | Lee et al. |
| 2014/0197946 A1 | 7/2014 | Park et al. |
| 2014/0200691 A1 | 7/2014 | Lee et al. |
| 2014/0201655 A1 | 7/2014 | Mahaffey et al. |
| 2014/0210708 A1 | 7/2014 | Simmons et al. |
| 2014/0210801 A1 | 7/2014 | Li |
| 2014/0229752 A1 | 8/2014 | Lee et al. |
| 2014/0244009 A1 | 8/2014 | Mestas |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Jerry |
| 2014/0282153 A1 | 9/2014 | Christiansen et al. |
| 2014/0282207 A1 | 9/2014 | Wouhaybi et al. |
| 2014/0282254 A1 | 9/2014 | Feiereisen et al. |
| 2014/0289660 A1 | 9/2014 | Min |
| 2014/0293755 A1 | 10/2014 | Geiser et al. |
| 2014/0302834 A1 | 10/2014 | Jones |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0310643 A1 | 10/2014 | Karmanenko et al. |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0337791 A1 | 11/2014 | Agnetta et al. |
| 2014/0342792 A1 | 11/2014 | Markus |
| 2014/0344723 A1 | 11/2014 | Malik et al. |
| 2014/0344820 A1 | 11/2014 | Kumar |
| 2014/0344951 A1 | 11/2014 | Brewer |
| 2014/0347275 A1 | 11/2014 | Jung et al. |
| 2014/0347289 A1 | 11/2014 | Lee et al. |
| 2014/0359124 A1 | 12/2014 | Adimatyam et al. |
| 2014/0359477 A1 | 12/2014 | Chen |
| 2014/0362105 A1 | 12/2014 | Kocienda et al. |
| 2014/0371887 A1 | 12/2014 | Hoffman et al. |
| 2014/0380229 A1 | 12/2014 | Volodin et al. |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0055197 A1 | 2/2015 | Romanoff et al. |
| 2015/0058651 A1 | 2/2015 | Choi et al. |
| 2015/0061988 A1 | 3/2015 | Galu, Jr. |
| 2015/0062052 A1 | 3/2015 | Bernstein et al. |
| 2015/0062130 A1 | 3/2015 | Ho |
| 2015/0067596 A1 | 3/2015 | Brown et al. |
| 2015/0071043 A1 | 3/2015 | Kubota |
| 2015/0081474 A1 | 3/2015 | Kostka et al. |
| 2015/0082193 A1 | 3/2015 | Wallace et al. |
| 2015/0082446 A1 | 3/2015 | Flowers et al. |
| 2015/0083970 A1 | 3/2015 | Koh et al. |
| 2015/0100537 A1 | 4/2015 | Grieves et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0111558 A1 | 4/2015 | Yang |
| 2015/0112700 A1 | 4/2015 | Sublett et al. |

(56) References Cited

U.S. PATENT DOCUMENTS

| | | |
|---|---|---|
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0128042 A1 | 5/2015 | Churchill et al. |
| 2015/0128078 A1 | 5/2015 | Oh et al. |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0163210 A1 | 6/2015 | Meyers et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0195179 A1 | 7/2015 | Skare et al. |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0220265 A1 | 8/2015 | Takahashi |
| 2015/0220299 A1 | 8/2015 | Kim et al. |
| 2015/0228048 A1 | 8/2015 | Heo et al. |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254875 A1 | 9/2015 | Zhang |
| 2015/0261284 A1 | 9/2015 | Lee et al. |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0312175 A1 | 10/2015 | Langholz |
| 2015/0317945 A1 | 11/2015 | Andress et al. |
| 2015/0339261 A1 | 11/2015 | Jha et al. |
| 2015/0346694 A1 | 12/2015 | Hoobler et al. |
| 2015/0346824 A1 | 12/2015 | Chen et al. |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0378592 A1 | 12/2015 | Kim |
| 2015/0379476 A1 | 12/2015 | Chaudhri et al. |
| 2016/0004393 A1 | 1/2016 | Faaborg et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0044442 A1 | 2/2016 | Pacelli et al. |
| 2016/0048161 A1 | 2/2016 | Carceroni et al. |
| 2016/0048283 A1 | 2/2016 | Yang et al. |
| 2016/0049106 A1 | 2/2016 | Connell et al. |
| 2016/0054710 A1 | 2/2016 | Jo et al. |
| 2016/0054892 A1 | 2/2016 | Kim et al. |
| 2016/0058336 A1 | 3/2016 | Blahnik et al. |
| 2016/0058337 A1 | 3/2016 | Blahnik et al. |
| 2016/0062450 A1 | 3/2016 | Han et al. |
| 2016/0062540 A1 | 3/2016 | Yang et al. |
| 2016/0062570 A1 | 3/2016 | Dascola et al. |
| 2016/0062572 A1 | 3/2016 | Yang et al. |
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0117147 A1 | 4/2016 | Zambetti et al. |
| 2016/0134840 A1 | 5/2016 | McCulloch |
| 2016/0142763 A1 | 5/2016 | Kim et al. |
| 2016/0165037 A1 | 6/2016 | Youn et al. |
| 2016/0165038 A1 | 6/2016 | Lim et al. |
| 2016/0170731 A1 | 6/2016 | Maddern et al. |
| 2016/0179353 A1 | 6/2016 | Iskander |
| 2016/0180568 A1 | 6/2016 | Bullivant et al. |
| 2016/0187995 A1 | 6/2016 | Rosewall |
| 2016/0188179 A1 | 6/2016 | Roh |
| 2016/0188181 A1 | 6/2016 | Smith |
| 2016/0189328 A1 | 6/2016 | Vranjes et al. |
| 2016/0191511 A1 | 6/2016 | Tijerina et al. |
| 2016/0192324 A1 | 6/2016 | Zhang et al. |
| 2016/0193502 A1 | 7/2016 | Kang et al. |
| 2016/0205244 A1 | 7/2016 | Dvortsov |
| 2016/0217601 A1 | 7/2016 | Tsuda et al. |
| 2016/0259518 A1 | 9/2016 | King et al. |
| 2016/0259542 A1 | 9/2016 | Chaudhri et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0306806 A1 | 10/2016 | Fackler et al. |
| 2016/0313869 A1 | 10/2016 | Jang et al. |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0332025 A1 | 11/2016 | Repka |
| 2016/0342327 A1 | 11/2016 | Chi et al. |
| 2016/0357151 A1 | 12/2016 | Block et al. |
| 2016/0357282 A1 | 12/2016 | Block et al. |
| 2016/0357354 A1 | 12/2016 | Chen et al. |
| 2016/0357386 A1 | 12/2016 | Choi |
| 2016/0357413 A1 | 12/2016 | Block et al. |
| 2016/0358311 A1 | 12/2016 | Chen et al. |
| 2017/0004798 A1 | 1/2017 | Park et al. |
| 2017/0010677 A1 | 1/2017 | Roh et al. |
| 2017/0011210 A1 | 1/2017 | Cheong et al. |
| 2017/0039535 A1 | 2/2017 | Park et al. |
| 2017/0040001 A1 | 2/2017 | Zhang et al. |
| 2017/0045993 A1 | 2/2017 | Oh et al. |
| 2017/0046024 A1 | 2/2017 | Dascola et al. |
| 2017/0046052 A1 | 2/2017 | Lee et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0068439 A1 | 3/2017 | Mohseni |
| 2017/0075305 A1 | 3/2017 | Ryu et al. |
| 2017/0075316 A1 | 3/2017 | Berdinis et al. |
| 2017/0082983 A1 | 3/2017 | Katzer et al. |
| 2017/0109011 A1 | 4/2017 | Jiang |
| 2017/0123571 A1 | 5/2017 | Huang et al. |
| 2017/0123640 A1 | 5/2017 | Wilson et al. |
| 2017/0127354 A1 | 5/2017 | Garland et al. |
| 2017/0134321 A1 | 5/2017 | Ushio et al. |
| 2017/0149795 A1 | 5/2017 | Day, II |
| 2017/0160898 A1 | 6/2017 | Lee et al. |
| 2017/0164292 A1 | 6/2017 | Santamaria et al. |
| 2017/0176950 A1 | 6/2017 | Jung et al. |
| 2017/0186399 A1 | 6/2017 | Moritani et al. |
| 2017/0209766 A1 | 7/2017 | Riley et al. |
| 2017/0212648 A1 | 7/2017 | Choi et al. |
| 2017/0230236 A1 | 8/2017 | Kim et al. |
| 2017/0236497 A1 | 8/2017 | Huitema et al. |
| 2017/0255169 A1 | 9/2017 | Lee et al. |
| 2017/0257426 A1 | 9/2017 | Wilbur et al. |
| 2017/0266494 A1 | 9/2017 | Crankson et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0325196 A1 | 11/2017 | Cho et al. |
| 2017/0329477 A1 | 11/2017 | Sachidanandam et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357413 A1 | 12/2017 | Green |
| 2017/0357426 A1 | 12/2017 | Wilson et al. |

(56) References Cited

U.S. PATENT DOCUMENTS

| | | |
|---|---|---|
| 2017/0357427 A1 | 12/2017 | Wilson et al. |
| 2017/0357495 A1 | 12/2017 | Crane et al. |
| 2017/0371394 A1 | 12/2017 | Chan et al. |
| 2018/0011450 A1 | 1/2018 | Slackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0074462 A1 | 3/2018 | Helder et al. |
| 2018/0081515 A1 | 3/2018 | Block et al. |
| 2018/0088537 A1 | 3/2018 | Mural |
| 2018/0088733 A1 | 3/2018 | Syed et al. |
| 2018/0088797 A1 | 3/2018 | McAtee et al. |
| 2018/0097925 A1 | 4/2018 | Ryu et al. |
| 2018/0120927 A1 | 5/2018 | Ma et al. |
| 2018/0121060 A1 | 5/2018 | Jeong et al. |
| 2018/0136810 A1 | 5/2018 | Martin et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0174550 A1 | 6/2018 | Zhang et al. |
| 2018/0181078 A1 | 6/2018 | Imamura |
| 2018/0181381 A1 | 6/2018 | Michaely et al. |
| 2018/0188925 A1 | 7/2018 | Na et al. |
| 2018/0246635 A1 | 8/2018 | Baer et al. |
| 2018/0246639 A1 | 8/2018 | Han et al. |
| 2018/0260080 A1 | 9/2018 | Cho |
| 2018/0261183 A1 | 9/2018 | Gou et al. |
| 2018/0275739 A1 | 9/2018 | Minami et al. |
| 2018/0288560 A1 | 10/2018 | Naik et al. |
| 2018/0316783 A1 | 11/2018 | Ye et al. |
| 2018/0321842 A1 | 11/2018 | Lee et al. |
| 2018/0329587 A1 | 11/2018 | Ko et al. |
| 2018/0335927 A1 | 11/2018 | Anzures et al. |
| 2018/0341389 A1 | 11/2018 | Kim et al. |
| 2018/0343023 A1 | 11/2018 | Park et al. |
| 2018/0348844 A1 | 12/2018 | Lingutla et al. |
| 2018/0352435 A1 | 12/2018 | Donley et al. |
| 2018/0366068 A1 | 12/2018 | Liu et al. |
| 2018/0374429 A1 | 12/2018 | Nakamura |
| 2019/0018445 A1 | 1/2019 | Watanabe et al. |
| 2019/0033278 A1 | 1/2019 | Mou et al. |
| 2019/0050045 A1 | 2/2019 | Jha et al. |
| 2019/0069244 A1 | 2/2019 | Jeon et al. |
| 2019/0079576 A1 | 3/2019 | Liu et al. |
| 2019/0121300 A1 | 4/2019 | Peterson et al. |
| 2019/0121523 A1 | 4/2019 | Block et al. |
| 2019/0139207 A1 | 5/2019 | Jeong et al. |
| 2019/0163142 A1 | 5/2019 | Chang et al. |
| 2019/0180221 A1 | 6/2019 | Greenberger et al. |
| 2019/0182749 A1 | 6/2019 | Breaux et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0237003 A1 | 8/2019 | Cao et al. |
| 2019/0250813 A1 | 8/2019 | Block et al. |
| 2019/0268771 A1 | 8/2019 | Seo et al. |
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0324620 A1 | 10/2019 | Gu et al. |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |
| 2020/0050332 A1 | 2/2020 | Yang et al. |
| 2020/0068095 A1 | 2/2020 | Nabetani |
| 2020/0073122 A1 | 3/2020 | Rothkopf et al. |
| 2020/0089302 A1 | 3/2020 | Kim et al. |
| 2020/0110946 A1 | 4/2020 | Kline et al. |
| 2020/0125037 A1 | 4/2020 | Jo et al. |
| 2020/0133206 A1 | 4/2020 | Jo et al. |
| 2020/0228646 A1 | 7/2020 | Hotes et al. |
| 2020/0242228 A1 | 7/2020 | Farraro et al. |
| 2020/0249632 A1 | 8/2020 | Olwal et al. |
| 2020/0264567 A1 | 8/2020 | Ok et al. |
| 2020/0319348 A1 | 10/2020 | Oshita et al. |
| 2020/0327862 A1 | 10/2020 | Sinha et al. |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379413 A1 | 12/2020 | Chen et al. |
| 2020/0408521 A1 | 12/2020 | Lyons et al. |
| 2021/0042028 A1 | 2/2021 | Block et al. |
| 2021/0048929 A1 | 2/2021 | Agnoli et al. |
| 2021/0132780 A1 | 5/2021 | Kyung |
| 2021/0149694 A1 | 5/2021 | Guzman et al. |
| 2021/0201732 A1 | 7/2021 | Ranjan et al. |
| 2021/0216654 A1 | 7/2021 | Ko et al. |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349741 A1 | 11/2021 | Guzman et al. |
| 2022/0157184 A1 | 5/2022 | Wilson et al. |
| 2022/0184309 A1 | 6/2022 | Rosinko et al. |
| 2022/0198984 A1 | 6/2022 | Connor et al. |
| 2022/0214785 A1 | 7/2022 | Giv |
| 2022/0221964 A1 | 7/2022 | Ko et al. |
| 2022/0229537 A1 | 7/2022 | Chen et al. |
| 2022/0236867 A1 | 7/2022 | Chen et al. |
| 2022/0276780 A1 | 9/2022 | Ko et al. |
| 2022/0342514 A1 | 10/2022 | Chao et al. |
| 2022/0391070 A1 | 12/2022 | Crandall et al. |
| 2023/0004270 A1 | 1/2023 | Chen et al. |
| 2023/0008229 A1 | 1/2023 | Chen et al. |
| 2023/0035532 A1 | 2/2023 | Chen et al. |
| 2023/0071987 A1 | 3/2023 | Zeng et al. |
| 2023/0078153 A1 | 3/2023 | Yang et al. |
| 2023/0082876 A1 | 3/2023 | Guzman et al. |
| 2023/0221845 A1 | 7/2023 | Crandall et al. |
| 2023/0236547 A1 | 7/2023 | Chen et al. |
| 2023/0236549 A1 | 7/2023 | Guzman et al. |
| 2023/0236550 A1 | 7/2023 | Chen et al. |
| 2024/0403077 A1 | 12/2024 | Mitchell |

FOREIGN PATENT DOCUMENTS

| | | |
|---|---|---|
| AU | 2015101639 A4 | 12/2015 |
| CA | 2356232 A1 | 3/2002 |
| CA | 2781636 A1 | 7/2010 |
| CA | 2792987 A1 | 10/2011 |
| CA | 2800123 C | 7/2016 |
| CA | 2986980 A1 | 5/2019 |
| CH | 707412 A2 | 6/2014 |
| CN | 1337638 A | 2/2002 |
| CN | 1397904 A | 2/2003 |
| CN | 1536511 A | 10/2004 |
| CN | 1610866 A | 4/2005 |
| CN | 1997957 A | 7/2007 |
| CN | 101098535 A | 1/2008 |
| CN | 101382438 A | 3/2009 |
| CN | 100492288 C | 5/2009 |
| CN | 101505320 A | 8/2009 |
| CN | 101627349 A | 1/2010 |
| CN | 101702112 A | 5/2010 |
| CN | 101819486 A | 9/2010 |
| CN | 101939740 A | 1/2011 |
| CN | 101981987 A | 2/2011 |
| CN | 102681648 A | 9/2012 |
| CN | 102687176 A | 9/2012 |
| CN | 102750070 A | 10/2012 |
| CN | 102790826 A | 11/2012 |
| CN | 103154954 A | 6/2013 |
| CN | 103399480 A | 11/2013 |
| CN | 103544920 A | 1/2014 |

(56) References Cited

FOREIGN PATENT DOCUMENTS

| | | |
|---|---|---|
| CN | 103562832 A | 2/2014 |
| CN | 103607660 A | 2/2014 |
| CN | 103649897 A | 3/2014 |
| CN | 103713843 A | 4/2014 |
| CN | 103744671 A | 4/2014 |
| CN | 103902165 A | 7/2014 |
| CN | 103914238 A | 7/2014 |
| CN | 103973899 A | 8/2014 |
| CN | 203773233 U | 8/2014 |
| CN | 104281405 A | 1/2015 |
| CN | 104487929 A | 4/2015 |
| CN | 104501043 A | 4/2015 |
| CN | 104580576 A | 4/2015 |
| CN | 105204931 A | 12/2015 |
| CN | 105260049 A | 1/2016 |
| CN | 105264479 A | 1/2016 |
| CN | 105335087 A | 2/2016 |
| CN | 105388966 A | 3/2016 |
| CN | 105389078 A | 3/2016 |
| CN | 105389107 A | 3/2016 |
| CN | 105453016 A | 3/2016 |
| CN | 205608658 U | 9/2016 |
| CN | 106056848 A | 10/2016 |
| CN | 106486044 A | 3/2017 |
| CN | 106598201 A | 4/2017 |
| CN | 106605201 A | 4/2017 |
| CN | 107239101 A | 10/2017 |
| CN | 107430489 A | 12/2017 |
| CN | 107643677 A | 1/2018 |
| CN | 107870560 A | 4/2018 |
| CN | 108255049 A | 7/2018 |
| CN | 109196469 A | 1/2019 |
| CN | 109313655 A | 2/2019 |
| CN | 109690445 A | 4/2019 |
| CN | 110471582 B | 10/2021 |
| DE | 202017105858 U1 | 3/2018 |
| EP | 0579093 A1 | 1/1994 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1777611 A1 | 4/2007 |
| EP | 1832969 A2 | 9/2007 |
| EP | 1855170 A2 | 11/2007 |
| EP | 1988432 A1 | 11/2008 |
| EP | 2040146 A2 | 3/2009 |
| EP | 2120115 A2 | 11/2009 |
| EP | 2175367 A2 | 4/2010 |
| EP | 2194508 A1 | 6/2010 |
| EP | 2204702 A1 | 7/2010 |
| EP | 2290922 A1 | 3/2011 |
| EP | 2302493 A2 | 3/2011 |
| EP | 2312512 A1 | 4/2011 |
| EP | 2360902 A2 | 8/2011 |
| EP | 2413577 A2 | 2/2012 |
| EP | 2423810 A1 | 2/2012 |
| EP | 2426902 A1 | 3/2012 |
| EP | 2437148 A2 | 4/2012 |
| EP | 2600215 A1 | 6/2013 |
| EP | 2602759 A2 | 6/2013 |
| EP | 2615607 A2 | 7/2013 |
| EP | 2629483 A1 | 8/2013 |
| EP | 2653961 A1 | 10/2013 |
| EP | 2677775 A1 | 12/2013 |
| EP | 2720126 A1 | 4/2014 |
| EP | 2738640 A2 | 6/2014 |
| EP | 2821912 A1 | 1/2015 |
| EP | 2942932 A1 | 11/2015 |
| EP | 2990887 A2 | 3/2016 |
| EP | 2993602 A1 | 3/2016 |
| EP | 3056949 A1 | 8/2016 |
| EP | 3101958 A1 | 12/2016 |
| EP | 3376342 A1 | 9/2018 |
| EP | 3401770 A1 | 11/2018 |
| EP | 3465408 B1 | 8/2020 |
| EP | 3896560 A1 | 10/2021 |
| GB | 2370208 A | 6/2002 |
| GB | 2475669 A | 6/2011 |
| JP | 49-134364 A | 12/1974 |
| JP | 53-31170 A | 3/1978 |
| JP | 56-621 A | 1/1981 |
| JP | 3007616 U | 2/1995 |
| JP | 8-110955 A | 4/1996 |
| JP | 9-251084 A | 9/1997 |
| JP | 10-143636 A | 5/1998 |
| JP | 10-506472 A | 6/1998 |
| JP | 11-109066 A | 4/1999 |
| JP | 11-160470 A | 6/1999 |
| JP | 11-232013 A | 8/1999 |
| JP | 2000-162349 A | 6/2000 |
| JP | 3062531 B2 | 7/2000 |
| JP | 2001-144884 A | 5/2001 |
| JP | 2001-147282 A | 5/2001 |
| JP | 2001-273064 A | 10/2001 |
| JP | 2001-313886 A | 11/2001 |
| JP | 2001-318852 A | 11/2001 |
| JP | 2002-73486 A | 3/2002 |
| JP | 2002-507718 A | 3/2002 |
| JP | 2002-251238 A | 9/2002 |
| JP | 2002-271451 A | 9/2002 |
| JP | 2003-9404 A | 1/2003 |
| JP | 2003-121568 A | 4/2003 |
| JP | 2003-233616 A | 8/2003 |
| JP | 2003-296246 A | 10/2003 |
| JP | 2004-28918 A | 1/2004 |
| JP | 2004-519033 A | 6/2004 |
| JP | 2004-184396 A | 7/2004 |
| JP | 2005-521890 A | 7/2005 |
| JP | 2005-532607 A | 10/2005 |
| JP | 2005-339017 A | 12/2005 |
| JP | 2006-101505 A | 4/2006 |
| JP | 2006-242717 A | 9/2006 |
| JP | 2006-293340 A | 10/2006 |
| JP | 2008-97202 A | 4/2008 |
| JP | 2008-175800 A | 7/2008 |
| JP | 2009-147889 A | 7/2009 |
| JP | 2009-229106 A | 10/2009 |
| JP | 2009-293960 A | 12/2009 |
| JP | 2010-124181 A | 6/2010 |
| JP | 2010-257051 A | 11/2010 |
| JP | 3168099 U | 6/2011 |
| JP | 2011-159172 A | 8/2011 |
| JP | 2011-217000 A | 10/2011 |
| JP | 2011-530101 A | 12/2011 |
| JP | 2012-32306 A | 2/2012 |
| JP | 2012-53642 A | 3/2012 |
| JP | 2012-505478 A | 3/2012 |
| JP | 2012-109778 A | 6/2012 |
| JP | 2012-123475 A | 6/2012 |
| JP | 2012-147432 A | 8/2012 |
| JP | 2012-517630 A | 8/2012 |
| JP | 2012-203537 A | 10/2012 |
| JP | 2012-203832 A | 10/2012 |
| JP | 2012-531607 A | 12/2012 |
| JP | 2013-3671 A | 1/2013 |
| JP | 2013-29925 A | 2/2013 |
| JP | 2013-92989 A | 5/2013 |
| JP | 2013-146557 A | 8/2013 |
| JP | 2013-232230 A | 11/2013 |
| JP | 2014-35766 A | 2/2014 |
| JP | 2014-123197 A | 7/2014 |
| JP | 2014-143575 A | 8/2014 |
| JP | 2014-519126 A | 8/2014 |
| JP | 2014-216868 A | 11/2014 |
| JP | 5630676 B2 | 11/2014 |
| JP | 2015-210587 A | 11/2015 |
| JP | 2016-13151 A | 1/2016 |
| JP | 2017-111083 A | 6/2017 |
| JP | 2017-527026 A | 9/2017 |
| JP | 2017-531225 A | 10/2017 |
| JP | 2017-531230 A | 10/2017 |
| JP | 2018-514838 A | 6/2018 |
| JP | 2018-113544 A | 7/2018 |

(56) References Cited

FOREIGN PATENT DOCUMENTS

| | | |
|---|---|---|
| JP | 2018-116067 A | 7/2018 |
| JP | 2020-56745 A | 4/2020 |
| KR | 10-2004-0107489 A | 12/2004 |
| KR | 20-0425314 Y1 | 9/2006 |
| KR | 10-2007-0025292 A | 3/2007 |
| KR | 10-2008-0058246 A | 6/2008 |
| KR | 10-0864578 B1 | 10/2008 |
| KR | 10-2009-0112132 A | 10/2009 |
| KR | 10-2010-0025846 A | 3/2010 |
| KR | 10-2010-0025853 A | 3/2010 |
| KR | 10-2011-0093729 A | 8/2011 |
| KR | 10-2012-0132134 A | 12/2012 |
| KR | 10-2013-0109466 A | 10/2013 |
| KR | 10-2014-0025552 A | 3/2014 |
| KR | 10-2014-0064687 A | 5/2014 |
| KR | 10-2014-0074824 A | 6/2014 |
| KR | 10-2015-0001287 A | 1/2015 |
| KR | 10-2015-0008996 A | 1/2015 |
| KR | 10-2015-0038711 A | 4/2015 |
| KR | 10-2015-0081140 A | 7/2015 |
| KR | 10-2015-0093090 A | 8/2015 |
| KR | 10-2016-0026314 A | 3/2016 |
| KR | 10-2017-0032471 A | 3/2017 |
| KR | 10-2017-0076452 A | 7/2017 |
| KR | 10-2017-0081391 A | 7/2017 |
| KR | 10-2017-0082698 A | 7/2017 |
| KR | 10-2018-0011581 A | 2/2018 |
| KR | 10-1875907 B1 | 7/2018 |
| KR | 10-2019-0020850 A | 3/2019 |
| KR | 10-2019-0071285 A | 6/2019 |
| KR | 20190114034 A | 10/2019 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | 1348803 B | 9/2011 |
| TW | 201232486 A | 8/2012 |
| TW | M435665 U1 | 8/2012 |
| TW | 201419115 A | 5/2014 |
| WO | 98/40795 A1 | 9/1998 |
| WO | 99/66394 A1 | 12/1999 |
| WO | 99/66395 A2 | 12/1999 |
| WO | 01/71433 A1 | 9/2001 |
| WO | 02/054157 A1 | 7/2002 |
| WO | 03/048872 A1 | 6/2003 |
| WO | 03/085460 A2 | 10/2003 |
| WO | 2004/056107 A1 | 7/2004 |
| WO | 2006/012343 A2 | 2/2006 |
| WO | 2006/112641 A1 | 10/2006 |
| WO | 2006/131780 A1 | 12/2006 |
| WO | 2007/018881 A2 | 2/2007 |
| WO | 2008/114491 A1 | 9/2008 |
| WO | 2009/053775 A1 | 4/2009 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2011/099819 A2 | 8/2011 |
| WO | 2012/021507 A2 | 2/2012 |
| WO | 2011/130849 A8 | 5/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169851 A2 | 11/2013 |
| WO | 2013/169854 A2 | 11/2013 |
| WO | 2013/169870 A1 | 11/2013 |
| WO | 2013/169875 A2 | 11/2013 |
| WO | 2013/169877 A2 | 11/2013 |
| WO | 2013/169882 A2 | 11/2013 |
| WO | 2014/024000 A1 | 2/2014 |
| WO | 2014/078114 A1 | 5/2014 |
| WO | 2014/081181 A1 | 5/2014 |
| WO | 2014/105274 A1 | 7/2014 |
| WO | 2014/105276 A1 | 7/2014 |
| WO | 2014/105278 A1 | 7/2014 |
| WO | 2014/105279 A1 | 7/2014 |
| WO | 2014/189197 A1 | 11/2014 |
| WO | 2014/200730 A1 | 12/2014 |
| WO | 2015/023419 A1 | 2/2015 |
| WO | 2015/029313 A1 | 3/2015 |
| WO | 2015/034960 A1 | 3/2015 |
| WO | 2015/065402 A1 | 5/2015 |
| WO | 2015/163536 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/025395 A2 | 2/2016 |
| WO | 2016/032076 A1 | 3/2016 |
| WO | 2016/036427 A1 | 3/2016 |
| WO | 2016/036522 A2 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144977 A1 | 9/2016 |
| WO | 2017/062621 A1 | 4/2017 |
| WO | 2017/213777 A1 | 12/2017 |
| WO | 2017/213899 A1 | 12/2017 |
| WO | 2017/213937 A1 | 12/2017 |
| WO | 2018/048700 A1 | 3/2018 |
| WO | 2018/213451 A1 | 11/2018 |
| WO | 2019/200350 A1 | 10/2019 |
| WO | 2019/217086 A2 | 11/2019 |
| WO | 2019/217249 A2 | 11/2019 |
| WO | 2021/050190 A1 | 3/2021 |

OTHER PUBLICATIONS

Advisory Action received for U.S. Appl. No. 14/815,898, mailed on Aug. 30, 2016, 3 pages.
Advisory Action received for U.S. Appl. No. 14/822,769, mailed on Apr. 30, 2018, 4 pages.
Advisory Action received for U.S. Appl. No. 14/833,014, mailed on Jan. 27, 2017, 3 pages.
Advisory Action received for U.S. Appl. No. 14/846,511, mailed on Oct. 22, 2019, 5 pages.
Advisory Action received for U.S. Appl. No. 14/846,511, mailed on Sep. 19, 2018, 8 pages.
Advisory Action received for U.S. Appl. No. 15/405,122, mailed on Apr. 18, 2022, 5 pages.
Advisory Action received for U.S. Appl. No. 15/421,865, mailed on Apr. 16. 2020, 7 pages.
Advisory Action received for U.S. Appl. No. 15/554,204, mailed on Mar. 12, 2020, 3 pages.
Advisory Action received for U.S. Appl. No. 16/389,722, mailed on Jun. 9, 2023, 4 pages.
Advisory Action received for U.S. Appl. No. 16/389,722, mailed on Mar. 9, 2021, 5 pages.
Advisory Action received for U.S. Appl. No. 16/582,020, mailed on Aug. 3, 2020, 4 pages.
Advisory Action received for U.S. Appl. No. 16/861,651, mailed on Jul. 29, 2022, 4 pages.
Advisory Action received for U.S. Appl. No. 16/935,002, mailed on May 6, 2022, 3 pages.
Advisory Action received for U.S. Appl. No. 16/943,737, mailed on Jun. 1, 2022, 6 pages.
Advisory Action received for U.S. Appl. No. 17/031,765, mailed on Dec. 12, 2022, 7 pages.
Advisory Action received for U.S. Appl. No. 17/158,936, mailed on Jul. 24, 2023, 4 pages.
"AdyClock—Night Alarm Clock", App for android, Google play store page: https://web.archive.org/web/20130924223153/https://play.google.com/store/apps/details?id=com.adyclock&hl=en, Sep. 24, 2013, 2 pages.

(56) References Cited

OTHER PUBLICATIONS

Airshow, "Airshow App for Mobile Devices", 2012, 4 pages.
Andro, Dollar, "Huawei Watch GT Always on Mode UPDATE is finally here!", Online Availabe at: https://www.youtube.com/watch?v=AJw_FIAf7v4, Jun. 6, 2019, 4 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Android Tips, "Create a Minimal Lock Screen with WidgetLocker", Online Available at: http://appstap192.blogspot.com/2012/01/create-minimal-lock-screen-with.html, Jan. 18, 2012, 6 pages.
Androidika, "Butterfly 3D Live Wallpaper 1.0 APK", Available at: <http://net-suckga-ilauncher2.apk-dl.com/butterfly-3d-live-wallpaper>, Feb. 26, 2013, 7 pages.
"AOD too dim. I've answered my own question to help others", Online Available: https://forums.androidcentral.com/samsung-galaxy-s9-s9-plus/874444-aod-too-dim-ive-answered-my-own-question-help-others.html, Mar. 11, 2018. 3 pages.
Applicant-Initiated Interview Summary received for U.S. Appl. No. 14/846,511, mailed on Apr. 20, 2020, 4 pages.
Applicant-Initiated Interview Summary received for U.S. Appl. No. 16/389,722, mailed on Jul. 7, 2020, 5 pages.
Applicant-Initiated Interview Summary received for U.S. Appl. No. 16/582,020, mailed on Jul. 9, 2021, 4 pages.
Applicant-Initiated Interview Summary received for U.S. Appl. No. 16/582,020, mailed on Jul. 14, 2020, 5 pages.
Applicant-Initiated Interview Summary received for U.S. Appl. No. 16/582,020, mailed on Mar. 25, 2020, 5 pages.
Applicant-Initiated Interview Summary received for U.S. Appl. No. 16/584,445, mailed on Mar. 17, 2020, 5 pages.
Applicant-Initiated Interview Summary received for U.S. Appl. No. 16/585,399, mailed on Mar. 25, 2020, 3 pages.
Applicant-Initiated Interview Summary received for U.S. Appl. No. 17/031,671, mailed on Aug. 2, 2021, 5 pages.
Applicant-Initiated Interview Summary received for U.S. Appl. No. 17/031,671, mailed on Jun. 13, 2022, 7 pages.
Applicant-Initiated Interview Summary received for U.S. Appl. No. 17/031,671, mailed on Nov. 8, 2021, 5 pages.
Applicant-Initiated Interview Summary received for U.S. Appl. No. 17/546,630, mailed on May 22, 2023, 4 pages.
Applicant-Initiated Interview Summary received for U.S. Appl. No. 17/681,584, mailed on Mar. 24, 2023, 2 pages.
Applicant-Initiated Interview Summary received for U.S. Appl. No. 17/746,807, mailed on Jun. 9, 2023, 2 pages.
Applicant Initiated Interview Summary received for U.S. Appl. No. 17/746,807, mailed on Mar. 31, 2023, 2 pages.
Applicant-Initiated Interview Summary received for U.S. Appl. No. 15/405,122, mailed on Dec. 22, 2020, 5 pages.
Applicant-Initiated Interview Summary received for U.S. Appl. No. 15/405,122, mailed on Jul. 7, 2021, 4 pages.
Applicant-Initiated Interview Summary received for U.S. Appl. No. 15/405,122, mailed on Mar. 1, 2022, 4 pages.
Applicant-Initiated Interview Summary received for U.S. Appl. No. 15/405,122, mailed on May 21, 2020, 5 pages.
Applicant-Initiated Interview Summary received for U.S. Appl. No. 15/421,865, mailed on Dec. 15, 2020, 6 pages.
Applicant-Initiated Interview Summary received for U.S. Appl. No. 15/421,865, mailed on Feb. 3, 2020, 5 pages.
Applicant-Initiated Interview Summary received for U.S. Appl. No. 15/421,865, mailed on Feb. 28, 2022, 5 pages.
Applicant-Initiated Interview Summary received for U.S. Appl. No. 15/421,865, mailed on Jun. 30, 2021, 6 pages.
Applicant-Initiated Interview Summary received for U.S. Appl. No. 15/554,204, mailed on Jan. 31, 2020, 3 pages.
Applicant-Initiated Interview Summary received for U.S. Appl. No. 15/554,204, mailed on Oct. 11, 2019, 5 pages.
Applicant-Initiated Interview Summary received for U.S. Appl. No. 15/798,235, mailed on Feb. 3, 2020, 3 pages.
Applicant-Initiated Interview Summary received for U.S. Appl. No. 16/389,722, mailed on Feb. 11, 2021, 4 pages.
Applicant-Initiated Interview Summary received for U.S. Appl. No. 16/389,722, mailed on Feb. 18, 2022, 5 pages.
Applicant-Initiated Interview Summary received for U.S. Appl. No. 16/389,722, mailed on May 31, 2023, 4 pages.
Applicant-Initiated Interview Summary received for U.S. Appl. No. 16/389,722, mailed on Nov. 4, 2022, 4 pages.
Applicant-Initiated Interview Summary received for U.S. Appl. No. 16/389,722, mailed on Sep. 7, 2021, 4 pages.
Applicant-Initiated Interview Summary received for U.S. Appl. No. 16/401,934, mailed on Feb. 23, 2021, 8 pages.
Applicant-Initiated Interview Summary received for U.S. Appl. No. 16/418,786, mailed on Mar. 30, 2021, 4 pages.
Applicant-Initiated Interview Summary received for U.S. Appl. No. 16/418,786, mailed on May 9, 2022, 2 pages.
Applicant-Initiated Interview Summary received for U.S. Appl. No. 16/418,786, mailed on Sep. 23, 2022, 2 pages.
Applicant-Initiated Interview Summary received for U.S. Appl. No. 16/584,281, mailed on Mar. 9, 2020, 5 pages.
Applicant-Initiated Interview Summary received for U.S. Appl. No. 16/584,281, mailed on Sep. 14, 2020, 6 pages.
Applicant-Initiated Interview Summary received for U.S. Appl. No. 16/585,714, mailed on Jul. 20, 2020, 5 pages.
Applicant-Initiated Interview Summary received for U.S. Appl. No. 16/585,721, mailed on Aug. 31, 2020, 5 pages.
Applicant-Initiated Interview Summary received for U.S. Appl. No. 16/585,721, mailed on Mar. 13, 2020, 5 pages.
Applicant-Initiated Interview Summary received for U.S. Appl. No. 16/659,507, mailed on Nov. 17, 2020, 3 pages.
Applicant-Initiated Interview Summary received for U.S. Appl. No. 16/861,651, mailed on Dec. 29, 2021, 5 pages.
Applicant-Initiated Interview Summary received for U.S. Appl. No. 16/861,651, mailed on Mar. 25, 2021, 6 pages.
Applicant-Initiated Interview Summary received for U.S. Appl. No. 16/861,651, mailed on Sep. 3, 2021, 5 pages.
Applicant-Initiated Interview Summary received for U.S. Appl. No. 16/935,002, mailed on Sep. 21, 2021, 4 pages.
Applicant-Initiated Interview Summary received for U.S. Appl. No. 16/943,737, mailed on Apr. 29, 2022, 6 pages.
Applicant-Initiated Interview Summary received for U.S. Appl. No. 16/943,737, mailed on Sep. 7, 2021, 4 pages.
Applicant-Initiated Interview Summary received for U.S. Appl. No. 16/997,588, mailed on Jan. 29, 2021, 3 pages.
Applicant-Initiated Interview Summary received for U.S. Appl. No. 16/997,588, mailed on May 12, 2021, 2 pages.
Applicant-Initiated Interview Summary received for U.S. Appl. No. 17/031,654, mailed on Feb. 1, 2021, 2 pages.
Applicant-Initiated Interview Summary received for U.S. Appl. No. 17/031,671, mailed on Dec. 9, 2022, 5 pages.
Applicant-Initiated Interview Summary received for U.S. Appl. No. 17/031,671, mailed on May 23, 2023, 3 pages.
Applicant-Initiated Interview Summary received for U.S. Appl. No. 17/031,765, mailed on Apr. 17, 2023, 4 pages.
Applicant-Initiated Interview Summary received for U.S. Appl. No. 17/031,765, mailed on Dec. 15, 2021, 4 pages.
Applicant-Initiated Interview Summary received for U.S. Appl. No. 17/031,765, mailed on May 3, 2023, 6 pages.
Applicant-Initiated Interview Summary received for U.S. Appl. No. 17/031,765, mailed on May 23, 2022, 5 pages.
Applicant-Initiated Interview Summary received for U.S. Appl. No. 17/031,765, mailed on Nov. 16, 2022, 5 pages.
Applicant-Initiated Interview Summary received for U.S. Appl. No. 17/031,765, mailed on Sep. 22, 2021, 5 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/068,386, mailed on Apr. 24, 2023, 2 pages.

(56) References Cited

OTHER PUBLICATIONS

Applicant-Initiated Interview Summary received for U.S. Appl. No. 17/068,386, mailed on Jan. 13, 2022, 2 pages.
Applicant-Initiated Interview Summary received for U.S. Appl. No. 17/068,386, mailed on Sep. 21, 2021, 2 pages.
Applicant-Initiated Interview Summary received for U.S. Appl. No. 17/078,896, mailed on Apr. 25, 2022, 2 pages.
Applicant-Initiated Interview Summary received for U.S. Appl. No. 17/158,936, mailed on Dec. 28, 2022, 4 pages.
Applicant-Initiated Interview Summary received for U.S. Appl. No. 17/317,042, mailed on Apr. 29, 2022, 2 pages.
Applicant-Initiated Interview Summary received for U.S. Appl. No. 17/341,839, mailed on Apr. 29, 2022, 2 pages.
Applicant-Initiated Interview Summary received for U.S. Appl. No. 17/341,839, mailed on Sep. 16, 2022, 2 pages.
Applicant-Initiated Interview Summary received for U.S. Appl. No. 17/373,163, mailed on Apr. 11, 2022, 2 pages.
Applicant-Initiated Interview Summary received for U.S. Appl. No. 17/546,630, mailed on Aug. 9, 2023, 4 pages.
Applicant-Initiated Interview Summary received for U.S. Appl. No. 17/556,165, mailed on Oct. 28, 2022, 4 pages.
Applicant-Initiated Interview Summary received for U.S. Appl. No. 17/591,184, mailed on Feb. 27, 2023, 2 pages.
Applicant-Initiated Interview Summary received for U.S. Appl. No. 17/591,184, mailed on Jun. 28, 2023, 2 pages.
Applicant-Initiated Interview Summary received for U.S. Appl. No. 17/591,184, mailed on Sep. 23, 2022, 2 pages.
Applicant-Initiated Interview Summary received for U.S. Appl. No. 17/681,584, mailed on Jun. 6, 2023, 2 pages.
Applicant-Initiated Interview Summary received for U.S. Appl. No. 17/713,016, mailed on Feb. 14, 2023, 4 pages.
Applicant-Initiated Interview Summary received for U.S. Appl. No. 17/738,940, mailed on Mar. 7, 2023, 4 pages.
Applicant-Initiated Interview Summary received for U.S. Appl. No. 17/941,962, mailed on May 30, 2023, 2 pages.
Applicant-Initiated Interview Summary received for U.S. Appl. No. 17/947,530, mailed on Jun. 14, 2023, 2 pages.
Applicant-Initiated Interview Summary received for U.S. Appl. No. 17/948,578, mailed on Apr. 11, 2023, 3 pages.
Applicant-Initiated Interview Summary received for U.S. Appl. No. 17/949,081, mailed on Apr. 28, 2023, 2 pages.
Applicant-Initiated Interview Summary received for U.S. Appl. No. 17/987,731, mailed on Nov. 20, 2023, 2 pages.
Applicant-Initiated Interview Summary received for U.S. Appl. No. 18/118,978, mailed on Sep. 22, 2023, 4 pages.
Avdonin, Nikita, "Astroviewer 3D", Available at <: https:jjwww.youtube.comjwatch?v=zY0tsix3JHY/>, Nov. 5, 2013, 2 pages.
Baar, Marius, "Fitbit Ace—Unboxing, Setup and 24-Hour Test", YouTube [online] [video], Retrieved from: <https://youtu.be/ekvkfqOyrls>. See especially 4:44., Oct. 24, 2018, 3 pages.
Barbosa, Jonathan, "Weather Clock 2.1 for Android", APKPure, Online Available at: https://apkpure.com/weather-clock/com.urbandroid.wclock, Oct. 15, 2015, 3 pages.
Big Phil TV, "Gear S3 Watch faces with great always on display (A O D)", Available online at: https://www.youtube.com/watch?v=2cxMnrMiGU8, Apr. 5, 2017, 3 pages.
Bogdanov, Alexei, "SKMEI 1016", XP054977588. Available online at <URL: https://www.youtube.com/watch?v=E4q4Fug05Fw>, Jun. 21, 2014, 2 pages.
Brief Communication Regarding Oral Proceedings received for European Patent Application No. 15730925.3, mailed on Feb. 18, 2020, 7 pages.
Brief Communication Regarding Oral Proceedings received for European Patent Application No. 17206177.2, mailed on Nov. 21, 2019, 5 pages.
Brief Communication Regarding Oral Proceedings received for European Patent Application No. 17810723.1, mailed on Nov. 11, 2022, 11 pages.
Cancellation of Oral Proceedings received for European Patent Application No. 17206177.2, mailed on Dec. 4, 2019, 2 pages.

Castellini, Rick, "Google Earth", Retrieved from <https://www.youtube.com/watch?v=bgjMSBXsFZQ>, How to Use Google Earth for Beginners, Feb. 12, 2013, 3 pages.
Cengic, Suad, "Samsung Gear S3—Display Always on! Cool!", Available online at: https://www.youtube.com/watch?v=ceeDinbPwOY, Mar. 10, 2017, 3 pages.
Certificate of Examination received for Australian Patent Application No. 2020102158, mailed on Jun. 8, 2021, 2 pages.
Clark, Josh, "Designing Great iPhone Apps", O'Reilly Japan Co., O'Reilly Tim, vol. 1, May 24, 2012, 5 pages.
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 14/822,769, mailed on Jan. 17, 2019, 8 pages.
Corrected Notice of Allowance received for U.S. Appl. No. 14/841,402, mailed on May 4, 2018, 2 pages.
Corrected Notice of Allowance received for U.S. Appl. No. 15/183,663, mailed on Feb. 25, 2019, 3 pages.
Corrected Notice of Allowance received for U.S. Appl. No. 15/183,663, mailed on Mar. 27, 2019, 2 pages.
Corrected Notice of Allowance received for U.S. Appl. No. 15/355,956, mailed on Jan. 3, 2020, 2 pages.
Corrected Notice of Allowance received for U.S. Appl. No. 15/554,204, mailed on Aug. 19, 2020, 3 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 16/401,934, mailed on Dec. 23, 2021, 3 pages.
Corrected Notice of Allowance received for U.S. Appl. No. 16/401,934, mailed on Feb. 28, 2022, 3 pages.
Corrected Notice of Allowance received for U.S. Appl. No. 16/418,786, mailed on Jan. 5, 2022, 3 pages.
Corrected Notice of Allowance received for U.S. Appl. No. 16/418,786, mailed on Jun. 23, 2022, 2 pages.
Corrected Notice of Allowance received for U.S. Appl. No. 16/582,020, mailed on Aug. 11, 2021, 2 pages.
Corrected Notice of Allowance received for U.S. Appl. No. 16/935,002, mailed on Jul. 17, 2023, 5 pages.
Corrected Notice of Allowance received for U.S. Appl. No. 16/935,002, mailed on Mar. 2, 2023, 2 pages.
Corrected Notice of Allowance received for U.S. Appl. No. 16/935,002, mailed on Mar. 28, 2023, 2 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/341,839, mailed on Oct. 26, 2022, 2 pages.
Corrected Notice of Allowance received for U.S. Appl. No. 17/373,163, mailed on Jul. 15, 2022, 5 pages.
Corrected Notice of Allowance received for U.S. Appl. No. 17/373,163, mailed on Jun. 27, 2022, 5 pages.
Corrected Notice of Allowance received for U.S. Appl. No. 17/515,143, mailed on Mar. 29, 2023, 2 pages.
Corrected Notice of Allowance received for U.S. Appl. No. 17/941,962, mailed on Apr. 14, 2023, 6 pages.
Corrected Notice of Allowance received for U.S. Appl. No. 17/941,962, mailed on Aug. 3, 2023, 2 pages.
Cyr, Jim, "Apple Watch—Customize Modular Watch Face", available online at: https://www.youtube.com/watch?v=02W93HbKIK8, May 13, 2015, 2 pages.
Dan, "Get This Look: 'Minimal' Zooper Widget", Online Available at: https://www.androidguys.com/featured/customize/get-look-minimal-zooper-widget/, Mar. 7, 2014, 2 pages.

(56) References Cited

OTHER PUBLICATIONS

Decision on Acceptance received for Australian Patent Application No. 2015298710. mailed on Jul. 19, 2019, 18 pages.
Decision on Acceptance received for Australian Patent Application No. 2018201089, mailed on Apr. 20, 2021, 28 pages.
Decision on Appeal received for U.S. Appl. No. 14/815,890, mailed on Nov. 24, 2020, 13 pages.
Decision on Appeal received for U.S. Appl. No. 14/846,511, mailed on Dec. 29, 2021, 20 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Danish Patent Application No. PA201670320, mailed on Oct. 18, 2018, 2 pages.
Decision to Grant received for Danish Patent Application No. PA201770397, mailed on Feb. 6, 2018, 2 pages.
Decision to Grant received for Danish Patent Application No. PA201770791, mailed on Jul. 7, 2020, 2 pages.
Decision to Grant received for Danish Patent Application No. PA201970596, mailed on Feb. 26, 2021, 2 pages.
Decision to Grant received for Danish Patent Application No. PA201970597, mailed on Aug. 19, 2021, 2 pages.
Decision to Grant received for Danish Patent Application No. PA202070609, mailed on May 3, 2021, 2 pages.
Decision to Grant received for European Patent Application No. 15730925.3, mailed on Dec. 9, 2021, 2 pages.
Decision to Grant received for European Patent Application No. 15747595.5, mailed on Jul. 16, 2020, 2 pages.
Decision to Grant received for European Patent Application No. 16762356.0, mailed on Apr. 26, 2022, 2 pages.
Decision to Grant received for European Patent Application No. 17206177.2, mailed on Aug. 6, 2020, 2 pages.
Decision to Grant received for European Patent Application No. 20185974.1, mailed on Aug. 19, 2022, 3 pages.
Decision to Grant received for European Patent Application No. 20761084.1, mailed on Jul. 27, 2023, 4 pages.
Decision to Grant received for European Patent Application No. 21169911.1, mailed on Jun. 29, 2023, 3 pages.
Decision to Grant received for European Patent Application No. 21177569.7, mailed on Apr. 6, 2023, 3 pages.
Decision to Refuse received for European Patent Application No. 15730924.6, mailed on Mar. 15, 2019, 12 pages.
Decision to Refuse received for Japanese Patent Application No. 2020-159824, mailed on Sep. 30, 2022, 6 pages.
"Deluxe Moon—Guide", available online at: https://web.archive.org/web/20130520161057/http://www.lifewaresolutions.com/deluxe_moon_guide_ip.html, May 20, 2013, 5 pages.
"Digital alarm clock app for Android, Goggle play store digital alarm clock description page", Mar. 25, 2015, 3 pages.
Droid Life, "20+ Galaxy S9, S9+ Tips and Tricks", Available Online at: https://www.youtube.com/watch?v=sso0mYTfV6w, Mar. 22, 2018, pp. 1-33.
Droid Life, "How to: Use Always-on Apps with Android Wear", Available online at: https://www.youtube.com/watch?v=_-xYB9EBTaA, Jun. 26, 2015, 3 pages.
Ebpman Tech Reviews, "LG G3 Tips: How to customize the clock face", Available online at: https://www.youtube.com/watch?v=evraMWFb1fY, Jul. 25, 2014, 1 page.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
"Ergonomic requirements for office work with visual display terminals (VDTs)", Part 13: User guidance. International Standard ISO, Zuerich, CH, vol. 9241-13, Jul. 15, 1998, 40 pages.
European Search Report received for European Patent Application No. 17206177.2, mailed on Apr. 30, 2018, 4 pages.
European Search Report received for European Patent Application No. 20172197.4, mailed on Jul. 28, 2020, 4 pages.
Evgenyevich Sergey, "Earth & Moon in HD Gyro 3D", Available at <https://www.youtube.com/watch?v=IRwNcaSYrls/>, Dec. 1, 2013, 2 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/833,014, mailed on Nov. 2, 2017, 48 pages.
Examiner's Answer to Appeal Brief received for U.S. Appl. No. 14/846,511, mailed on Jun. 14, 2021, 15 pages.
Examiner's Answer to Appeal Brief received for U.S. Appl. No. 15/405,122, mailed on Jan. 11, 2023, 16 pages.
Examiner's Answer to Appeal Brief received for U.S. Appl. No. 16/861,651, mailed on Jan. 18, 2023, 16 pages.
Extended European Search Report received for European Patent Application No. 16762356.0, mailed on Nov. 9, 2018, 10 pages.
Extended European Search Report received for European Patent Application No. 16837432.0, mailed on Mar. 11, 2019, 10 pages.
Extended European Search Report received for European Patent Application No. 17810723.1, mailed on Nov. 12, 2019, 9 pages.
Extended European Search Report received for European Patent Application No. 20185974.1, mailed on Oct. 28, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.
Extended European Search Report received for European Patent Application No. 22173249.8, mailed on Aug. 19, 2022, 15 pages.
Extended European Search Report received for European Patent Application No. 22188724.3, mailed on Mar. 2, 2023, 14 pages.
Feist, Jonathan, "Android customization—how to create a custom clock widget using Zooper Widget", Available Online at: https://www.androidauthority.com/zooper-widget-clock-366476/, May 15, 2014, 10 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, mailed on Feb. 26, 2018, 20 pages.
Final Office Action received for U.S. Appl. No. 14/815,890, mailed on May 14. 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016. 19 pages.
Final Office Action received for U.S. Appl. No. 14/821,667, mailed on Apr. 26. 2018. 13 pages.
Final Office Action received for U.S. Appl. No. 14/822,769, mailed on Jan. 4, 2018, 25 pages.
Final Office Action received for U.S. Appl. No. 14/833,014, mailed on Oct. 26, 2016, 32 pages.
Final Office Action received for U.S. Appl. No. 14/841,402, mailed on Aug. 25, 2017, 17 pages.
Final Office Action received for U.S. Appl. No. 14/841,606, mailed on Sep. 7, 2018, 34 pages.
Final Office Action received for U.S. Appl. No. 14/846,511, mailed on May 10, 2018, 21 pages.
Final Office Action received for U.S. Appl. No. 14/846,511, mailed on Aug. 11, 2020, 25 pages.
Final Office Action received for U.S. Appl. No. 14/846,511, mailed on Jun. 5, 2019, 24 pages.
Final Office Action received for U.S. Appl. No. 15/352,215, mailed on Mar. 7, 2019, 22 pages.
Final Office Action received for U.S. Appl. No. 15/405,122, mailed on Jan. 21, 2020, 36 pages.
Final Office Action received for U.S. Appl. No. 15/405,122, mailed on Nov. 5, 2021, 45 pages.
Final Office Action received for U.S. Appl. No. 15/421,865, mailed on Dec. 2, 2019, 19 pages.
Final Office Action received for U.S. Appl. No. 15/421,865, mailed on Jul. 12, 2022, 27 pages.

(56) References Cited

OTHER PUBLICATIONS

Final Office Action received for U.S. Appl. No. 15/421,865, mailed on Mar. 19, 2021, 20 pages.
Final Office Action received for U.S. Appl. No. 15/554,204, mailed on Oct. 31, 2019, 22 pages.
Final Office Action received for U.S. Appl. No. 15/798,235, mailed on Oct. 9, 2018, 45 pages.
Final Office Action received for U.S. Appl. No. 15/798,235, mailed on Oct. 18, 2019, 25 pages.
Final Office Action received for U.S. Appl. No. 15/881,544, mailed on Jan. 29, 2019, 14 pages.
Final Office Action received for U.S. Appl. No. 16/389,722, mailed on Dec. 6, 2021, 19 pages.
Final Office Action received for U.S. Appl. No. 16/389,722, mailed on Dec. 8, 2020, 18 pages.
Final Office Action received for U.S. Appl. No. 16/389,722, mailed on Mar. 17, 2023, 14 pages.
Final Office Action received for U.S. Appl. No. 16/401,934, mailed on Jun. 14, 2021, 30 pages.
Final Office Action received for U.S. Appl. No. 16/418,786, mailed on Jan. 13, 2021, 14 pages.
Final Office Action received for U.S. Appl. No. 16/582,020, mailed on Apr. 28, 2020, 31 pages.
Final Office Action received for U.S. Appl. No. 16/584,281, mailed on Apr. 15, 2020, 26 pages.
Final Office Action received for U.S. Appl. No. 16/585,721, mailed on Apr. 1, 2020, 28 pages.
Final Office Action received for U.S. Appl. No. 16/861,651, mailed on Apr. 20, 2021, 14 pages.
Final Office Action received for U.S. Appl. No. 16/861,651, mailed on Jan. 26, 2022, 16 pages.
Final Office Action received for U.S. Appl. No. 16/935,002, mailed on Jan. 5, 2022, 25 pages.
Final Office Action received for U.S. Appl. No. 16/943,737, mailed on Feb. 4, 2022, 24 pages.
Final Office Action received for U.S. Appl. No. 16/997,588, mailed on Mar. 30, 2021, 23 pages.
Final Office Action received for U.S. Appl. No. 17/031,671, mailed on Nov. 15, 2022, 27 pages.
Final Office Action received for U.S. Appl. No. 17/031,671, mailed on Sep. 7, 2021, 27 pages.
Final Office Action received for U.S. Appl. No. 17/031,765, mailed on Oct. 29, 2021, 34 pages.
Final Office Action received for U.S. Appl. No. 17/031,765, mailed on Sep. 12, 2022, 37 pages.
Final Office Action received for U.S. Appl. No. 17/041,350, mailed on Sep. 17, 2021, 25 pages.
Final Office Action received for U.S. Appl. No. 17/068,386, mailed on Mar. 3, 2022, 29 pages.
Final Office Action received for U.S. Appl. No. 17/068,386, mailed on May 8, 2023, 23 pages.
Final Office Action received for U.S. Appl. No. 17/158,936, mailed on Apr. 7, 2023, 18 pages.
Final Office Action received for U.S. Appl. No. 17/341,839, mailed on Jul. 18, 2022, 15 pages.
Final Office Action received for U.S. Appl. No. 17/546,630, mailed on Jun. 27, 2023, 31 pages.
Final Office Action received for U.S. Appl. No. 17/591,184, mailed on Dec. 23, 2022, 10 pages.
Final Office Action received for U.S. Appl. No. 17/681,584, mailed on Apr. 20, 2023, 15 pages.
Final Office Action received for U.S. Appl. No. 17/713,016, mailed on Mar. 15, 2023, 6 pages.
Final Office Action received for U.S. Appl. No. 17/746,807, mailed on Apr. 26, 2023, 16 pages.
Final Office Action received for U.S. Appl. No. 17/947,530, mailed on Jul. 13, 2023, 17 pages.
Final Office Action received for U.S. Appl. No. 17/949,081, mailed on Jun. 5, 2023, 23 pages.
Final Office Action received for U.S. Appl. No. 14/815,879, mailed on Mar. 24, 2016, 46 pages.
Final Office Action received for U.S. Appl. No. 14/822,769, mailed on Nov. 9, 2016, 18 pages.
First Action Interview received for U.S. Appl. No. 14/815,890, mailed on Aug. 12, 2016, 3 pages.
"Fitbit surge Fitness Watch", Manual version 1.0, May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda, Kazuhiro, "Xperia Z1 Perfect Manual", Sotec Co., Ltd., No. 1, Nov. 15, 2013, pp. 217-218.
Gauging Gadgets, "How to Customize Watch Faces—Garmin Venu Tutorial", Online Available at: https://www.youtube.com/watch?v=dxajKKulaP0, Jan. 7, 2020, 14 pages.
Gazer, "iPhone 4S Super Manual", Shuwa System Co., Saito Kazukuni, vol. 1, Jun. 6, 2013, 7 pages.
Geary, David, "Programming HTML5 Canvas", O'Reilly Japan, Inc., No. 1, Jul. 23, 2014, pp. 327-330.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
"Google Earth 7.0.1.8244", retrieved from the Internet: http://dl.google.com/dl/earth/client/ge7/release_7_0_1/googleearth-winbundle-7.0.1.8244.exe, Oct. 29, 2012, 1 page.
"Google Earth on Android—AndroidCentral.com", Available online at: https://www.youtube.com/watch?v=1WxN1RunrE4, Feb. 22, 2010, 1 page.
Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.
Gottabemobile, "How to Change Watch Faces on Android Wear", available online at URL: https://www.youtube.com/watch?v=B8iRGkGq6a8, Jul. 9, 2014, 4 pages.
Hoffman, Chris, "5+ Cool Uses for Android's Daydream Mode", Online Available at: https://www.howtogeek.com/170990/5-cool-uses-for-androids-daydream-mode/, Jul. 12, 2017, 8 pages.
Hoffman, Chris, "5+ Cool Uses for Android's Daydream Mode", retrieved from—https://www.howtogeek.com/170990/5-cool-uses-for-androids-daydream-mode, Jul. 12, 2017, 8 pages.
Horowitz, Paul, "Always Show Scroll Bars in Mac OS X", OS X Daily, available online at: URL: http: jjosxdaily.com/2011/08/03/show-scroll-bars-mac-os-x-lion/, Aug. 3, 2011, 7 pages.
Ilovex, "Stripe Generator, a tool that makes it easy to create striped materials", Online available at: https://www.ilovex.co.jp/blog/system/webconsulting/stripe-generator.html, May 2, 2012, 3 pages.
"Instruction Manual, Detailed version", KDDI Corporation, No. 1, vol. 1, June 2014, 4 pages.
Intention to Grant received for Danish Patent Application No. PA201570496, mailed on Feb. 17, 2016, 6 pages.
Intention to Grant received for Danish Patent Application No. PA201570563, mailed on Mar. 17, 2016, 7 pages.
Intention to Grant received for Danish Patent Application No. PA201670320, mailed on May 17, 2018, 2 pages.
Intention to Grant received for Danish Patent Application No. PA201770397, mailed on Aug. 18, 2017, 7 pages.
Intention to Grant received for Danish Patent Application No. PA201770791, mailed on Feb. 19, 2020, 2 pages.
Intention to Grant received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for Danish Patent Application No. PA202070609, mailed on Jan. 14, 2021, 2 pages.
Intention to Grant received for Danish Patent Application No. PA202070623, mailed on Jul. 20, 2022, 2 pages.

(56) References Cited

OTHER PUBLICATIONS

Intention to Grant received for European Patent Application No. 15730925.3, mailed on Aug. 16, 2021, 10 pages.
Intention to Grant received for European Patent Application No. 15730925.3, mailed on May 28, 2020, 10 pages.
Intention to Grant received for European Patent Application No. 15747595.5, mailed on Feb. 17, 2020, 8 pages.
Intention to Grant received for European Patent Application No. 16762356.0, mailed on Dec. 23, 2021, 8 pages.
Intention to Grant received for European Patent Application No. 16837432.0, mailed on Apr. 14, 2023, 8 pages.
Intention to Grant received for European Patent Application No. 17206177.2, mailed on Feb. 24, 2020, 8 pages.
Intention to Grant received for European Patent Application No. 17810723.1, mailed on Dec. 16, 2022, 9 pages.
Intention to Grant received for European Patent Application No. 17810723.1, mailed on Jun. 12, 2023, 9 pages.
Intention to Grant received for European Patent Application No. 20185974.1, mailed on Apr. 28, 2022, 8 pages.
Intention to Grant received for European Patent Application No. 20729346.5, mailed on Jul. 10, 2023, 9 pages.
Intention to Grant received for European Patent Application No. 20761084.1, mailed on Mar. 27, 2023, 10 pages.
Intention to Grant received for European Patent Application No. 21169911.1, mailed on Mar. 6, 2023, 9 pages.
Intention to Grant received for European Patent Application No. 21177569.7, mailed on Oct. 27, 2022, 8 pages.
International Preliminary Report on Patentability received for PCT Patent Application No. PCT/US2016/037686, mailed on Mar. 1, 2018, 12 pages.
International Preliminary Report on Patentability received for PCT Patent Application No. PCT/US2015/034604, mailed on Feb. 16, 2017, 21 pages.
International Preliminary Report on Patentability received for PCT Patent Application No. PCT/US2015/034606, mailed on Feb. 16, 2017, 11 pages.
International Preliminary Report on Patentability received for PCT Patent Application No. PCT/US2015/034607, mailed on Feb. 16, 2017, 18 pages.
International Preliminary Report on Patentability received for PCT Patent Application No. PCT/US2015/044473, mailed on Mar. 2, 2017, 20 pages.
International Preliminary Report on Patentability received for PCT Patent Application No. PCT/US2015/044485, mailed on Mar. 2, 2017, 20 pages.
International Preliminary Report on Patentability received for PCT Patent Application No. PCT/US2015/044517, mailed on Mar. 16, 2017, 10 pages.
International Preliminary Report on Patentability received for PCT Patent Application No. PCT/US2015/046262, mailed on Mar. 16, 2017, 26 pages.
International Preliminary Report on Patentability received for PCT Patent Application No. PCT/US2015/053353, mailed on Sep. 21, 2017, 15 pages.
International Preliminary Report on Patentability received for PCT Patent Application No. PCT/US2015/054223, mailed on Dec. 14, 2017, 18 pages.
International Preliminary Report on Patentability received for PCT Patent Application No. PCT/US2016/017271, mailed on Sep. 21, 2017, 13 pages.
International Preliminary Report on Patentability received for PCT Patent Application No. PCT/US2016/021403, mailed on Sep. 21, 2017, 21 pages.
International Preliminary Report on Patentability received for PCT Patent Application No. PCT/US2016/035090, mailed on Dec. 14, 2017, 14 pages.
International Preliminary Report on Patentability received for PCT Patent Application No. PCT/US2017/034834, mailed on Dec. 20, 2018, 9 pages.
International Preliminary Report on Patentability received for PCT Patent Application No. PCT/US2018/032164, mailed on Nov. 21, 2019, 11 pages.
International Preliminary Report on Patentability received for PCT Patent Application No. PCT/US2019/030770, mailed on Nov. 19, 2020, 14 pages.
International Preliminary Report on Patentability received for PCT Patent Application No. PCT/US2020/030079, mailed on Nov. 18, 2021, 12 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/031575, mailed on Nov. 18, 2021, 9 pages.
International Preliminary Report on Patentability received for PCT Patent Application No. PCT/US2020/045814, mailed on Mar. 17, 2022, 12 pages.
International Preliminary Report on Patentability received for PCT Patent Application No. PCT/US2021/031212, mailed on Nov. 24, 2022, 16 pages.
International Preliminary Report on Patentability received for PCT Patent Application No. PCT/US2021/031669, mailed on Nov. 24, 2022, 12 pages.
International Search Report and Written Opinion received for PCT Patent Application No. PCT/US2015/034604, mailed on Nov. 9, 2015, 30 pages.
International Search Report and Written Opinion received for PCT Patent Application No. PCT/US2015/034606, mailed on Dec, 2, 2015, 17 pages.
International Search Report and Written Opinion received for PCT Patent Application No. PCT/US2015/044473, mailed on Feb. 12, 2016, 24 pages.
International Search Report and Written Opinion received for PCT Patent Application No. PCT/US2015/044485, mailed on Feb. 9, 2016, 27 pages.
International Search Report and Written Opinion received for PCT Patent Application No. PCT/US2015/044517, mailed on Oct. 28, 2015, 13 pages.
International Search Report and Written Opinion received for PCT Patent Application No. PCT/US2015/046262, mailed on Mar. 15, 2016, 34 pages.
International Search Report and Written Opinion received for PCT Patent Application No. PCT/US2015/053353, mailed on May 9, 2016, 21 pages.
International Search Report and Written Opinion received for PCT Patent Application No. PCT/US2015/054223, mailed on Jul. 6, 2016, 25 pages.
International Search Report and Written Opinion received for PCT Patent Application No. PCT/US2016/017271, mailed on Sep. 1, 2016, 18 pages.
International Search Report and Written Opinion received for PCT Patent Application No. PCT/US2016/021403, mailed on May 12, 2016, 23 pages.
International Search Report and Written Opinion received for PCT Patent Application No. PCT/US2016/035090, mailed on Oct. 4, 2016, 17 pages.
International Search Report and Written Opinion received for PCT Patent Application No. PCT/US2016/037686, mailed on Sep. 9, 2016, 19 pages.
International Search Report and Written Opinion received for PCT Patent Application No. PCT/US2017/034834, mailed on Aug. 23, 2017, 10 pages.
International Search Report and Written Opinion received for PCT Patent Application No. PCT/US2018/032164, mailed on Oct. 18, 2018, 16 pages.
International Search Report and Written Opinion received for PCT Patent Application No. PCT/US2019/030770, mailed on Oct. 31, 2019, 23 pages.
International Search Report and Written Opinion received for PCT Patent Application No. PCT/US2020/030079, mailed on Sep. 4, 2020, 18 pages.

(56) References Cited

OTHER PUBLICATIONS

International Search Report and Written Opinion received for PCT Patent Application No. PCT/US2020/031536, mailed on Sep. 23, 2020, 16 pages.
International Search Report and Written Opinion received for PCT Patent Application No. PCT/US2020/031575, mailed on Aug. 20, 2020, 14 pages.
International Search Report and Written Opinion received for PCT Patent Application No. PCT/US2020/045814, mailed on Jan. 20, 2021, 16 pages.
International Search Report and Written Opinion received for PCT Patent Application No. PCT/US2021/031212, mailed on Sep. 21, 2021, 21 pages.
International Search Report and Written Opinion received for PCT Patent Application No. PCT/US2021/031669, mailed on Oct. 13, 2021, 17 pages.
International Search Report and Written Opinion received for PCT Patent Application No. PCT/US2022/026371, mailed on Oct. 12, 2022, 16 pages.
International Search Report and Written Opinion received for PCT Patent Application No. PCT/US2022/029279, mailed on Nov. 9, 2022, 16 pages.
International Search Report and Written Opinion received for PCT Patent Application No. PCT/US2023/011151, mailed on Jul. 5, 2023, 20 pages.
International Search Report and Written Opinion received for PCT Patent Application No. PCT/US2015/034607, mailed on Dec. 1, 2015, 23 pages.
Internet Blog Post, "[PC] Pre-Customization of Black Desert's Characters", Online Available at: <https://blog.naver.com/hsh6051/220209813968>, Dec. 14, 2014, 41 pages.
Inventerium, "Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604, mailed on Sep. 4, 2015, 6 pages.
Invitation to Additional Fees and Partial International Search Report received for PCT Patent Application No. PCT/US2015/034606, mailed on Sep. 9, 2015, 6 pages.
Invitation to Pay Additional Fee received for European Patent Application No. 15747595.5, mailed on Feb. 9, 2018, 6 pages.
Invitation to Pay Additional Fees and Partial International Search Report received for PCT Patent Application No. PCT/US2022/029279, mailed on Sep. 15, 2022, 9 pages.
Invitation to Pay Additional Fees and Partial International Search Report received for PCT Patent Application No. PCT/US2023/011151, mailed on May 12, 2023, 13 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/044473, mailed on Nov. 3, 2015, 5 pages.
Invitation to Pay Additional Fees received for PCT Patent Application No. PCT/US2015/044485, mailed on Nov. 3, 2015, 7 pages.
Invitation to Pay Additional Fees received for PCT Patent Application No. PCT/US2015/046262, mailed on Nov. 23, 2015, 7 pages.
Invitation to Pay Additional Fees received for PCT Patent Application No. PCT/US2015/053353, mailed on Jan. 21, 2016, 7 pages.
Invitation to pay Additional Fees received for PCT Patent Application No. PCT/US2015/054223, mailed on Mar. 9, 2016, 9 pages.
Invitation to Pay Additional Fees received for PCT Patent Application No. PCT/US2016/017271, mailed on May 25, 2016, 7 pages.
Invitation to Pay Additional Fees received for PCT Patent Application No. PCT/US2016/035090, mailed on Jul. 15, 2016, 2 pages.
Invitation to Pay Additional Fees received for PCT Patent Application No. PCT/US2018/032164, mailed on Aug. 21, 2018, 10 pages.
Invitation to Pay Additional Fees received for PCT Patent Application No. PCT/US2019/030770, mailed on Jul. 26, 2019, 12 pages.
Invitation to Pay Additional Fees received for PCT Patent Application No. PCT/US2020/030079, mailed on Jul. 14, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/045814, mailed on Nov. 18, 2020, 11 pages.
Invitation to Pay Additional Fees received for PCT Patent Application No. PCT/US2021/031212, mailed on Jul. 28, 2021, 19 pages.
Invitation to Pay Additional Fees received for PCT Patent Application No. PCT/US2021/031669, mailed on Aug. 19, 2021, 9 pages.
Invitation to Pay Additional Fees received for PCT Patent Application No. PCT/US2022/026371. mailed on Aug. 18, 2022, 9 pages.
Invitation to Pay Search Fees received for European Patent Application No. 20730136.7, mailed on Jul. 1, 2022, 4 pages.
Invitation to Pay Search Fees received for European Patent Application No. 20761084.1, mailed on Dec. 7, 2021, 3 pages.
Jahpizzie, "Brightness on Lock Screen", Online Available at: https://www.reddit.com/r/galaxys10/comments/b4d5fb/brightness_on_lock_screen/, 2019, 1 page.
Jean, "Our Pact Parental Control Review", Available online at : https://www.bewebsmart.com/parental-controls/our-pact-parental-control-review/, Jun. 25, 2016, 25 pages.
Jurick et al., "iPhone Hacks", Tips & Tools for Unlocking the Power of Your iPhone & iPod touch, Online:URL: https://api.pageplace.de/preview/DT0400.9780596550974_A23629666/preview-9780596550974_A23629666.pdf >, Apr. 2009, 49 pages.
Kasai, Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages.
Kenney, Briley, "How to Customize a Smartwatch and other Personalization Questions", Available online at: <https://smartwatches.org/learn/customize-smartwatch/>, Jan. 23, 2014, 3 pages.
"Kidizoom Smartwatch", Available online at <URL: https://www.vtechnl.com/media/downloads/Kidizoom-Smart-Watch.pdf>, Jun. 24, 2014, 23 pages.
Lee et al., "PASS: Reducing Redundant Notifications between a Smartphone and a Smartwatch for Energy Saving", IEEE Transactions on Mobile Computing, vol. 19, No. 11, Jul. 23, 2019, pp. 2656-2669.
Lein et al., "Patternizer", Available online at: https://patternizer.com/, Apr. 2016, 5 pages.
"Link to Wayback Machine with link to Google Play showing different layouts of complications associated with a clock face", Available online at <https://play.google.com/store/apps/details?id=com.levelup.beautifulwidgets.free&hl=da >, Sep. 9, 2013, 6 pages.
"Living Earth", available at: http://www.livingcarthapp.com/, 2014, 6 pages.
"Looking for a Launcher That Changes the Default Homescreen or Widgets Based on Wifi, Location, or Other Context", Online Available at: https://www.reddit.com/r/androidapps/comments/35lu90/looking_for_a_launcher_that_changes_the_default/, 2015, 2 pages.
Lynagh, Kevin, "The Weathertron", Online available at: https://kevinlynagh.com/weathertron, Jul. 20, 2016, 6 pages.
Lyons, Kent, "Smartwatch Innovation: Exploring a Watch-First Model", Pervasive Computing, Jan. 2016, pp. 10-13.
Minutes of the Oral Proceedings received for European Patent Application No. 15730924.6, mailed on Mar. 13, 2019, 4 pages.
Minutes of the Oral Proceedings received for European Patent Application No. 15730925.3, mailed on May 26, 2020, 11 pages.
Minutes of the Oral Proceedings received for European Patent Application No. 16762356.0, mailed on Dec. 17, 2021, 5 pages.
Minutes of the Oral Proceedings received for European Patent Application No. 17810723.1. mailed on Dec. 9, 2022, 7 pages.
Minutes of the Oral Proceedings received for European Patent Application No. 20729346.5, mailed on Jul. 4, 2023, 6 pages.
"MS Excel 2013", Jan. 29, 2013, 2 pages.
My Mate Vince, "Setting up the Fitbit Alta HR Activity Tracker on Apple iOS", Online available at: <https://youtu.be/FdwRF4lfvFc>, Jun. 18, 2017, 3 pages.
Nerdtalk, "The Best Android Clock Widgets", available at: https://www.youtube.com/watch?v=E1bAprWByfU, Apr. 25, 2011, 1 page.

(56) References Cited

OTHER PUBLICATIONS

"New, but unsigned—Easy StopWatch for Symbian", XP55393563, Available online at <http://www.allaboutsymbian.com/flow/item/19490_New_but unsigned-Easy_StopWatc.php>, Mar. 15, 2014, 15 pages.

"Night Display (Alarm Clock) App", Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.

Non-Final Office Action received for U.S. Appl. No. 14/815,890, mailed on Jun. 6, 2017, 19 pages.

Non-Final Office Action received for U.S. Appl. No. 14/815,890, mailed on Oct. 19, 2015, 5 pages.

Non-Final Office Action received for U.S. Appl. No. 14/822,769, mailed on Feb. 5, 2016, 14 pages.

Non-Final Office Action received for U.S. Appl. No. 14/833,014, mailed on Mar. 21, 2016, 26 pages.

Non-Final Office Action received for U.S. Appl. No. 15/881,544, mailed on Jun. 7, 2018, 15 pages.

Non-Final Office Action received for U.S. Appl. No. 15/421,865, mailed on Mar. 21, 2019, 18 pages.

Non-Final Office Action received for U.S. Appl. No. 15/554,204, mailed on Apr. 17, 2019, 19 pages.

Non-Final Office Action received for U.S. Appl. No. 14/815,879, mailed on Dec. 15, 2016, 33 pages.

Non-Final Office Action received for U.S. Appl. No. 14/815,890, mailed on Dec. 18, 2018, 21 pages.

Non-Final Office Action received for U.S. Appl. No. 14/821,667, mailed on Feb. 4, 2019, 13 pages.

Non-Final Office Action received for U.S. Appl. No. 14/821,667, mailed on Jul. 14, 2017, 12 pages.

Non-Final Office Action received for U.S. Appl. No. 14/822,769, mailed on Jun. 29, 2016, 14 pages.

Non-Final Office Action received for U.S. Appl. No. 14/822,769, mailed on May 4, 2017, 21 pages.

Non-Final Office Action received for U.S. Appl. No. 14/822,769, mailed on May 24, 2018, 30 pages.

Non-Final Office Action received for U.S. Appl. No. 14/839,889, mailed on Mar. 7, 2017, 26 pages.

Non-Final Office Action received for U.S. Appl. No. 14/841,402, mailed on Jan. 25, 2017, 18 pages.

Non-Final Office Action received for U.S. Appl. No. 14/841,606, mailed on Dec. 7, 2017, 30 pages.

Non-Final Office Action received for U.S. Appl. No. 14/841,606, mailed on May 8, 2019, 28 pages.

Non-Final Office Action received for U.S. Appl. No. 14/846,511 mailed on Jan. 7, 2020, 25 pages.

Non-Final Office Action received for U.S. Appl. No. 14/846,511 mailed on Oct. 27, 2017, 15 pages.

Non-Final Office Action received for U.S. Appl. No. 15/183,663, mailed on Jul. 9, 2018, 13 pages.

Non-Final Office Action received for U.S. Appl. No. 15/352,215, mailed on Sep. 20, 2018, 31 pages.

Non-Final Office Action received for U.S. Appl. No. 15/355,956, mailed on May 31, 2019, 32 pages.

Non-Final Office Action received for U.S. Appl. No. 15/405,122, mailed on Apr. 2, 2021, 35 pages.

Non-Final Office Action received for U.S. Appl. No. 15/405,122, mailed on May 31, 2019, 43 pages.

Non-Final Office Action received for U.S. Appl. No. 15/405,122, mailed on Sep. 24, 2020, 30 pages.

Non-Final Office Action received for U.S. Appl. No. 15/421,865, mailed on Dec. 29, 2021, 23 pages.

Non-Final Office Action received for U.S. Appl. No. 15/421,865, mailed on Jul. 11, 2023, 32 pages.

Non-Final Office Action received for U.S. Appl. No. 15/421,865, mailed on Oct. 7, 2020, 20 pages.

Non-Final Office Action received for U.S. Appl. No. 15/798,235, mailed on Apr. 24, 2019, 25 pages.

Non-Final Office Action received for U.S. Appl. No. 15/798,235, mailed on Mar. 14, 2018, 58 pages.

Non-Final Office Action received for U.S. Appl. No. 16/389,722, mailed on Apr. 3, 2020, 15 pages.

Non-Final Office Action received for U.S. Appl. No. 16/389,722, mailed on Jul. 7, 2022, 16 pages.

Non-Final Office Action received for U.S. Appl. No. 16/389,722, mailed on Jun. 3, 2021, 17 pages.

Non-Final Office Action received for U.S. Appl. No. 16/401,934, mailed on Dec. 11, 2020, 26 pages.

Non-Final Office Action received for U.S. Appl. No. 16/418,786, mailed on Apr. 24, 2020, 16 pages.

Non-Final Office Action received for U.S. Appl. No. 16/418,786, mailed on Aug. 1, 2022, 18 pages.

Non-Final Office Action received for U.S. Appl. No. 16/418,786, mailed on Mar. 28, 2022, 14 pages.

Non-Final Office Action received for U.S. Appl. No. 16/418,786, mailed on Oct. 4, 2021, 10 pages.

Non-Final Office Action received for U.S. Appl. No. 16/582,020, mailed on Apr. 5, 2021, 29 pages.

Non-Final Office Action received for U.S. Appl. No. 16/582,020, mailed on Jan. 13, 2020, 39 pages.

Non-Final Office Action received for U.S. Appl. No. 16/584,281, mailed on Dec. 10, 2019, 23 pages.

Non-Final Office Action received for U.S. Appl. No. 16/584,445, mailed on Dec. 26, 2019, 19 pages.

Non-Final Office Action received for U.S. Appl. No. 16/585,399, mailed on Jan. 23, 2020, 28 pages.

Non-Final Office Action received for U.S. Appl. No. 16/585,714, mailed on Apr. 16, 2020, 18 pages.

Non-Final Office Action received for U.S. Appl. No. 16/585,721, mailed on Dec. 27, 2019, 25 pages.

Non-Final Office Action received for U.S. Appl. No. 16/659,507, mailed on Oct. 7, 2020, 16 pages.

Non-Final Office Action received for U.S. Appl. No. 16/861,651, mailed on Nov. 27, 2020, 11 pages.

Non-Final Office Action received for U.S. Appl. No. 16/861,651, mailed on Sep. 30, 2021, 16 pages.

Non-Final Office Action received for U.S. Appl. No. 16/935,002, mailed on Jun. 25, 2021, 20 pages.

Non-Final Office Action received for U.S. Appl. No. 16/943,737, mailed on Jun. 25, 2021, 18 pages.

Non-Final Office Action received for U.S. Appl. No. 16/943,737, mailed on Mar. 28, 2023, 28 pages.

Non-Final Office Action received for U.S. Appl. No. 16/997,588, mailed on Dec. 14, 2020, 21 pages.

Non-Final Office Action received for U.S. Appl. No. 17/031,654, mailed on Nov. 19, 2020, 12 pages.

Non-Final Office Action received for U.S. Appl. No. 17/031,671, mailed on Apr. 1, 2022, 32 pages.

Non-Final Office Action received for U.S. Appl. No. 17/031.671, mailed on Apr. 30, 2021, 27 pages.

Non-Final Office Action received for U.S. Appl. No. 17/031,671, mailed on Mar. 17, 2023, 34 pages.

Non-Final Office Action received for U.S. Appl. No. 17/031,765, mailed on Jun. 28, 2021, 32 pages.

Non-Final Office Action received for U.S. Appl. No. 17/031,765, mailed on Mar. 28, 2023, 31 pages.

Non-Final Office Action received for U.S. Appl. No. 17/031,765, mailed on Mar. 29, 2022, 33 pages.

Non-Final Office Action received for U.S. Appl. No. 17/041,350, mailed on Jun. 10, 2021, 24 pages.

Non-Final Office Action received for U.S. Appl. No. 17/068,386, mailed on Jan. 30, 2023, 20 pages.

Non-Final Office Action received for U.S. Appl. No. 17/068,386, mailed on Jul. 15, 2021, 16 pages.

Non-Final Office Action received for U.S. Appl. No. 17/068,386, mailed on Oct. 28, 2021, 20 pages.

Non-Final Office Action received for U.S. Appl. No. 17/158,936, mailed on Nov. 30, 2022, 17 pages.

Non-Final Office Action received for U.S. Appl. No. 17/317,042, mailed on Nov. 10, 2021, 13 pages.

(56) References Cited

OTHER PUBLICATIONS

Non-Final Office Action received for U.S. Appl. No. 17/341,839, mailed on Mar. 17, 2022, 14 pages.
Non-Final Office Action received for U.S. Appl. No. 17/373,163, mailed on Jan. 27, 2022, 14 pages.
Non-Final Office Action received for U.S. Appl. No. 17/546,630, mailed on Mar. 30, 2023, 41 pages.
Non-Final Office Action received for U.S. Appl. No. 17/556,165, mailed on Sep. 7, 2022, 15 pages.
Non-Final Office Action received for U.S. Appl. No. 17/591,184, mailed on Apr. 21, 2023, 15 pages.
Non-Final Office Action received for U.S. Appl. No. 17/591,184, mailed on Aug. 4, 2022, 18 pages.
Non-Final Office Action received for U.S. Appl. No. 17/681,584, mailed on Jan. 18, 2023, 12 pages.
Non-Final Office Action received for U.S. Appl. No. 17/713.016, mailed on Oct. 27, 2022, 25 pages.
Non-Final Office Action received for U.S. Appl. No. 17/717,275, mailed on Jul. 3, 2023, 10 pages.
Non-Final Office Action received for U.S. Appl. No. 17/738,940, mailed on Dec. 22, 2022, 31 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/947,530, mailed on Mar. 31, 2023, 14 pages.
Non-Final Office Action received for U.S. Appl. No. 17/948,578, mailed on Feb. 2, 2023, 13 pages.
Non-Final Office Action received for U.S. Appl. No. 17/949,081, mailed on Feb. 27, 2023, 19 pages.
Non-Final Office Action received for U.S. Appl. No. 17/987,731, mailed on Oct. 5, 2023, 15 pages.
Non-Final Office Action received for U.S. Appl. No. 17/476,286, mailed on Sep. 20, 2022, 24 pages.
Non-Final Office Action received for U.S. Appl. No. 18/118,978, mailed on Sep. 1, 2023, 17 pages.
Non-Final Office Action received for U.S. Appl. No. 14/846,511, mailed on Nov. 30, 2018, 22 pages.
Non-Final Office Action received for U.S. Appl. No. 14/815,879, mailed on Nov. 6, 2015, 35 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Non-Final Office Action received for U.S. Appl. No. 17/078,896, mailed on Dec. 24, 2021, 17 pages.
Notice of Acceptance received for Australian Patent Application No. 2015298710, mailed on Oct. 8, 2019, 3 pages.
Notice of Acceptance received for Australian Patent Application No. 2016229847, mailed on Sep. 12, 2018, 3 pages.
Notice of Acceptance received for Australian Patent Application No. 2017277813, mailed on Jun. 16, 2020, 3 pages.
Notice of Acceptance received for Australian Patent Application No. 2018201089, mailed on May 28, 2021, 3 pages.
Notice of Acceptance received for Australian Patent Application No. 2018279037, mailed on May 13, 2020, 3 pages.
Notice of Acceptance received for Australian Patent Application No. 2019208225, mailed on Jan. 21, 2021, 3 pages.
Notice of Acceptance received for Australian Patent Application No. 2019267413, mailed on Nov. 23, 2021, 3 pages.
Notice of Acceptance received for Australian Patent Application No. 2020204506, mailed on Apr. 8, 2021, 3 pages.
Notice of Acceptance received for Australian Patent Application No. 2020239670, mailed on Jul. 2, 2021, 3 pages.
Notice of Acceptance received for Australian Patent Application No. 2020239749, mailed on May 27, 2022, 3 pages.
Notice of Acceptance received for Australian Patent Application No. 2020239774, mailed on Jan. 5, 2022, 3 pages.
Notice of Acceptance received for Australian Patent Application No. 2020250323, mailed on Feb. 28, 2022, 3 pages.
Notice of Acceptance received for Australian Patent Application No. 2020269232, mailed on Dec. 16, 2021, 3 pages.
Notice of Acceptance received for Australian Patent Application No. 2020309093, mailed on Jul. 8, 2021, 3 pages.
Notice of Acceptance received for Australian Patent Application No. 2021202797, mailed on May 9, 2022, 3 pages.
Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Acceptance received for Australian Patent Application No. 2021203216, mailed on Jul. 26, 2022, 3 pages.
Notice of Acceptance received for Australian Patent Application No. 2021245228, mailed on Oct. 4, 2022, 3 pages.
Notice of Acceptance received for Australian Patent Application No. 2021250863, mailed on Jan. 13, 2023, 3 pages.
Notice of Acceptance received for Australian Patent Application No. 2022201419, mailed on May 31, 2023, 3 pages.
Notice of Acceptance received for Australian Patent Application No. 2022202292, mailed on Jul. 6, 2022, 3 pages.
Notice of Acceptance received for Australian Patent Application No. 2022220279, mailed on Sep. 27, 2022, 3 pages.
Notice of Allowance received for Chinese Patent Application No. 201510479088.4, mailed on Jan. 21, 2021, 2 pages.
Notice of Allowance received for Chinese Patent Application No. 201510481525.6, mailed on May 27, 2019, 2 pages.
Notice of Allowance received for Chinese Patent Application No. 201510483268.X, mailed on Nov. 6, 2019, 2 pages.
Notice of Allowance received for Chinese Patent Application No. 201510483305.7, mailed on Jan. 8, 2019, 3 pages.
Notice of Allowance received for Chinese Patent Application No. 201510484514.3, mailed on Jun. 6, 2019, 2 pages.
Notice of Allowance received for Chinese Patent Application No. 201520594249.X, mailed on Jul. 12, 2016, 4 pages.
Notice of Allowance received for Chinese Patent Application No. 201680013193.1, mailed on May 7, 2021, 5 pages.
Notice of Allowance received for Chinese Patent Application No. 201680047983.1, mailed on Apr. 28, 2021, 3 pages.
Notice of Allowance received for Chinese Patent Application No. 201780033973.7, mailed on Jul. 7, 2021, 5 pages.
Notice of Allowance received for Chinese Patent Application No. 201810037665.8, mailed on Jul. 9, 2019, 4 pages.
Notice of Allowance received for Chinese Patent Application No. 201910906898.1, mailed on Oct. 28, 2021, 4 pages.
Notice of Allowance received for Chinese Patent Application No. 201910924197.0, mailed on Apr. 5, 2023, 3 pages.
Notice of Allowance received for Chinese Patent Application No. 202110194015.6, mailed on Mar. 9, 2022, 6 pages.
Notice of Allowance received for Chinese Patent Application No. 202110454541.1, mailed on May 31, 2022, 6 pages.
Notice of Allowance received for Chinese Patent Application No. 202111457936.3, mailed on Nov. 7, 2022, 4 pages.
Notice of Allowance received for Danish Patent Application No. PA201570495, mailed on Feb. 22, 2017, 1 page.
Notice of Allowance received for Danish Patent Application No. PA201570496, mailed on Apr. 18, 2016, 2 pages.
Notice of Allowance received for Danish Patent Application No. PA201570563, mailed on May 24, 2016, 2 pages.
Notice of Allowance received for Danish Patent Application No. PA201570667, mailed on Nov. 11, 2016, 2 pages.
Notice of Allowance received for Danish Patent Application No. PA202070623, mailed on Sep. 20, 2022, 2 pages.
Notice of Allowance received for Japanese Patent Application No. 2017-505450, mailed on Mar. 9, 2018, 10 pages.
Notice of Allowance received for Japanese Patent Application No. 2017-505842, mailed on Mar. 16, 2020, 4 pages.
Notice of Allowance received for Japanese Patent Application No. 2017-505847, mailed on May 20, 2019, 4 pages.

(56) References Cited

OTHER PUBLICATIONS

Notice of Allowance received for Japanese Patent Application No. 2017-545918, mailed on Jul. 22, 2019, 4 pages.
Notice of Allowance received for Japanese Patent Application No. 2018-074971, mailed on Apr. 23, 2019, 4 pages.
Notice of Allowance received for Japanese Patent Application No. 2018-107114, mailed on Mar. 22, 2019, 4 pages.
Notice of Allowance received for Japanese Patent Application No. 2018-537840, mailed on Mar. 19, 2020, 4 pages.
Notice of Allowance received for Japanese Patent Application No. 2019-096219, mailed on Jun. 26, 2020, 4 pages.
Notice of Allowance received for Japanese Patent Application No. 2019-151358, mailed on Jan. 22, 2021, 4 pages.
Notice of Allowance received for Japanese Patent Application No. 2020-074878, mailed on May 28, 2021, 4 pages.
Notice of Allowance received for Japanese Patent Application No. 2020-124605, mailed on Dec. 5, 2022, 4 pages.
Notice of Allowance received for Japanese Patent Application No. 2020-159823, mailed on Jul. 24, 2023, 23 pages.
Notice of Allowance received for Japanese Patent Application No. 2020-159825, mailed on Mar. 25, 2022, 5 pages.
Notice of Allowance received for Japanese Patent Application No. 2020-551465, mailed on Jun. 28, 2021, 4 pages.
Notice of Allowance received for Japanese Patent Application No. 2020-562622, mailed on Aug. 26, 2022, 4 pages.
Notice of Allowance received for Japanese Patent Application No. 2021-023661. mailed on Apr. 10, 2023, 4 pages.
Notice of Allowance received for Japanese Patent Application No. 2021-105941, mailed on Jul. 4, 2022, 4 pages.
Notice of Allowance received for Japanese Patent Application No. 2021-122610, mailed on Aug. 5, 2022, 4 pages.
Notice of Allowance received for Japanese Patent Application No. 2021-565837, mailed on May 16, 2022, 4 pages.
Notice of Allowance received for Japanese Patent Application No. 2022-096730, mailed on Jun. 5, 2023, 4 pages.
Notice of Allowance received for Japanese Patent Application No. 2022-139320, mailed on Jan. 6, 2023, 4 pages.
Notice of Allowance received for Japanese Patent Application No. 2022-512865, mailed on Oct. 3, 2022, 4 pages.
Notice of Allowance received for Korean Patent Application No. 10-2017-7005939, mailed on Mar. 30, 2018, 5 pages.
Notice of Allowance received for Korean Patent Application No. 10-2018-7018904, mailed on Jun. 26, 2020, 4 pages.
Notice of Allowance received for Korean Patent Application No. 10-2018-7022101, mailed on Oct. 14, 2019, 4 pages.
Notice of Allowance received for Korean Patent Application No. 10-2019-7029673, mailed on Aug. 3, 2021, 3 pages.
Notice of Allowance received for Korean Patent Application No. 10-2020-0123852, mailed on Mar. 9, 2023, 7 pages.
Notice of Allowance received for Korean Patent Application No. 10-2020-0123852, mailed on Nov. 28, 2022, 7 pages.
Notice of Allowance received for Korean Patent Application No. 10-2020-0123857, mailed on Feb. 21, 2023, 6 pages.
Notice of Allowance received for Korean Patent Application No. 10-2020-0123887, mailed on Nov. 28, 2022, 7 pages.
Notice of Allowance received for Korean Patent Application No. 10-2020-7001340, mailed on May 10, 2021, 5 pages.
Notice of Allowance received for Korean Patent Application No. 10-2020-7026036, mailed on Jul. 26, 2021, 4 pages.
Notice of Allowance received for Korean Patent Application No. 10-2020-7028759, mailed on Oct. 19, 2021, 4 pages.
Notice of Allowance received for Korean Patent Application No. 10-2021-7002597, mailed on Feb. 25, 2021, 5 pages.
Notice of Allowance received for Korean Patent Application No. 10-2021-7013453, mailed on Aug. 11, 2021, 5 pages.
Notice of Allowance received for Korean Patent Application No. 10-2021-7013454, mailed on Aug. 12, 2021, 4 pages.
Notice of Allowance received for Korean Patent Application No. 10-2021-7025301, mailed on Mar. 16, 2022, 4 pages.
Notice of Allowance received for Korean Patent Application No. 10-2021-7034748, mailed on Jan. 27, 2022, 6 pages.
Notice of Allowance received for Korean Patent Application No. 10-2021-7036016. mailed on Sep. 28, 2022, 7 pages.
Notice of Allowance received for Korean Patent Application No. 10-2021-7036246, mailed on Mar. 2, 2022, 5 pages.
Notice of Allowance received for Korean Patent Application No. 10-2021-7036678, mailed on Mar. 7, 2022, 5 pages.
Notice of Allowance received for Korean Patent Application No. 10-2022-7001721, mailed on Feb. 28, 2022, 5 pages.
Notice of Allowance received for Korean Patent Application No. 10-2022-7014529, mailed on Dec. 13, 2022, 8 pages.
Notice of Allowance received for Korean Patent Application No. 10-2022-7019205, mailed on Jan. 5, 2023, 8 pages.
Notice of Allowance received for Netherland Patent Application No. 2019753, mailed on Jul. 6, 2018, 6 pages.
Notice of Allowance received for Taiwanese Patent Application No. 104124962, mailed on Jul. 27, 2017, 3 pages.
Notice of Allowance received for Taiwanese Patent Application No. 104124963, mailed on Sep. 28, 2017, 5 pages.
Notice of Allowance received for Taiwanese Patent Application No. 104124995, mailed on Jul. 27, 2017, 3 pages.
Notice of Allowance received for Taiwanese Patent Application No. 104124997, mailed on Jun. 16, 2017, 5 pages.
Notice of Allowance received for Taiwanese Patent Application No. 104124998, mailed on Mar. 31, 2017, 3 pages.
Notice of Allowance received for Taiwanese Patent Application No. 104128684, mailed on Feb. 23, 2017, 3 pages.
Notice of Allowance received for Taiwanese Patent Application No. 104134740, mailed on Dec. 8, 2016, 5 pages.
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/821,667, mailed on Jun. 12, 2019, 9 pages.
Notice of Allowance received for U.S. Appl. No. 14/822,769, mailed on Nov. 29, 2018, 12 pages.
Notice of Allowance received for U.S. Appl. No. 14/839,889, mailed on Oct. 30, 2017, 16 pages.
Notice of Allowance received for U.S. Appl. No. 14/841,402, mailed on Apr. 26, 2018, 16 pages.
Notice of Allowance received for U.S. Appl. No. 15/183,663, mailed on Jan. 17, 2019, 6 pages.
Notice of Allowance received for U.S. Appl. No. 15/355,956, mailed on Nov. 22, 2019, 29 pages.
Notice of Allowance received for U.S. Appl. No. 15/554,204, mailed on Jul. 13, 2020, 10 pages.
Notice of Allowance received for U.S. Appl. No. 15/798,235, mailed on Apr. 1, 2020, 8 pages.
Notice of Allowance received for U.S. Appl. No. 15/798,235, mailed on Sep. 22, 2020, 8 pages.
Notice of Allowance received for U.S. Appl. No. 15/798,257, mailed on May 22, 2019, 14 pages.
Notice of Allowance received for U.S. Appl. No. 15/881,544, mailed on Jun. 26, 2019, 6 pages.

(56) References Cited

OTHER PUBLICATIONS

Notice of Allowance received for U.S. Appl. No. 15/881,544, mailed on Nov. 7, 2019, 5 pages.
Notice of Allowance received for U.S. Appl. No. 16/401,934, mailed on Feb. 2, 2022, 8 pages.
Notice of Allowance received for U.S. Appl. No. 16/401,934, mailed on Nov. 1, 2021, 11 pages.
Notice of Allowance received for U.S. Appl. No. 16/418,786, mailed on Dec. 9, 2021, 9 pages.
Notice of Allowance received for U.S. Appl. No. 16/418,786, mailed on Jun. 14, 2022, 9 pages.
Notice of Allowance received for U.S. Appl. No. 16/418,786, mailed on Nov. 22, 2022, 6 pages.
Notice of Allowance received for U.S. Appl. No. 16/582,020, mailed on Jul. 27, 2021, 29 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.
Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of Allowance received for U.S. Appl. No. 16/584,445, mailed on Jun. 24, 2020, 5 pages.
Notice of Allowance received for U.S. Appl. No. 16/584,445, mailed on May 29, 2020, 5 pages.
Notice of Allowance received for U.S. Appl. No. 16/584,445, mailed on Oct. 21, 2020, 6 pages.
Notice of Allowance received for U.S. Appl. No. 16/585,366, mailed on Jan. 2, 2020, 6 pages.
Notice of Allowance received for U.S. Appl. No. 16/585,399, mailed on Jul. 21, 2020, 9 pages.
Notice of Allowance received for U.S. Appl. No. 16/585,714, mailed on Jan. 8, 2021, 8 pages.
Notice of Allowance received for U.S. Appl. No. 16/585,714, mailed on Jan. 27, 2021, 2 pages.
Notice of Allowance received for U.S. Appl. No. 16/585,714, mailed on Sep. 25, 2020, 15 pages.
Notice of Allowance received for U.S. Appl. No. 16/585,721, mailed on Oct. 30, 2020, 9 pages.
Notice of Allowance received for U.S. Appl. No. 16/585,721, mailed on Sep. 30, 2020, 15 pages.
Notice of Allowance received for U.S. Appl. No. 16/659,507, mailed on Feb. 24, 2021, 7 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 16/935,002, mailed on Feb. 15, 2023, 15 pages.
Notice of Allowance received for U.S. Appl. No. 16/935,002, mailed on Jun. 28, 2023, 8 pages.
Notice of Allowance received for U.S. Appl. No. 16/997,588, mailed on Mar. 18, 2022, 9 pages.
Notice of Allowance received for U.S. Appl. No. 16/997,588, mailed on Sep. 30, 2021, 12 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Notice of Allowance received for U.S. Appl. No. 17/041,350, mailed on Feb. 24, 2022, 6 pages.
Notice of Allowance received for U.S. Appl. No. 17/078,896, mailed on May 13, 2022, 8 pages.
Notice of Allowance received for U.S. Appl. No. 17/087,845, mailed on Mar. 3, 2022, 9 pages.
Notice of Allowance received for U.S. Appl. No. 17/087,845, mailed on Oct. 28, 2021, 9 pages.
Notice of Allowance received for U.S. Appl. No. 17/317,042, mailed on Jul. 26, 2022, 12 pages.
Notice of Allowance received for U.S. Appl. No. 17/317,042, mailed on Nov. 9, 2022, 10 pages.
Notice of Allowance received for U.S. Appl. No. 17/341,839, mailed on Dec. 2, 2022, 6 pages.
Notice of Allowance received for U.S. Appl. No. 17/341,839, mailed on Oct. 5, 2022, 5 pages.
Notice of Allowance received for U.S. Appl. No. 17/373,163, mailed on Jul. 27, 2022, 8 pages.
Notice of Allowance received for U.S. Appl. No. 17/373,163, mailed on May 11, 2022, 8 pages.
Notice of Allowance received for U.S. Appl. No. 17/476,286, mailed on Feb. 1, 2023, 15 pages.
Notice of Allowance received for U.S. Appl. No. 17/515,143, mailed on Dec. 16, 2022, 11 pages.
Notice of Allowance received for U.S. Appl. No. 17/515,143, mailed on Mar. 13, 2023, 10 pages.
Notice of Allowance received for U.S. Appl. No. 17/556, 165, mailed on Feb. 21, 2023, 12 pages.
Notice of Allowance received for U.S. Appl. No. 17/591,184, mailed on Feb. 22, 2023, 5 pages.
Notice of Allowance received for U.S. Appl. No. 17/713,016, mailed on Apr. 18, 2023, 10 pages.
Notice of Allowance received for U.S. Appl. No. 17/713,016, mailed on Aug. 4, 2023, 7 pages.
Notice of Allowance received for U.S. Appl. No. 17/738,940, mailed on Jun. 22, 2023, 9 pages.
Notice of Allowance received for U.S. Appl. No. 17/941,962, mailed on Jul. 3, 2023, 9 pages.
Notice of Allowance received for U.S. Appl. No. 17/941,962, mailed on Mar. 10, 2023, 11 pages.
Notice of Allowance received for U.S. Appl. No. 17/941,962, mailed on May 3, 2023, 10 pages.
Notice of Allowance received for U.S. Appl. No. 17/987,731, mailed on Dec. 26, 2023, 8 pages.
"Nova Launcher—Lock Screen Edit", Online Available at: https://forums.androidcentral.com/ask-question/835057-nova-launcher-lock-screen-edit.html, Sep. 2017, 2 pages.
Nova, "Tour of the Solar System", Retrieved fro <http://www.pbs.org/wgbh/nova/space/tour-solar-system.html>, May 24, 2013, 14 pages.
Obara, Yuuta, "iPhone Application Selection for Univesity Students", Shuwa System Co., Saito Kazukuni, vol. 1, May 16, 2013, 4 pages.
Octoba, "Just Install It—Utilizing Method for Android Application Business", ASCII Media Works Co. Takano Kiyoshi, vol. 1, Apr. 25, 2013, 6 pages.
Office Action and Search Report received for Danish Patent Application No. PA201970598, mailed on Jan. 28, 2020, 6 pages.
Office Action received for Australian Patent Application No. 2015101020, mailed on Oct. 26, 2015, 8 pages.
Office Action received for Danish Patent Application No. PA201570499, mailed on Nov. 1, 2017, 6 pages.
Office Action received for European Patent Application No. 15730924.6, mailed on Dec. 12, 2017, 8 pages.
Office Action received for Australian Patent Application No. 2015101019, issued on Oct. 14, 2015, 3 pages.
Office Action received for Australian Patent Application No. 2015101019, issued on Apr. 7, 2016, 4 pages.
Office Action received for Australian Patent Application No. 2015101021, issued on Apr. 26, 2016, 4 pages.
Office Action received for Australian Patent Application No. 2015101021, issued on Oct. 28, 2015, 10 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.

(56) References Cited

OTHER PUBLICATIONS

Office Action received for Australian Patent Application No. 2016100411, mailed on Jun. 10, 2016, 3 pages.
Office Action received for Australian Patent Application No. 2016100476, mailed on Jun. 9, 2016, 4 pages.
Office Action received for Australian Patent Application No. 2016100765, issued on Aug. 5, 2016, 2 pages.
Office Action received for Australian Patent Application No. 2016100765, mailed on Dec. 16, 2016, 3 pages.
Office Action received for Australian Patent Application No. 2016229847, mailed on Jul. 3, 2018, 4 pages.
Office Action received for Australian Patent Application No. 2017277813, mailed on Jun. 11, 2019, 3 pages.
Office Action received for Australian Patent Application No. 2017277813, mailed on Mar. 20, 2020, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2018206770, mailed on Apr. 30, 2019, 4 pages.
Office Action received for Australian Patent Application No. 2018206770, mailed on Jul. 16, 2019, 5 pages.
Office Action received for Australian Patent Application No. 2018206770, mailed on Jul. 25, 2018, 5 pages.
Office Action received for Australian Patent Application No. 2018206770, mailed on Mar. 5, 2019, 3 pages.
Office Action received for Australian Patent Application No. 2018279037, mailed on Jan. 17, 2020, 4 pages.
Office Action received for Australian Patent Application No. 2018279037, mailed on Jun. 18, 2019, 5 pages.
Office Action received for Australian Patent Application No. 2019208225, mailed on Dec. 21, 2020, 3 pages.
Office Action received for Australian Patent Application No. 2019208225, mailed on Mar. 20, 2020, 3 pages.
Office Action received for Australian Patent Application No. 2019267413, mailed on Jun. 29, 2021, 3 pages.
Office Action received for Australian Patent Application No. 2020102158, mailed on Apr. 27, 2021, 5 pages.
Office Action received for Australian Patent Application No. 2020102158, mailed on Dec. 8, 2020, 9 pages.
Office Action received for Australian Patent Application No. 2020204506, mailed on Dec. 7, 2020, 6 pages.
Office Action received for Australian Patent Application No. 2020239670, mailed on Mar. 3, 2021, 4 pages.
Office Action received for Australian Patent Application No. 2020239749, mailed on Jan. 21, 2022, 4 pages.
Office Action received for Australian Patent Application No. 2020239749, mailed on Jul. 16, 2021, 5 pages.
Office Action received for Australian Patent Application No. 2020239774, mailed on Jun. 28, 2021, 8 pages.
Office Action received for Australian Patent Application No. 2020239774, mailed on Oct. 5, 2021, 3 pages.
Office Action received for Australian Patent Application No. 2020250323, mailed on Dec. 14, 2021, 2 pages.
Office Action received for Australian Patent Application No. 2020309093, mailed on Jan. 21, 2021, 3 pages.
Office Action received for Australian Patent Application No. 2021202797, mailed on Feb. 4, 2022, 5 pages.
Office Action received for Australian Patent Application No. 2021202834, mailed on May 28, 2021, 2 pages.
Office Action received for Australian Patent Application No. 2021203216, mailed on Mar. 7, 2022, 8 pages.
Office Action received for Australian Patent Application No. 2021245228, mailed on Aug. 31, 2022, 2 pages.
Office Action received for Australian Patent Application No. 2021250863, mailed on Oct. 6, 2022, 6 pages.
Office Action received for Australian Patent Application No. 2022201419, mailed on Mar. 20, 2023, 3 pages.
Office Action received for Australian Patent Application No. 2022202292, mailed on May 10, 2022, 2 pages.
Office Action received for Australian Patent Application No. 2022202583, mailed on Mar. 24, 2023, 4 pages.
Office Action received for Australian Patent Application No. 2022203957, mailed on May 12, 2023, 5 pages.
Office Action received for Australian Patent Application No. 2022218607, mailed on Apr. 14, 2023, 3 pages.
Office Action received for Australian Patent Application No. 2022218607, mailed on Jun. 30, 2023, 4 pages.
Office Action received for Australian Patent Application No. 2022235622, mailed on Jun. 27, 2023, 3 pages.
Office Action received for Australian Patent Application No. 2022235622, mailed on May 22, 2023, 2 pages.
Office Action received for Australian Patent Application No. 2022235634, mailed on May 25, 2023, 4 pages.
Office Action received for Australian Patent Application No. 2022287595, mailed on Jul. 20, 2023, 3 pages.
Office Action received for Australian Patent Application No. 2023200039, mailed on Jul. 4, 2023, 2 pages.
Office Action received for Australian Patent Application No. 2015101019, mailed on Feb. 12, 2016, 4 pages.
Office Action received for Chinese Patent Application No. 201520595384.6, mailed on Mar. 25, 2016, 3 pages.
Office Action received for Chinese Patent Application No. 201510479088.4, mailed on Apr. 22, 2020, 7 pages.
Office Action received for Chinese Patent Application No. 201510479088.4, mailed on Mar. 12, 2018, 20 pages.
Office Action received for Chinese Patent Application No. 201510479088.4, mailed on May 7, 2019, 6 pages.
Office Action received for Chinese Patent Application No. 201510481525.6, mailed on Aug. 29, 2018, 10 pages.
Office Action received for Chinese Patent Application No. 201510481525.6, mailed on Nov. 29, 2017, 9 pages.
Office Action received for Chinese Patent Application No. 201510483268.X, mailed on Apr. 16, 2019, 6 pages.
Office Action received for Chinese Patent Application No. 201510483268.X, mailed on Dec. 1, 2017, 11 pages.
Office Action received for Chinese Patent Application No. 201510483268.X, mailed on Oct. 19, 2018, 10 pages.
Office action received for Chinese Patent Application No. 201510483305.7, mailed on Aug. 31, 2018, 10 pages.
Office action received for Chinese Patent Application No. 201510483305.7, mailed on Dec. 1, 2017, 13 pages.
Office Action received for Chinese Patent Application No. 201510484514.3, mailed on Apr. 4, 2018, 12 pages.
Office Action received for Chinese Patent Application No. 201510484514.3, mailed on Dec. 24, 2018, 13 pages.
Office Action received for Chinese Patent Application No. 201510557356.X, mailed on Dec. 29, 2017, 11 pages.
Office Action received for Chinese Patent Application No. 201510557356.X, mailed on Nov. 23, 2018, 12 pages.
Office Action received for Chinese Patent Application No. 201520594249.X, mailed on Mar. 25, 2016, 3 pages.
Office Action received for Chinese Patent Application No. 201520595384.6, mailed on Dec. 30, 2016, 2 pages.
Office Action received for Chinese Patent Application No. 201520595384.6, mailed on Jul. 22, 2016, 3 pages.
Office Action received for Chinese Patent Application No. 201520595385.0, mailed on Dec. 30, 2016, 2 pages.
Office Action received for Chinese Patent Application No. 201520595385.0, mailed on Jul. 22, 2016, 3 pages.
Office Action received for Chinese Patent Application No. 201520595385.0, mailed on Mar. 25, 2016, 3 pages.
Office Action received for Chinese Patent Application No. 201520595408.8, mailed on Dec. 9, 2015, 4 pages.
Office Action received for Chinese Patent Application No. 201520595408.8, mailed on Dec. 30, 2016, 2 pages.
Office Action received for Chinese Patent Application No. 201520595408.8, mailed on Jul. 25, 2016, 3 pages.
Office Action received for Chinese Patent Application No. 201520595408.8, mailed on Mar. 25, 2016, 3 pages.

(56) References Cited

OTHER PUBLICATIONS

Office Action received for Chinese Patent Application No. 201520595538.1, mailed on Dec. 30, 2016, 2 pages.
Office Action received for Chinese Patent Application No. 201520595538.1, mailed on Jul. 22, 2016, 3 pages.
Office Action received for Chinese Patent Application No. 201520595538.1, mailed on Mar. 25, 2016, 3 pages.
Office Action received for Chinese Patent Application No. 201520679198.0, mailed on Jun. 24, 2016, 5 pages.
Office Action received for Chinese Patent Application No. 201520679198.0, mailed on Mar. 7, 2016, 6 pages.
Office Action received for Chinese Patent Application No. 201520679198.0, mailed on Nov. 18, 2015, 4 pages.
Office Action received for Chinese Patent Application No. 201621208900.6, mailed on Apr. 26, 2017, 2 pages.
Office Action received for Chinese Patent Application No. 201680013193.1, mailed on Feb. 1, 2021, 8 pages.
Office Action received for Chinese Patent Application No. 201680013193.1, mailed on Mar. 25, 2020, 21 pages.
Office Action received for Chinese Patent Application No. 201680013193.1, mailed on Sep. 7, 2020, 6 pages.
Office Action received for Chinese Patent Application No. 201680047983.1, mailed on Feb. 1, 2021, 6 pages.
Office Action received for Chinese Patent Application No. 201680047983.1, mailed on Jul. 1, 2020, 6 pages.
Office Action received for Chinese Patent Application No. 201680047983.1, mailed on Mar. 18, 2019, 18 pages.
Office Action received for Chinese Patent Application No. 201680047983.1, mailed on Nov. 28, 2019, 9 pages.
Office Action received for Chinese Patent Application No. 201780033973.7, mailed on Jan. 22, 2021, 27 pages.
Office Action received for Chinese Patent Application No. 201810037665.8, mailed on Dec. 7, 2018, 10 pages.
Office Action received for Chinese Patent Application No. 201910906898.1, mailed on Jun. 23, 2021, 6 pages.
Office Action received for Chinese Patent Application No. 201910906898.1, mailed on Sep. 9, 2020, 8 pages.
Office Action received for Chinese Patent Application No. 201910924197.0, mailed on Nov. 30, 2022, 13 pages.
Office Action received for Chinese Patent Application No. 202110194015.6, mailed on Sep. 28, 2021, 13 pages.
Office Action received for Chinese Patent Application No. 202110453180.9, mailed on Dec. 26, 2022, 13 pages.
Office Action received for Chinese Patent Application No. 202110453180.9, mailed on Jun. 16, 2022, 14 pages.
Office Action received for Chinese Patent Application No. 202110453180.9, mailed on Nov. 8, 2021, 21 pages.
Office Action received for Chinese Patent Application No. 202110454541.1, mailed on Oct. 20, 2021, 19 pages.
Office Action received for Chinese Patent Application No. 202110783860.7, mailed on Mar. 10, 2022, 15 pages.
Office Action received for Chinese Patent Application No. 202110783860.7, mailed on Nov. 15, 2022, 8 pages.
Office Action received for Chinese Patent Application No. 202111457936.3, mailed on Jul. 5, 2022, 18 pages.
Office Action received for Chinese Patent Application No. 201520594249.X, mailed on Dec. 9, 2015, 4 pages.
Office Action received for Chinese Patent Application No. 201520595384.6, mailed on Dec. 9, 2015, 4 pages.
Office Action received for Chinese Patent Application No. 201520595385.0, mailed on Dec. 9, 2015, 4 pages.
Office Action received for Chinese Patent Application No. 201520595538.1, mailed on Dec. 9, 2015, 4 pages.
Office Action received for Danish Patent Application No. PA201570495, mailed on Dec. 9, 2016, 2 pages.
Office Action received for Danish Patent Application No. PA201570495, mailed on May 4, 2016, 8 pages.
Office Action received for Danish Patent Application No. PA201570495, mailed on Oct. 29, 2015, 7 pages.
Office Action received for Danish Patent Application No. PA201570497, mailed on Feb. 21, 2017, 3 pages.
Office Action received for Danish Patent Application No. PA201570497, mailed on May 17, 2016, 6 pages.
Office Action received for Danish Patent Application No. PA201570497, mailed on Nov. 15, 2016, 2 pages.
Office Action received for Danish Patent Application No. PA201570497, mailed on Oct. 24, 2017, 2 pages.
Office Action received for Danish Patent Application No. PA201570498, mailed on Feb. 6, 2017, 2 pages.
Office Action received for Danish Patent Application No. PA201570498, mailed on Jun. 2, 2016, 8 pages.
Office Action received for Danish Patent Application No. PA201570498, mailed on Oct. 26, 2017, 5 pages.
Office Action received for Danish Patent Application No. PA201570498, mailed on Oct. 30, 2015, 7 pages.
Office Action received for Danish Patent Application No. PA201570499, mailed on Feb. 14, 2017, 2 pages.
Office Action received for Danish Patent Application No. PA201570499, mailed on Jun. 16, 2016, 8 pages.
Office Action received for Danish Patent Application No. PA201570499, mailed on Jun. 19, 2018, 4 pages.
Office Action received for Danish Patent Application No. PA201570499, mailed on Nov. 3, 2015, 7 pages.
Office Action received for Danish Patent Application No. PA201570667, mailed on Apr. 1, 2016, 7 pages.
Office Action received for Danish Patent Application No. PA201570667, mailed on Sep. 2, 2016, 2 pages.
Office Action received for Danish Patent Application No. PA201570768, mailed on Sep. 13, 2016, 8 pages.
Office Action received for Danish Patent Application No. PA201570770, mailed on Apr. 7, 2017, 7 pages.
Office Action received for Danish Patent Application No. PA201570770, mailed on Mar. 17, 2016, 9 pages.
Office Action received for Danish Patent Application No. PA201570770, mailed on Sep. 12, 2016, 6 pages.
Office Action received for Danish Patent Application No. PA201670319, mailed on Aug. 2, 2016, 6 pages.
Office Action received for Danish Patent Application No. PA201670319, mailed on Jun. 21, 2017, 6 pages.
Office Action received for Danish Patent Application No. PA201670319, mailed on Nov. 24, 2016, 7 pages.
Office Action received for Danish Patent Application No. PA201670320, mailed on Aug. 4, 2016, 9 pages.
Office Action received for Danish Patent Application No. PA201670320, mailed on Dec. 5, 2016, 4 pages.
Office Action received for Danish Patent Application No. PA201670320, mailed on Jan. 18, 2018, 2 pages.
Office Action received for Danish Patent Application No. PA201670320, mailed on Jul. 3, 2017, 4 pages.
Office Action received for Danish Patent Application No. PA201770791, mailed on Jan. 31, 2018, 8 pages.
Office Action received for Danish Patent Application No. PA201770791, mailed on Jul. 13, 2018, 2 pages.
Office Action received for Danish Patent Application No. PA201770791, mailed on Jun. 11, 2019, 3 pages.
Office Action received for Danish Patent Application No. PA201970596, mailed on May 6, 2020, 4 pages.
Office Action received for Danish Patent Application No. PA201970597, mailed on Oct. 29, 2020, 4 pages.
Office Action received for Danish Patent Application No. PA201970598, mailed on Apr. 15, 2021, 6 pages.
Office Action received for Danish Patent Application No. PA201970598, mailed on Oct. 9, 2020, 4 pages.
Office Action received for Danish Patent Application No. PA201970599, mailed on Jan. 23, 2020, 6 pages.
Office Action received for Danish Patent Application No. PA201970599, mailed on Mar. 1, 2021, 4 pages.
Office Action received for Danish Patent Application No. PA201970599, mailed on May 27, 2020, 4 pages.
Office Action received for Danish Patent Application No. PA202070609, mailed on Dec. 10, 2020, 8 pages.

(56) References Cited

OTHER PUBLICATIONS

Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for Danish Patent Application No. PA202070623, mailed on Aug. 24, 2021, 3 pages.
Office Action received for Danish Patent Application No. PA202070623, mailed on May 23, 2022, 3 pages.
Office Action received for Danish Patent Application No. PA202070624, mailed on Feb. 4, 2022, 4 pages.
Office Action received for Danish Patent Application No. PA202070624, mailed on Jun. 16, 2021, 5 pages.
Office Action received for Danish Patent Application No. PA202070625, mailed on Feb. 8, 2022, 2 pages.
Office Action received for Danish Patent Application No. PA202070625, mailed on Jun. 16, 2021, 3 pages.
Office Action received for Danish Patent Application No. PA202070625, mailed on Sep. 23, 2022, 4 pages.
Office Action received for Danish Patent Application No. PA201570496, mailed on Oct. 29, 2015, 6 pages.
Office Action received for Danish Patent Application No. PA201570497, mailed on Oct. 30, 2015, 6 pages.
Office Action received for European Patent Application No. 15730925.3, mailed on Apr. 12, 2018, 8 pages.
Office Action received for European Patent Application No. 15747595.5, mailed on Apr. 15, 2019, 4 pages.
Office Action received for European Patent Application No. 15747595.5, mailed on Jun. 27, 2018, 8 pages.
Office Action received for European Patent Application No. 15759998.6, mailed on Dec. 19, 2018, 6 pages.
Office Action received for European Patent Application No. 15759998.6, mailed on Jul. 16, 2018, 6 pages.
Office Action received for European Patent Application No. 15759998.6, mailed on May 29, 2019, 6 pages.
Office Action received for European Patent Application No. 16708014.2, mailed on Apr. 3, 2019, 7 pages.
Office Action received for European Patent Application No. 16762356.0, mailed on Dec. 11, 2020, 7 pages.
Office Action received for European Patent Application No. 16837432.0, mailed on Jan. 10, 2020, 7 pages.
Office Action received for European Patent Application No. 16837432.0, mailed on Jan. 27, 2021, 7 pages.
Office Action received for European Patent Application No. 17206177.2, mailed on May 15, 2018, 6 pages.
Office Action received for European Patent Application No. 17810723.1, mailed on Jul. 9, 2021, 8 pages.
Office Action received for European Patent Application No. 19724997.2, mailed on Oct. 27, 2022, 5 pages.
Office Action received for European Patent Application No. 20172197.4, mailed on Aug. 5, 2020, 6 pages.
Office Action received for European Patent Application No. 20172197.4, mailed on Jul. 8, 2021, 5 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for European Patent Application No. 20730136.7, mailed on Jan. 19, 2023, 4 pages.
Office Action received for European Patent Application No. 20730136.7, mailed on Jun. 27, 2023, 5 pages.
Office Action received for European Patent Application No. 20730136.7, mailed on Oct. 6, 2022, 11 pages.
Office Action received for European Patent Application No. 20761084.1, mailed on Dec. 14, 2022, 5 pages.
Office Action received for European Patent Application No. 20761084.1, mailed on May 9, 2022, 9 pages.
Office Action received for European Patent Application No. 21169911.1, mailed on Dec. 1, 2022, 4 pages.
Office Action received for European Patent Application No. 21169911.1, mailed on Jun. 3, 2022, 5 pages.
Office Action received for European Patent Application No. 21177569.7, mailed on Jun. 9, 2022, 5 pages.
Office Action received for European Patent Application No. 15730925.3, mailed on Feb. 27, 2019, 5 pages.
Office Action received for German Patent Application No. 112015003083.2, mailed on Mar. 9, 2018, 12 pages.
Office Action received for Indian Patent Application No. 202017041557, mailed on Dec. 8, 2021, 8 pages.
Office Action received for Indian Patent Application No. 202017048447, mailed on Sep. 5, 2022, 6 pages.
Office Action received for Indian Patent Application No. 202118025047, mailed on Apr. 26, 2022, 6 pages.
Office Action received for Japanese Patent Application No. 2017-505450, mailed on Jun. 20, 2017, 8 pages.
Office Action received for Japanese Patent Application No. 2017-505842, mailed on Feb. 22, 2019, 11 pages.
Office Action received for Japanese Patent Application No. 2017-505842, mailed on Sep. 9, 2019, 7 pages.
Office Action received for Japanese Patent Application No. 2017-505847, mailed on Feb. 12, 2019, 13 pages.
Office Action received for Japanese Patent Application No. 2017-510631, mailed on Mar. 2, 2018, 12 pages.
Office Action received for Japanese Patent Application No. 2017-545918, mailed on Sep. 14, 2018, 12 pages.
Office Action received for Japanese Patent Application No. 2018-074971, mailed on Jan. 28, 2019, 6 pages.
Office Action received for Japanese Patent Application No. 2018-107114, mailed on Oct. 9, 2018, 4 pages.
Office Action received for Japanese Patent Application No. 2018-537840, mailed on Jul. 8, 2019, 15 pages.
Office Action received for Japanese Patent Application No. 2019-151358, mailed on Oct. 2, 2020, 5 pages.
Office Action received for Japanese Patent Application No. 2020-074878, mailed on Sep. 7, 2020, 13 pages.
Office Action received for Japanese Patent Application No. 2020-124605, mailed on Dec. 17, 2021, 2 pages.
Office Action received for Japanese Patent Application No. 2020-124605, mailed on May 13, 2022, 6 pages.
Office Action received for Japanese Patent Application No. 2020-124605, mailed on Sep. 3, 2021, 5 pages.
Office Action received for Japanese Patent Application No. 2020-159823, mailed on Aug. 15, 2022, 6 pages.
Office Action received for Japanese Patent Application No. 2020-159823, mailed on Dec. 23, 2021, 8 pages.
Office Action received for Japanese Patent Application No. 2020-159824, mailed on Dec. 17, 2021, 13 pages.
Office Action received for Japanese Patent Application No. 2020-159825, mailed on Dec. 10, 2021, 4 pages.
Office Action received for Japanese Patent Application No. 2020-562622, mailed on Jan. 7, 2022, 13 pages.
Office Action received for Japanese Patent Application No. 2021-023661, mailed on Feb. 25, 2022, 6 pages.
Office Action received for Japanese Patent Application No. 2021-023661, mailed on Oct. 3, 2022, 8 pages.
Office Action received for Korean Patent Application No. 10-2017-7005939, mailed on Jun. 30, 2017, 6 pages.
Office Action received for Korean Patent Application No. 10-2017-7024570, mailed on Jul. 10, 2019, 6 pages.
Office Action received for Korean Patent Application No. 10-2017-7024570, mailed on Sep. 28, 2018, 14 pages.
Office Action received for Korean Patent Application No. 10-2018-7018904, mailed on Aug. 20, 2019, 8 pages.
Office Action received for Korean Patent Application No. 10-2018-7022101, mailed on Feb. 14, 2019, 15 pages.
Office Action received for Korean Patent Application No. 10-2018-7022101, mailed on Jul. 9, 2019, 10 pages.
Office Action received for Korean Patent Application No. 10-2019-7029673, mailed on Apr. 8, 2021, 7 pages.
Office Action received for Korean Patent Application No. 10-2019-7029673, mailed on Nov. 5, 2019, 10 pages.

(56) References Cited

OTHER PUBLICATIONS

Office Action received for Korean Patent Application No. 10-2019-7029673, mailed on Sep. 3, 2020, 9 pages.
Office Action received for Korean Patent Application No. 10-2020-0123852, mailed on Jun. 9, 2022, 10 pages.
Office Action received for Korean Patent Application No. 10-2020-0123857, mailed on Dec. 16, 2022, 8 pages.
Office Action received for Korean Patent Application No. 10-2020-0123857, mailed on Jun. 9, 2022, 12 pages.
Office Action received for Korean Patent Application No. 10-2020-0123887, mailed on Jun. 9, 2022, 5 pages.
Office Action received for Korean Patent Application No. 10-2020-7001340, mailed on Mar. 26, 2021, 13 pages.
Office Action received for Korean Patent Application No. 10-2020-7001340, mailed on Sep. 24, 2020, 19 pages.
Office Action received for Korean Patent Application No. 10-2020-7026036, mailed on Dec. 7, 2020, 8 pages.
Office Action received for Korean Patent Application No. 10-2020-7028759, mailed on Jun. 29, 2021, 12 pages.
Office Action received for Korean Patent Application No. 10-2020-7032187, mailed on Jun. 10, 2022, 16 pages.
Office Action received for Korean Patent Application No. 10-2021-7013453, mailed on Jun. 5, 2021, 6 pages.
Office Action received for Korean Patent Application No. 10-2021-7013454, mailed on Jun. 5, 2021, 6 pages.
Office Action received for Korean Patent Application No. 10-2021-7025301, mailed on Oct. 15, 2021, 5 pages.
Office Action received for Korean Patent Application No. 10-2021-7036016, mailed on Nov. 10, 2021, 13 pages.
Office Action received for Korean Patent Application No. 10-2021-7036246, mailed on Nov. 26, 2021, 5 pages.
Office Action received for Korean Patent Application No. 10-2021-7036678, mailed on Dec. 22, 2021, 6 pages.
Office Action received for Korean Patent Application No. 10-2022-7019205, mailed on Sep. 21, 2022, 6 pages.
Office Action received for Korean Patent Application No. 10-2023-0064928, mailed on Jun. 9, 2023, 6 pages.
Office Action received for Korean Patent Application No. 10-2023-7011744, mailed on May 15, 2023, 11 pages.
Office Action received for Netherland Patent Application No. 2015245, mailed on Jan. 24, 2017, 11 pages.
Office Action received for Netherland Patent Application No. 2019753, mailed on Apr. 12, 2018, 8 pages.
Office Action received for Netherland Patent Application No. 2015239, mailed on Oct. 28, 2016, 13 pages.
Office Action received for Taiwanese Patent Application No. 104124962, issued on Nov. 29, 2016, 6 pages.
Office Action received for Taiwanese Patent Application No. 104124998, mailed on Nov. 29, 2016, 6 pages.
Office Action received for Taiwanese Patent Application No. 104124963, mailed on Jan. 5, 2017, 11 pages.
Office Action received for Taiwanese Patent Application No. 104124995, issued on Dec. 1, 2016, 6 pages.
Office Action received for Taiwanese Patent Application No. 104124997, issued on Dec. 8, 2016, 12 pages.
Office Action received for Taiwanese Patent Application No. 104126627, issued on Nov. 29, 2016, 9 pages.
Office Action received for Taiwanese Patent Application No. 104126627, mailed on Aug. 30, 2018, 22 pages.
Office Action received for Taiwanese Patent Application No. 104126627, mailed on Dec. 20, 2018, 4 pages.
Office Action received for Taiwanese Patent Application No. 104126627, mailed on Oct. 16, 2017, 7 pages.
Office Action received for Taiwanese Patent Application No. 104128684, mailed on Nov. 8, 2016, 24 pages.
Office Action received for Taiwanese Patent Application No. 104128705, mailed on Aug. 29, 2016, 18 pages.
Office Action received for Taiwanese Patent Application No. 104128705, mailed on Mar. 16, 2017, 3 pages.
Office Action received for Taiwanese Patent Application No. 104132636, issued on Dec. 13, 2018, 26 pages.
Office Action received for Taiwanese Patent Application No. 104132636, issued on Mar. 23, 2017, 25 pages.
Office Action received for Taiwanese Patent Application No. 104132636, issued on Oct. 31, 2017, 10 pages.
Office Action received for Australian Patent Application No. 2015101183, issued on Nov. 6, 2015, 4 pages.
Omar, Romero, "Sony Smartwatch 2 Custom Watchfaces Tutorial", Retrieved From: <https://www.youtube.com/watch?v=8odbxqwSQR8>, May 1, 2014, 2 pages.
"Online Alarm Clock", https://web.archive.org/web/20150505081746/http://www.online-stopwatch.com/online-alarm-clock, May 5, 2015, 2 pages.
"Pentax K20D Operating Manual", http://www.ricoh-imaging.eu/en/operating-manuals-download.html, Pentax Corporation, 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Phlam, Dev, "Clockwork Tomato Presentation", Retrieved from the Internet: URL: https://www.youtube.com/watch?v=2IQDx9REn0E, Apr. 29, 2016, 6 pages.
Phonebuff, "Hybrid Stopwatch & Timer Android App Review", Available Online at: https://www.youtube.com/watch?v=B43oCFPiWvY, Apr. 4, 2012, 7 pages.
Poppinga et al., "Sensor-Based Identification of Opportune Moments for Triggering Notifications", IEEE CS, Mar. 14, 2014, pp. 22-29.
Pradhan et al., "Understanding and Managing Notifications", IEEE INFOCOM 2017—IEEE Conference on Computer Communications, May 1, 2017, 9 pages.
Pre-Appeal Review Report received for Japanese Patent Application No. 2020-159823, mailed on Jan. 12, 2023, 4 pages.
Pre-Interview First Office Action received for U.S. Appl. No. 14/815,890, mailed on May 26, 2016, 4 pages.
"Programmatically download APK from google play store", Retrieved from the Internet: https://stackoverflow.com/questions/13703982/prog ram maticallydownload-apk-from-google-play-store/13704021#13704021, Dec. 10, 2012, 2 pages.
Record of Oral Hearing received for U.S. Appl. No. 14/815,890, mailed on Nov. 20, 2020, 18 pages.
Rehman, A, "Install Android 4.2 Gesture-Based Keyboard & Clock App on Jellybean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Requirement received for U.S. Appl. No. 14/815,890, mailed on Feb. 22, 2016, 5 pages.
Requirement received for U.S. Appl. No. 17/949,081, mailed on Dec. 2, 2022, 6 pages.
Requirement received for U.S. Appl. No. 17/949,081, mailed on Jan. 3, 2023, 6 pages.
Result of Consultation received for European Patent Application No. 16762356.0, mailed on Nov. 29, 2021, 3 pages.
Result of Consultation received for European Patent Application No. 17810723.1, mailed on Nov. 30, 2022, 3 pages.
Result of Consultation received for European Patent Application No. 20185974.1, mailed on Apr. 4, 2022, 4 pages.
Result of Consultation received for European Patent Application No. 20729346.5, mailed on Jun. 21, 2023, 3 pages.
Result of Consultation received for European Patent Application No. 15730925.3. mailed on Nov. 24, 2020, 4 pages.
Rosa et al., "Stripe Generator—a Free Tool for the Web Design Community", Available online at: http://www.stripegenerator.com/, Mar. 28, 2019, 10 pages.
Rowinski, Dan, "Why the All-In-One Smartwatch Isn't Happening Any Time Soon", Online available at: https://web.archive.org/web/20140123074218if_/https://readwrite.com/2014/01/20/smartwatch-wearable-fitness-remote-control/, Jan. 20, 2014, 6 pages.
Search Report and Opinion received for Danish Patent Application No. PA201970596, mailed on Dec. 4, 2019, 11 pages.
Search Report and Opinion received for Danish Patent Application No. PA201970597, mailed on Dec. 18, 2019, 10 pages.

(56) References Cited

OTHER PUBLICATIONS

Search Report and Opinion received for Danish Patent Application No. PA201970598, mailed on Oct. 31, 2019, 9 pages.
Search Report and Opinion received for Danish Patent Application No. PA201970599, mailed on Nov. 8, 2019, 12 pages.
Search Report and Opinion received for Danish Patent Application No. PA202070610, mailed on Jan. 8, 2021, 9 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Search Report and Opinion received for Netherlands Patent Application No. 2015232, mailed on Jan. 25, 2017, 9 pages.
Search Report and Opinion received for Netherlands Patent Application No. 2015242, issued on Jul. 4, 2017, 20 pages.
Search Report and Opinion received for Netherlands Patent Application No. 2015364, issued on Jul. 4, 2017, 12 pages.
Search Report and Opinion received for Netherlands Patent Application No. 2018531, issued on Jul. 27, 2017, 14 pages.
Search Report received for Danish Patent Application No. 201570768, mailed on Mar. 17. 2016, 11 pages.
Search Report received for Netherlands Patent Application No. 2015236, mailed on Apr. 21, 2021, 19 pages.
Shiota, Shinji, "Windows 7 Dojo", Weekly ASCII, Ascii Mediaworks Inc., vol. 798, Aug. 31, 2010, 3 pages.
Singh, Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.
Smartwatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages.
"Sony Smartwatch 2 update—new feartures and watchface creator !!! NEW!!!", Online available at: https://www.youtube.com/watch?v=k3jjBv7QZSk, May 8, 2014, 3 pages.
Sony, "Live View_micro display", Extended User Guide, Aug. 2010, 27 pages.
Sony, "Sony SmartWatch", User Guide, Dec. 2011, 18 pages.
Spears, Ann, "dimming screen before/instead of screensaver?", Retrieved from—https://discussions.apple.com/thread/339700, Jan. 28, 2006, 1 page.
StateOfTech. "Samsung Galaxy Gear Tips—Installing and Customizing Clock Faces", Online available at: https://www.youtube.com/watch?v=p2GzpL3xlUo, Dec. 12, 2013, 3 pages.
StateOfTech, "Samsung Galaxy Gear Tips—Change the Clock Face", Retrieved from; https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 16762356.0, mailed on May 10, 2021, 10 pages.
Summons to Attend Oral Proceedings received for European Patent Application No. 17206177.2, mailed on Jun. 3, 2019, 8 pages.
Summons to Attend Oral Proceedings received for European Patent Application No. 17810723.1, mailed on Jul. 5, 2022, 8 pages.
Summons to Attend Oral Proceedings received for European Patent Application No. 20172197.4, mailed on Apr. 14, 2023, 8 pages.
Summons to Attend Oral Proceedings received for European Patent Application No. 20729346.5, mailed on Jan. 23, 2023, 11 pages.
Sun Set, "Sun Set solar image clock", Available at <https://web.archive.orgjweb/20140719005410/http://www.sunsetclock.com/>, 2013, 5 pages.
Supplemental Notice of Allowance received for U.S. Appl. No. 14/815,890, mailed on Mar. 10, 2021, 2 pages.
Supplemental Notice of Allowance received for U.S. Appl. No. 16/585,399, mailed on Aug. 26, 2020, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 16/997,588, mailed on Apr. 20, 2022, 4 pages.
Supplemental Notice of Allowance received for U.S. Appl. No. 16/997,588, mailed on Oct. 22, 2021, 4 pages.
TalkAndroid, "Android Wear walkthrough", Available online at: https://www.youtube.com/watch?v=4xntpZac4sw, Jun. 30, 2014, 1 page.
TechCloud, "How to Create Custom Watch Face for Samsung Galaxy Gear Smartwatch just in Few Seconds", Online available at: https://www.youtube.com/watch?v=6rO-_SREDjQ, Oct. 9, 2013, 3 pages.
"The Simply Alarm app for Pebble", available online at <https://web.archive.org/web/20150517070400>/http://www.rebootsramblings.ca/n/sahhelp/https://www.youtube.com/watch?v=IVp1scQPw08, May 17, 2015, 1 page.
TheUnlockr, "How to Change the Watch Face on the Galaxy Gear", Online available at: https://www.youtube.com/watch?v=Z7EBG5aBiZg, Jan. 3, 2014, 3 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
"UIKit User Interface Catalog: Page Controls", Available online at https://web.archive.org/web/20140703123442/https://developer.apple.com/library/ios/documentation/userexperience/conceptual/UIKitUICatalog/UIPageControl.html, Dec. 16, 2013, 4 pages.
Vidstube, "Bitmoji Clockface on Fitbit Versa Sense/Versa 3/Versa 2", Available online at: <https://www.youtube.com/watch?v=4V_xDnSLeHE>, Retrieved on Dec. 3, 2020, Jun. 30, 2019, 1 page.
Vitticci, Frederico, "Checking Time Zones with Living Earth—MacStories", Available at <https://www.macstories.net/reviews/checking-time-zones-with-living-earth/>, Dec. 11, 2013, pp. 1-5.
Wade, Cliff, "Get the Most Out of Nova Launcher: Changing Icon Sizes", Online Available at: https://www.androidguys.com/tips-tools/get-nova-launcher-changing-icon-sizes/, Nov. 16, 2015, 6 pages.
Wade, Cliff, "Get the Most Out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
Wearablezone, "How to Set Up Your Fitbit Profile", Online available at: <https://youtu.be/jsWPtcDWiJM>, Jun. 6, 2016, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-defacto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Woolsey, Amanda, "How to Customize the Clock on the Apple Watch", Available online at: <https://www.youtube.com/watch?v=t-3Bckdd9B4>, Retrieved on Dec. 11, 2020, Apr. 25, 2015, 1 page.
XDream, "TickTalk Video User Manual", YouTube [online] [video], Online available at: <https://youtu.be/jYhq3DwmVzo>, Mar. 17, 2017, 3 pages.
Zelgadis, "Reuse Animations—Synfig Animation Studio", Available online at: https://wiki.synfig.org/index.php?title=Doc:Reuse_Animations&oldid=18173, May 20, 2013, 5 pages.

(56) References Cited

OTHER PUBLICATIONS

Zephyrnix, "Steam's In-Game Home menu", Online Available at: <https://www.youtube.com/watch?v=jLoRFiPkcUw>, see 0;00-1;06., Feb. 15, 2011, 3 pages.

Zukerman, Erez. "6 Beautiful, Interesting & Versatile Timer Apps [Android]", Available at: http://www.makeuseof.com/tag/beautiful-interesting-versatile-timer-apps-android/, May 18, 2012, 5 pages.

Notice of Allowance received for U.S. Appl. No. 18/118,978, mailed on Dec. 20, 2023, 5 pages.

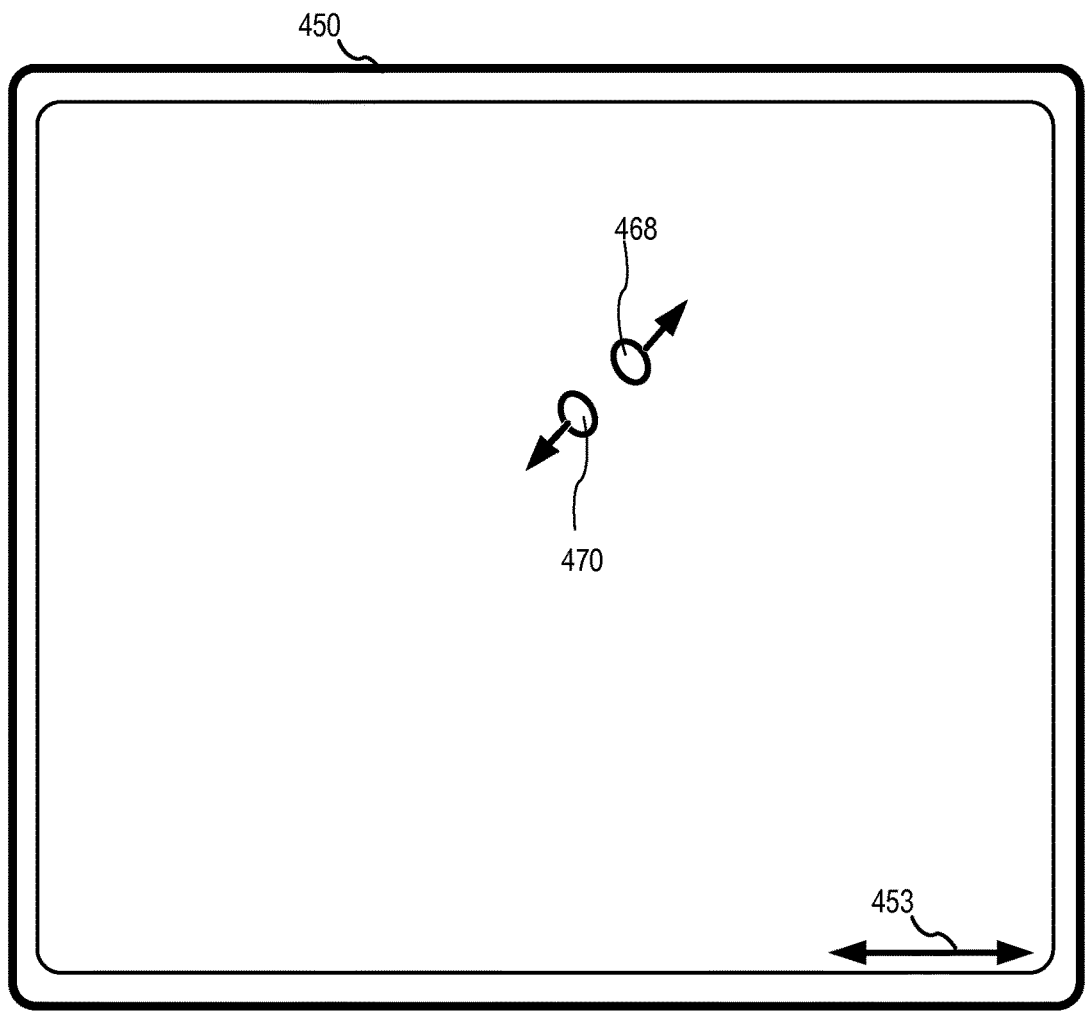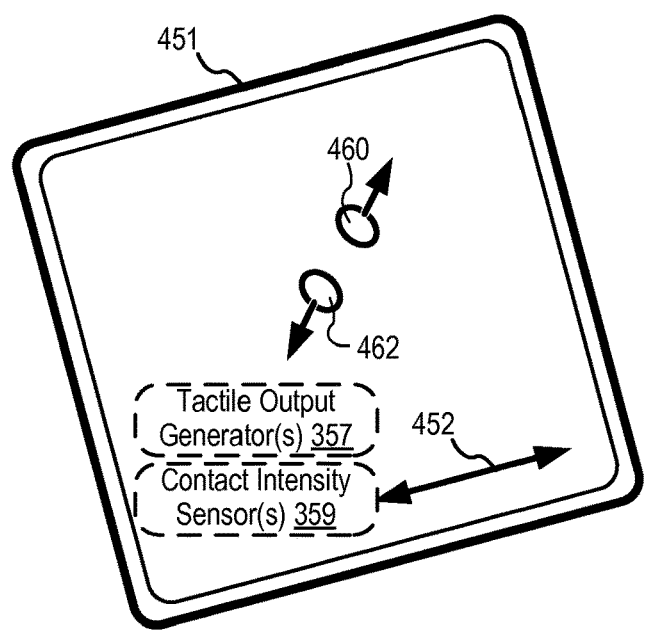
FIG. 4B

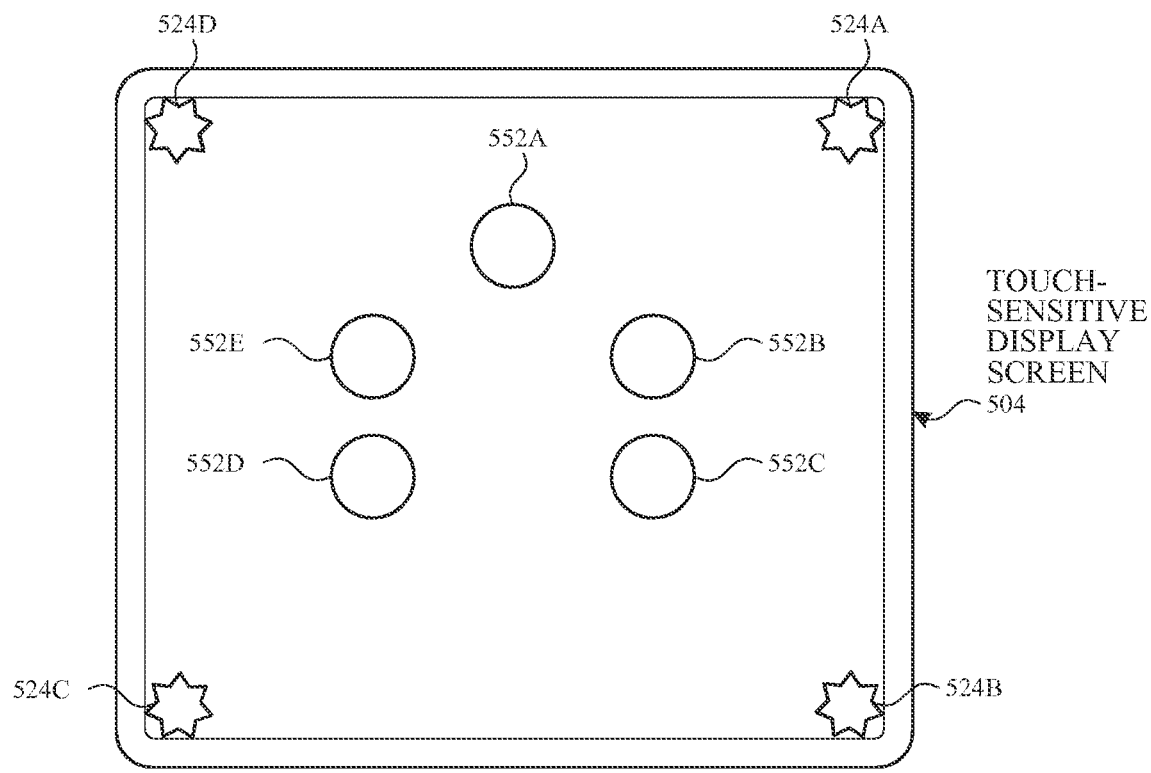
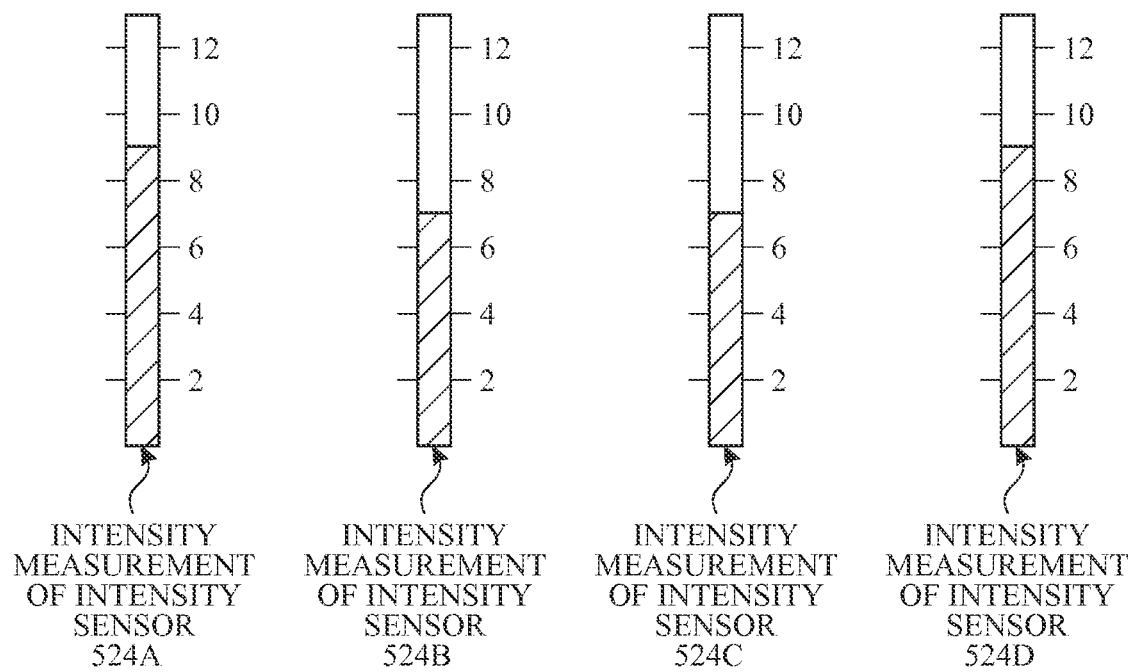
FIG. 5C

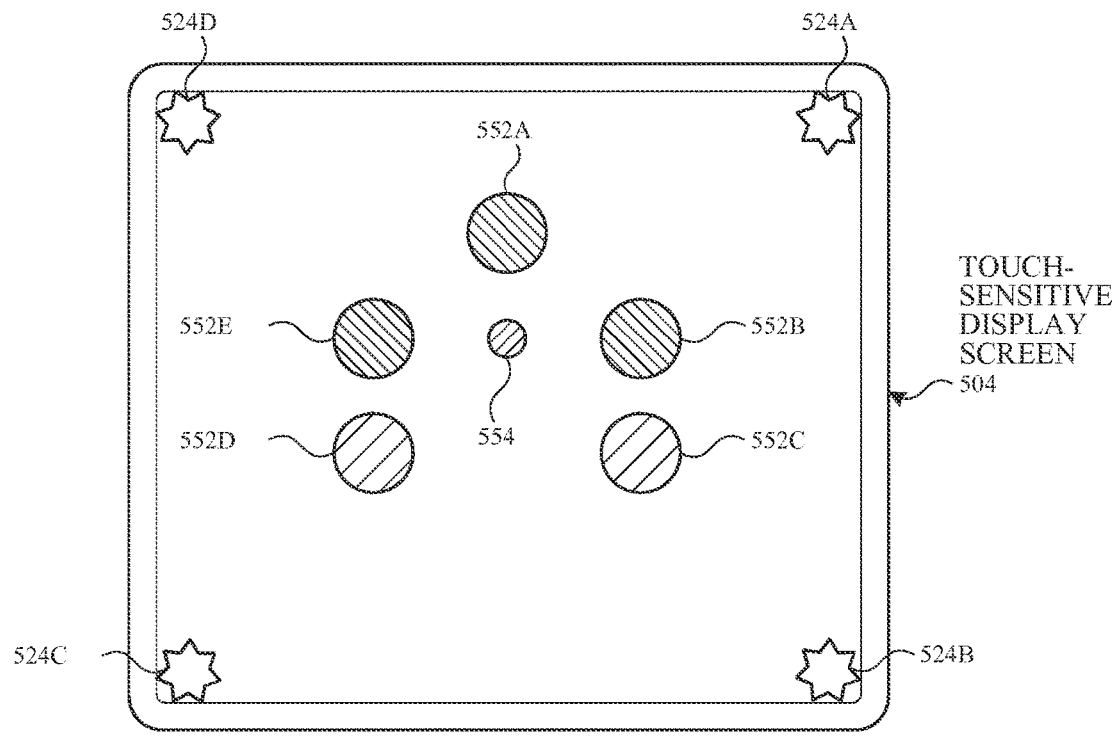
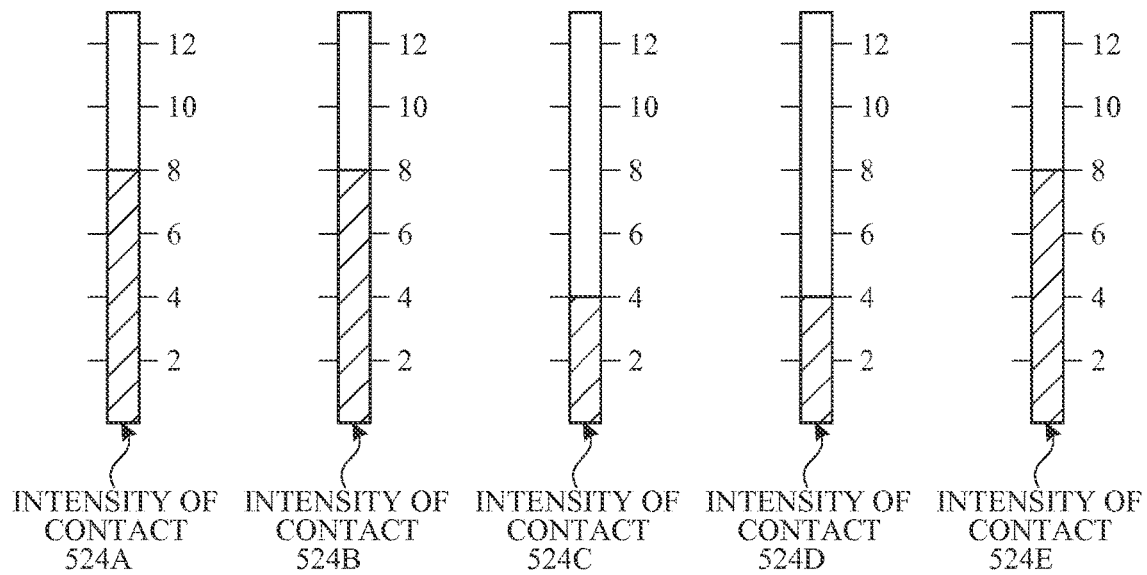
*FIG. 5D*

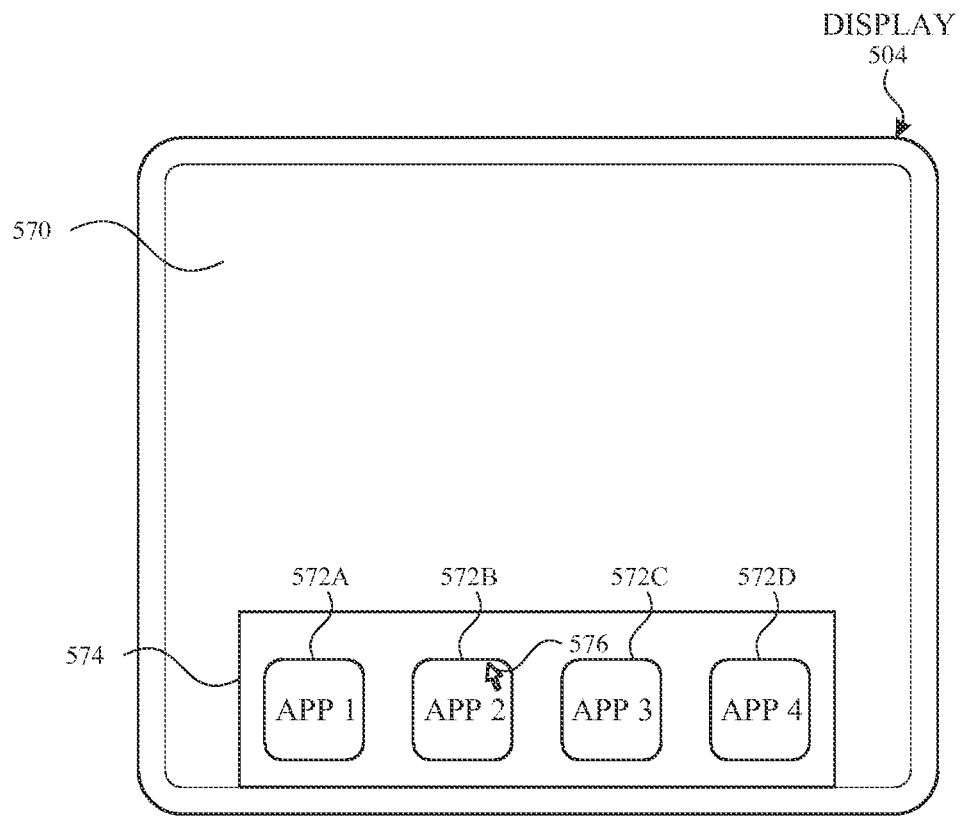
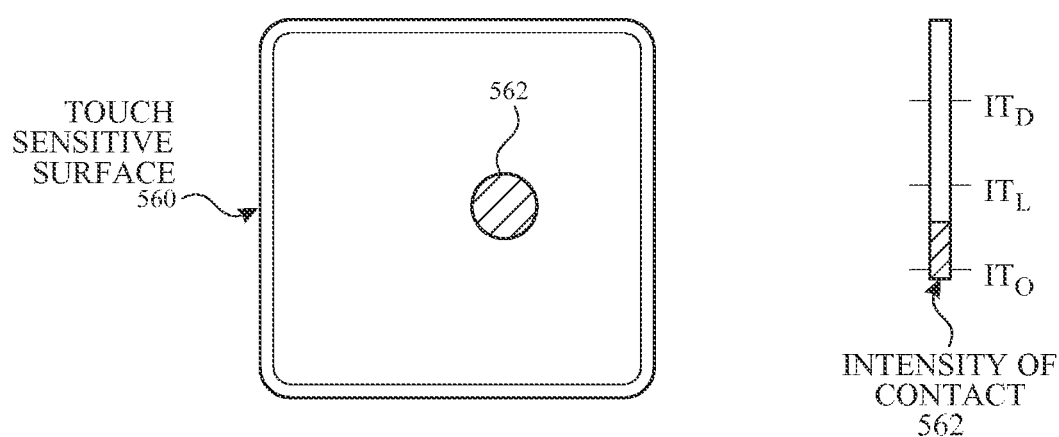
FIG. 5E

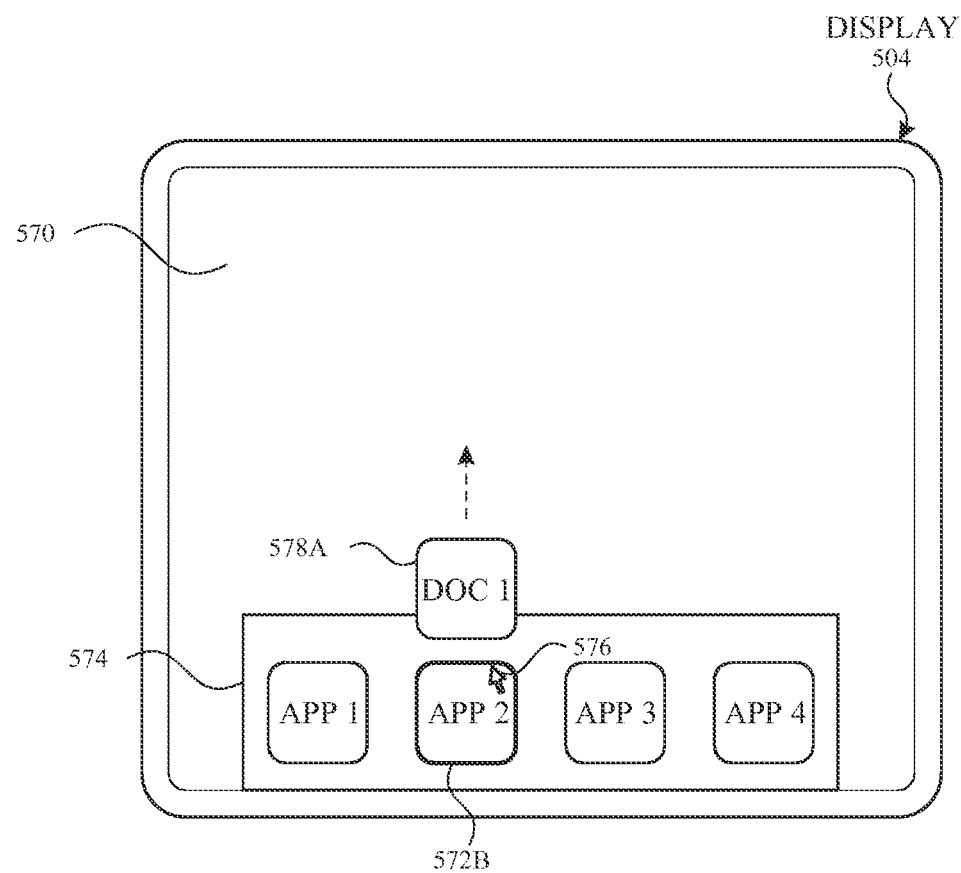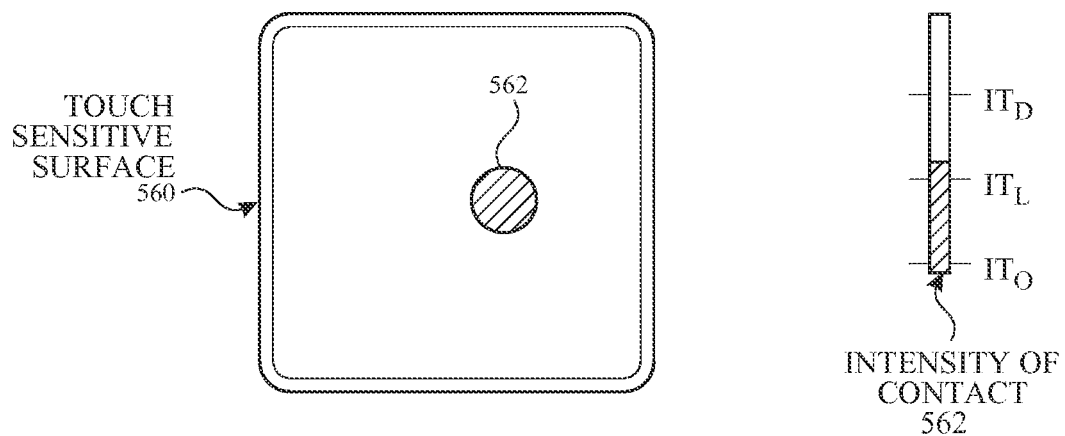
*FIG. 5F*

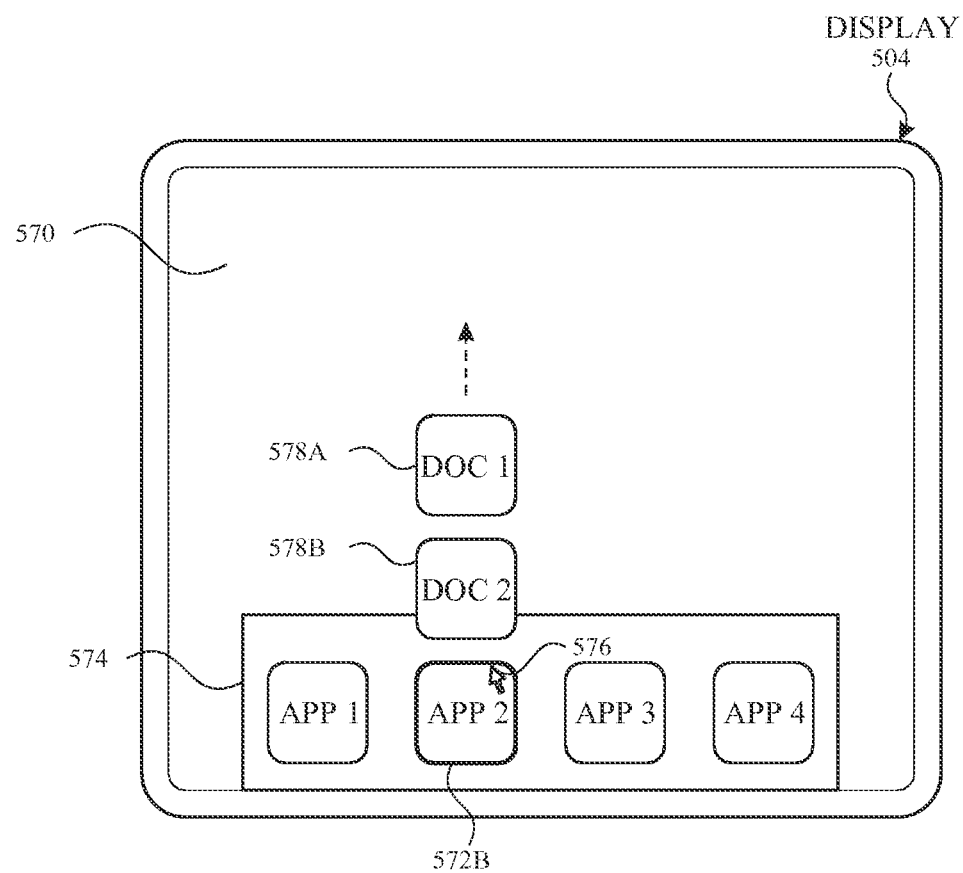
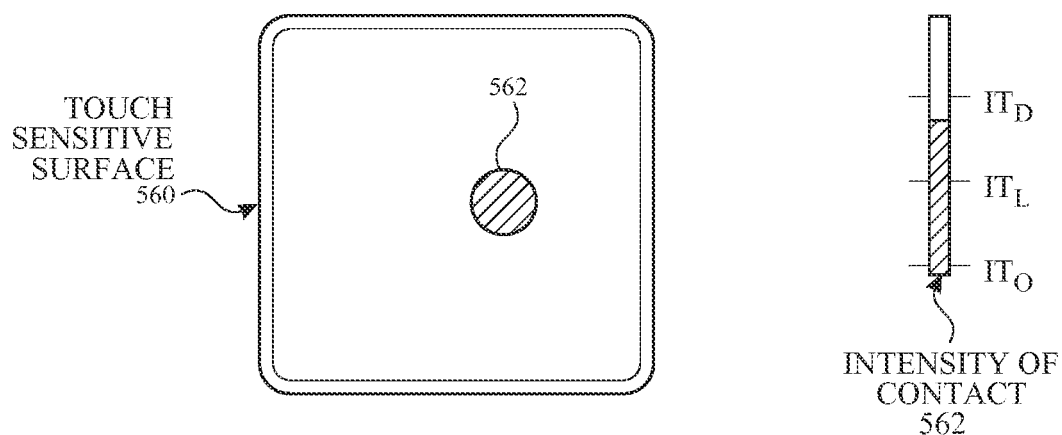
FIG. 5G

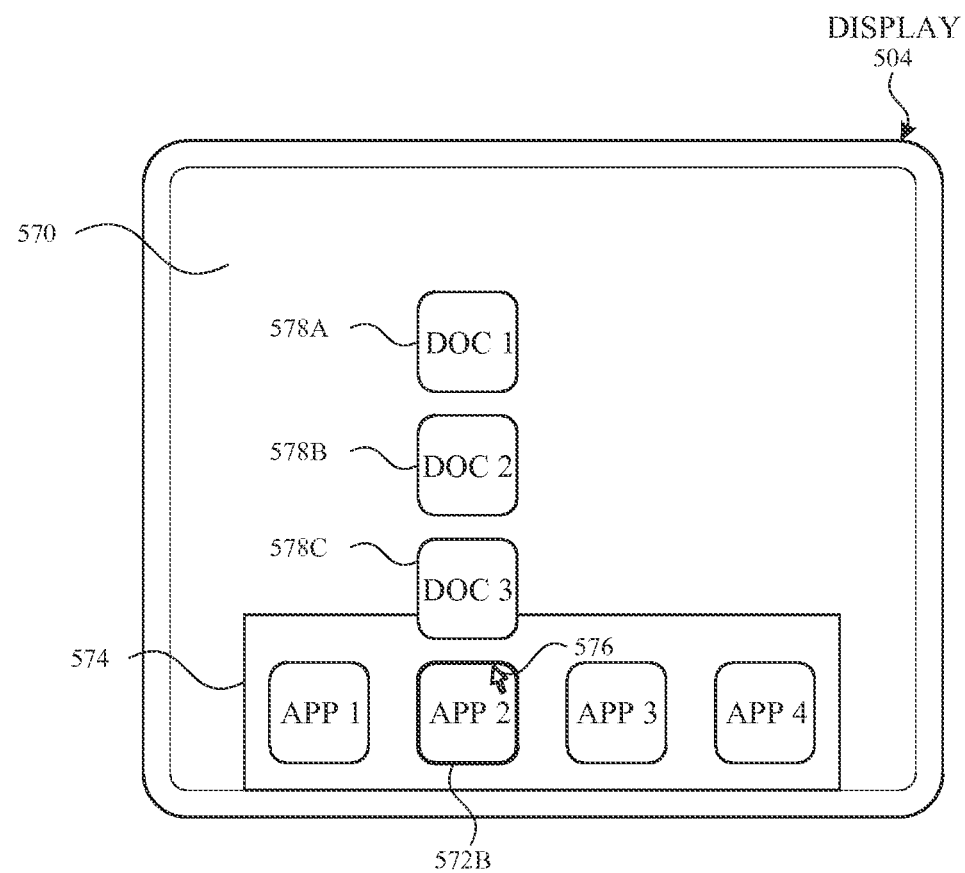
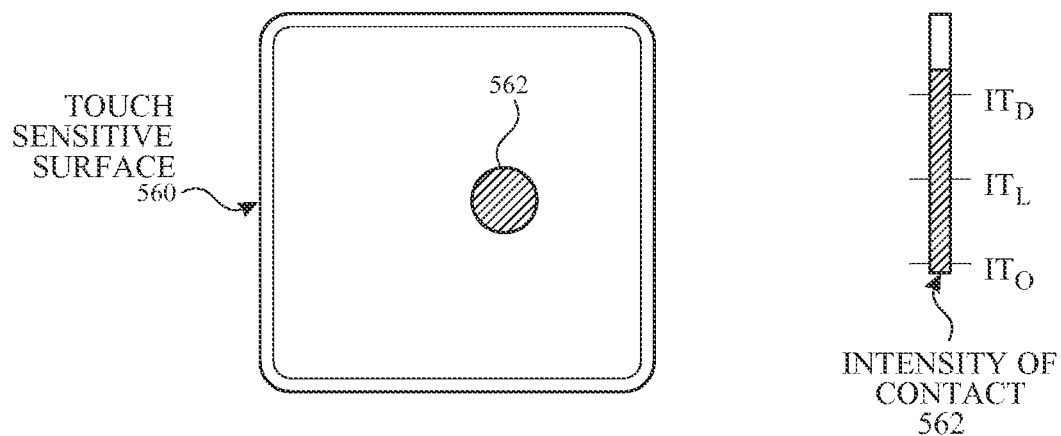
FIG. 5H

1500

1502

Display an affordance representing a weather application on the touch-sensitive display

1504

Detect a contact on the displayed affordance

1506

In response to detecting the contact, launch the weather application

1508

Display indications of a location and a current temperature at the location

1510

While displaying the indications, detect movement of the rotatable input mechanism

1512

In response to detecting the movement, display a forecasted temperature for the location Optionally, detect a swipe on the touch-sensitive display Optionally, in response to detecting the swipe, display a current temperature for a second location distinct from the first location

Display an affordance representing a weather application on the touch-sensitive display

1904

Detect a contact on the displayed affordance

1906

In response to detecting the contact, launch the weather application

1908

Display a grid including a plurality of regions representing different geographic locations

1910

Detect a contact on a region representing a first location

1912

In response to detecting the contact, display a current temperature at the first location

1914

Detect movement of the rotatable input mechanism

1916

In response to detecting the movement, display a temperature at the second location, the plurality of regions, a forecasted temperature for the first location, or additional weather information for the first location

Display an image representing a weather condition for a first time of day

2004

Display an affordance at a first position corresponding to the first time

2006

Detect movement of the rotatable input mechanism

2008

In response to detecting the movement, move the affordance from the first position to a second position corresponding to a second time of the day

2010

Update the image to represent a weather condition for the second time of the day

Obtain, via wireless communication, weather information for a location comprising a current weather condition and a forecasted weather condition

3004

Display a clock having a clock face comprising a first hour marker and a second hour marker. The first hour marker comprises a first image indicative of the current weather condition and the second hour marker comprises a second image indicative of the forecasted weather condition

*FIG. 30*

WEATHER USER INTERFACE

CROSS-REFERENCE TO RELATED APPLICATIONS

This application is a continuation of U.S. non-Provisional application Ser. No. 17/987,731, filed Nov. 15, 2022, which is a continuation of U.S. non-Provisional application Ser. No. 17/341,839, filed Jun. 8, 2021, now U.S. Pat. No. 11,550,465, which is a continuation of U.S. non-Provisional application Ser. No. 16/659,507, filed Oct. 21, 2019, now U.S. Pat. No. 11,042,281, which is a continuation of U.S. non-Provisional application Ser. No. 14/821,667, filed Aug. 7, 2015, now U.S. Pat. No. 10,452,253, which claims priority to the following applications: U.S. Provisional Application Ser. No. 62/038,079, filed Aug. 15, 2014, and U.S. Provisional Application Ser. No. 62/129,890, filed Mar. 8, 2015. The content of each of these applications is hereby incorporated by reference in its entirety.

FIELD

The present disclosure relates generally to computer user interfaces, and more specifically to user interfaces for providing weather information on an electronic device.

BACKGROUND

Electronic devices may provide various types of information to a user throughout the day. One type of information that a user may wish to access through such an electronic device is weather information. For example, a user may wish to obtain weather information, such as current or forecasted weather conditions, for a location of interest. A user may wish to receive an alert of the weather conditions, such as weather conditions at the device's (and user's) location or the location of an upcoming event. As electronics packaging techniques improve, smaller and more portable devices are made, which challenges computer user interface designers with providing weather information—that a user is accustomed to receiving—on reduced-size devices. That is, user interfaces that provide weather conditions, weather alerts, and other weather information to a user on a reduced-size portable electronic device will become increasingly desirable.

SUMMARY

Some techniques for providing weather information on an electronic device such as a portable multifunction device are cumbersome and inefficient. For example, some techniques require a user to execute several inputs and to navigate a complex series of nested menus in order to access weather information of interest. Some techniques are inefficient in that they require more complex and cumbersome inputs and more time than necessary, which wastes user time and device energy. On highly portable electronic devices, which may have smaller touchscreens, the navigational inputs required by these techniques are particularly challenging as incremental touch movements may block much of the touchscreen. On battery-operated devices, these techniques impose user interface interactions that demand battery power.

Accordingly, the present inventions provide, inter alia, the benefit of electronic devices with more efficient, less cumbersome methods and interfaces for providing weather information. Such methods and interfaces optionally complement or replace other methods for providing weather information. Such methods and interfaces reduce the cognitive burden on a user and produce a more efficient man-machine interface. Such methods and interfaces may also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out. For battery-operated computing devices, such methods and interfaces conserve power and increase the time between battery charges (and decrease the time to fully charge a battery), including by reducing unnecessary or accidental inputs and by obviating unnecessary extra user inputs.

The above deficiencies and other problems are reduced or eliminated by the disclosed devices, methods, and computer-readable media. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has hardware input mechanisms such as depressible buttons and/or rotatable input mechanisms. In some embodiments, the device has a graphical user interface (GUI), one or more processors, memory, and one or more modules, programs, or sets of instructions stored in the memory for performing multiple functions. In some embodiments, the user interacts with the GUI through finger contacts and gestures on the touch-sensitive surface and/or through rotating the rotatable input mechanism and/or through depressing hardware buttons. Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a method of providing weather information comprises: at an electronic device with a touch-sensitive display and a rotatable input mechanism: displaying an affordance on the touch-sensitive display, the affordance representing a weather application; detecting a contact on the displayed affordance; in response to detecting the contact: launching the weather application; displaying at least a portion of a first user interface screen including indications of a first location and a temperature at the first location; while displaying the first user interface screen, detecting user input; determining whether the user input is movement of the rotatable input mechanism or a swipe on the touch-sensitive display; in accordance with a determination that the user input is movement of the rotatable input mechanism, scrolling the first user interface screen; and in accordance with a determination that the user input is a swipe, displaying at least a portion of a second interface screen including indications of a second location and a temperature at the second location.

In some embodiments, a non-transitory computer-readable storage medium comprises instructions for: displaying an affordance on a touch-sensitive display, the affordance representing a weather application; detecting a contact on the displayed affordance; in response to detecting the contact: launching the weather application; displaying at least a portion of a first user interface screen including indications of a first location and a temperature at the first location; while displaying the first user interface screen, detecting user input; determining whether the user input is movement of a rotatable input mechanism or a swipe on the touch-sensitive display; in accordance with a determination that the user input is movement of the rotatable input mechanism, scrolling the first user interface screen; and in accordance with a determination that the user input is a swipe, displaying at least a portion of a second interface screen including indications of a second location and a temperature at the second location.

In some embodiments, a transitory computer-readable storage medium comprises instructions for: displaying an affordance on a touch-sensitive display, the affordance representing a weather application; detecting a contact on the displayed affordance; in response to detecting the contact: launching the weather application; displaying at least a portion of a first user interface screen including indications of a first location and a temperature at the first location; while displaying the first user interface screen, detecting user input; determining whether the user input is movement of a rotatable input mechanism or a swipe on the touch-sensitive display; in accordance with a determination that the user input is movement of the rotatable input mechanism, scrolling the first user interface screen; and in accordance with a determination that the user input is a swipe, displaying at least a portion of a second interface screen including indications of a second location and a temperature at the second location.

In some embodiments, a device comprises a touch-sensitive display; a rotatable input mechanism; one or more processors; and memory storing instructions that, when executed by the one or more processors, cause the one or more processors to: display an affordance on the touch-sensitive display, the affordance representing a weather application; detect a contact on the displayed affordance; in response to detecting the contact: launch the weather application; display at least a portion of a first user interface screen including indications of a first location and a temperature at the first location; while displaying the first user interface screen, detect user input; determine whether the user input is movement of the rotatable input mechanism or a swipe on the touch-sensitive display; in accordance with a determination that the user input is movement of the rotatable input mechanism, scroll the first user interface screen; and in accordance with a determination that the user input is a swipe, display at least a portion of a second interface screen including indications of a second location and a temperature at the second location.

In some embodiments, a device comprises means for displaying an affordance on a touch-sensitive display, the affordance representing a weather application; means for detecting a contact on the displayed affordance; means responsive to detecting the contact for launching the weather application; means for displaying at least a portion of a first user interface screen including indications of a first location and a temperature at the first location; means for detecting user input while displaying the first user interface screen; means for determining whether the user input is movement of a rotatable input mechanism or a swipe on the touch-sensitive display; means for scrolling the first user interface screen in accordance with a determination that the user input is movement of the rotatable input mechanism; and means for displaying at least a portion of a second interface screen including indications of a second location and a temperature at the second location in accordance with a determination that the user input is a swipe.

In some embodiments, an electronic device comprises a touch-sensitive display unit; a rotatable input mechanism unit; and a processing unit coupled to the touch-sensitive display unit and the rotatable input mechanism unit, the processing unit configured to: enable display of an affordance on the touch-sensitive display unit, the affordance representing a weather application; detect a contact on the displayed affordance; in response to detecting the contact: launch the weather application; enable display of at least a portion of a first user interface screen including indications of a first location and a temperature at the first location; detect user input while displaying the first user interface screen; determine whether the user input is movement of the rotatable input mechanism unit or a swipe on the touch-sensitive display unit; in accordance with a determination that the user input is movement of the rotatable input mechanism unit, scroll the first user interface screen; and in accordance with a determination that the user input is a swipe, enable display of at least a portion of a second interface screen including indications of a second location and a temperature at the second location.

In some embodiments, a method of providing weather information comprises: at an electronic device with a touch-sensitive display and a rotatable input mechanism: displaying an affordance on the touch-sensitive display, the affordance representing a weather application; detecting a contact on the displayed affordance, and in response to detecting the contact: launching the weather application, and displaying indications of a location and a current temperature at the location; while displaying the indications of the location and the current temperature, detecting movement of the rotatable input mechanism; and in response to detecting the movement, displaying a forecasted temperature for the location.

In some embodiments, a non-transitory computer-readable storage medium comprises instructions for: displaying an affordance on a touch-sensitive display, the affordance representing a weather application; detecting a contact on the displayed affordance, and in response to detecting the contact: launching the weather application, and displaying indications of a location and a current temperature at the location; while displaying the indications of the location and the current temperature, detecting movement of a rotatable input mechanism; and in response to detecting the movement, displaying a forecasted temperature for the location.

In some embodiments, a transitory computer-readable storage medium comprises instructions for: displaying an affordance on a touch-sensitive display, the affordance representing a weather application; detecting a contact on the displayed affordance, and in response to detecting the contact: launching the weather application, and displaying indications of a location and a current temperature at the location; while displaying the indications of the location and the current temperature, detecting movement of a rotatable input mechanism; and in response to detecting the movement, displaying a forecasted temperature for the location.

In some embodiments, a device comprises a touch-sensitive display; a rotatable input mechanism; one or more processors; and memory storing instructions that, when executed by the one or more processors, cause the one or more processors to: display an affordance on the touch-sensitive display, the affordance representing a weather application; detect a contact on the displayed affordance, and in response to detecting the contact: launch the weather application, and display indications of a location and a current temperature at the location; while displaying the indications of the location and the current temperature, detect movement of the rotatable input mechanism; and in response to detecting the movement, display a forecasted temperature for the location.

In some embodiments, a device comprises means for displaying an affordance on a touch-sensitive display, the affordance representing a weather application; means for detecting a contact on the displayed affordance, means responsive to detecting the contact for launching the weather application, and means responsive to detecting the contact for displaying indications of a location and a current temperature at the location; means for detecting movement of a rotatable input mechanism while displaying the indications of the location and the current temperature; and means responsive to detecting the movement for displaying a forecasted temperature for the location.

In some embodiments, an electronic device comprises a touch-sensitive display unit; a rotatable input mechanism unit; and a processing unit coupled to the touch-sensitive display unit and the rotatable input mechanism unit, the processing unit configured to: enable display of an affordance on the touch-sensitive display unit, the affordance representing a weather application; detect a contact on the displayed affordance, and in response to detecting the contact: launch the weather application, and enable display of indications of a location and a current temperature at the location; while displaying the indications of the location and the current temperature, detect movement of the rotatable input mechanism unit; and in response to detecting the movement, enable display of a forecasted temperature for the location.

In some embodiments, a method of providing weather information comprises: at an electronic device with a touch-sensitive display and a rotatable input mechanism: displaying an affordance on the touch-sensitive display, the affordance representing a weather application; detecting a contact on the displayed affordance; in response to detecting the contact, launching the weather application, and displaying indications of a first location and a current temperature at the first location; while displaying the indications of the first location and current temperature, detecting movement of the rotatable input mechanism; and in response to detecting the movement of the rotatable input mechanism, displaying indications of a second location distinct from the first location, and a current temperature at the second location.

In some embodiments, a non-transitory computer-readable storage medium comprises instructions for: displaying an affordance on a touch-sensitive display, the affordance representing a weather application; detecting a contact on the displayed affordance; in response to detecting the contact, launching the weather application, and displaying indications of a first location and a current temperature at the first location; while displaying the indications of the first location and current temperature, detecting movement of a rotatable input mechanism; and in response to detecting the movement of the rotatable input mechanism, displaying indications of a second location distinct from the first location, and a current temperature at the second location.

In some embodiments, a transitory computer-readable storage medium comprises instructions for: displaying an affordance on a touch-sensitive display, the affordance representing a weather application; detecting a contact on the displayed affordance; in response to detecting the contact, launching the weather application, and displaying indications of a first location and a current temperature at the first location; while displaying the indications of the first location and current temperature, detecting movement of a rotatable input mechanism; and in response to detecting the movement of the rotatable input mechanism, displaying indications of a second location distinct from the first location, and a current temperature at the second location.

In some embodiments, a device comprises a touch-sensitive display; a rotatable input mechanism; one or more processors; and memory storing instructions that, when executed by the one or more processors, cause the one or more processors to: display an affordance on the touch-sensitive display, the affordance representing a weather application; detect a contact on the displayed affordance; in response to detecting the contact, launch the weather application, and display indications of a first location and a current temperature at the first location; while displaying the indications of the first location and current temperature, detect movement of the rotatable input mechanism; and in response to detecting the movement of the rotatable input mechanism, display indications of a second location distinct from the first location, and a current temperature at the second location.

In some embodiments, a device comprises means for displaying an affordance on a touch-sensitive display, the affordance representing a weather application; means for detecting a contact on the displayed affordance; means responsive to detecting the contact for launching the weather application, and means responsive to detecting the contact for displaying indications of a first location and a current temperature at the first location; means for detecting movement of a rotatable input mechanism while displaying the indications of the first location and current temperature; and means responsive to detecting the movement of the rotatable input mechanism for displaying indications of a second location distinct from the first location, and a current temperature at the second location.

In some embodiments, an electronic device comprises a touch-sensitive display unit; a rotatable input mechanism unit; and a processing unit coupled to the touch-sensitive display unit and the rotatable input mechanism unit, the processing unit configured to: enable display of an affordance on the touch-sensitive display unit, the affordance representing a weather application; detect a contact on the displayed affordance, and in response to detecting the contact, launch the weather application, and enable display of indications of a first location and a current temperature at the first location; while displaying the indications of the first location and current temperature, detect movement of the rotatable input mechanism unit; and in response to detecting the movement of the rotatable input mechanism unit, enable display of indications of a second location distinct from the first location, and a current temperature at the second location.

In some embodiments, a method of providing weather information comprises: at an electronic device with a touch-sensitive display: obtaining first data representing an upcoming activity; determining that the activity is to begin within a threshold amount of time; and in accordance with the determination the upcoming activity is to begin within a threshold amount of time, displaying weather information based on the upcoming activity.

In some embodiments, a non-transitory computer-readable storage medium comprises instructions for: obtaining first data representing an upcoming activity; determining that the activity is to begin within a threshold amount of time; and in accordance with the determination the upcoming activity is to begin within a threshold amount of time, displaying weather information based on the upcoming activity.

In some embodiments, a transitory computer-readable storage medium comprises instructions for: obtaining first data representing an upcoming activity; determining that the activity is to begin within a threshold amount of time; and in accordance with the determination the upcoming activity is to begin within a threshold amount of time, displaying weather information based on the upcoming activity.

In some embodiments, a device comprises a touch-sensitive display; one or more processors; and memory storing instructions that, when executed by the one or more processors, cause the one or more processors to: obtain first data representing an upcoming activity; determine that the activity is to begin within a threshold amount of time; and in accordance with the determination the upcoming activity is to begin within a threshold amount of time, display weather information based on the upcoming activity.

In some embodiments, a device comprises means for obtaining first data representing an upcoming activity; means for determining that the activity is to begin within a threshold amount of time; and means for displaying weather information based on the upcoming activity in accordance with the determination the upcoming activity is to begin within a threshold amount of time.

In some embodiments, an electronic device comprises a touch-sensitive display unit; and a processing unit coupled to the touch-sensitive display unit, the processing unit configured to: obtain a first data representing an upcoming activity; determine that the activity is to begin within a threshold amount of time; and in accordance with a determination the upcoming activity is to begin within a threshold amount of time, enable display of weather information based on the upcoming activity.

In some embodiments, a method of providing weather information comprises: at an electronic device with a touch-sensitive display: displaying an affordance on the touch-sensitive display, the affordance representing a weather application; detecting a contact on the affordance; in response to detecting the contact on the affordance: launching the weather application, and displaying a grid comprising a plurality of grid portions representing different geographic locations, including a first grid portion representing a first location and a second grid portion representing a second location, the first grid portion abutting the second grid portion; detecting a contact on the first grid portion; and in response to detecting the contact on the first grid portion: ceasing to displaying the grid, and displaying a current temperature at the first location.

In some embodiments, a non-transitory computer-readable storage medium comprises instructions for: displaying an affordance on a touch-sensitive display, the affordance representing a weather application; detecting a contact on the affordance; in response to detecting the contact on the affordance: launching the weather application, and displaying a grid comprising a plurality of grid portions representing different geographic locations, including a first grid portion representing a first location and a second grid portion representing a second location, the first grid portion abutting the second grid portion; detecting a contact on the first grid portion; and in response to detecting the contact on the first grid portion: ceasing to displaying the grid, and displaying a current temperature at the first location.

In some embodiments, a transitory computer-readable storage medium comprises instructions for: displaying an affordance on a touch-sensitive display, the affordance representing a weather application; detecting a contact on the affordance; in response to detecting the contact on the affordance: launching the weather application, and displaying a grid comprising a plurality of grid portions representing different geographic locations, including a first grid portion representing a first location and a second grid portion representing a second location, the first grid portion abutting the second grid portion; detecting a contact on the first grid portion; and in response to detecting the contact on the first grid portion: ceasing to displaying the grid, and displaying a current temperature at the first location.

In some embodiments, a device comprises a touch-sensitive display; one or more processors; and memory storing instructions that, when executed by the one or more processors, cause the one or more processors to: display an affordance on the touch-sensitive display, the affordance representing a weather application; detect a contact on the affordance; in response to detecting the contact on the affordance: launch the weather application, and display a grid comprising a plurality of grid portions representing different geographic locations, including a first grid portion representing a first location and a second grid portion representing a second location, the first grid portion abutting the second grid portion; detect a contact on the first grid portion; and in response to detecting the contact on the first grid portion: cease to display the grid, and display a current temperature at the first location.

In some embodiments, a device comprises means for displaying an affordance on a touch-sensitive display, the affordance representing a weather application; means for detecting a contact on the affordance; means responsive to detecting the contact on the affordance for launching the weather application, and means responsive to detecting the contact on the affordance for displaying a grid comprising a plurality of grid portions representing different geographic locations, including a first grid portion representing a first location and a second grid portion representing a second location, the first grid portion abutting the second grid portion; means for detecting a contact on the first grid portion; and means responsive to detecting the contact on the first grid portion for ceasing to displaying the grid, and means responsive to detecting the contact on the first grid portion for displaying a current temperature at the first location.

In some embodiments, an electronic device comprises a touch-sensitive display unit; and a processing unit coupled to the touch-sensitive display unit, the processing unit configured to: enable display of an affordance on the touch-sensitive display unit, the affordance representing a weather application; detect a contact on the affordance; in response to detecting the contact on the affordance: launch the weather application, and enable display of a grid comprising a plurality of grid portions representing different geographic locations, including a first grid portion representing a first location and a second grid portion representing a second location, the first grid portion abutting the second grid portion; detect a contact on the first grid portion; and in response to detecting the contact on the first grid portion: cease to enable display of the grid, and enable display of a current temperature at the first location.

In some embodiments, a method of providing weather information comprises: at an electronic device with a touch-sensitive display and a rotatable input mechanism: displaying an affordance on the touch-sensitive display, the affordance representing a weather application; detecting a contact on the affordance; in response to detecting the contact on the affordance: launching the weather application, and displaying a plurality of regions representing different geographic locations, the regions arranged along a vertical column, including a first region representing a first location and a second region representing a second location, the first region abutting the second region; detecting a contact on the first region; in response to detecting the contact on the first region: displaying a current temperature at the first location; detecting movement of the rotatable input mechanism; and in response to detecting the movement: displaying information selected from the group consisting of a temperature at the second location, the plurality of regions, a forecasted temperature, and additional weather information.

In some embodiments, a non-transitory computer-readable storage medium comprises instructions for: displaying an affordance on a touch-sensitive display, the affordance representing a weather application; detecting a contact on the affordance; in response to detecting the contact on the affordance: launching the weather application, and displaying a plurality of regions representing different geographic locations, the regions arranged along a vertical column, including a first region representing a first location and a second region representing a second location, the first region abutting the second region; detecting a contact on the first region; in response to detecting the contact on the first region: displaying a current temperature at the first location; detecting movement of a rotatable input mechanism; and in response to detecting the movement: displaying information selected from the group consisting of a temperature at the second location, the plurality of regions, a forecasted temperature, and additional weather information.

In some embodiments, a transitory computer-readable storage medium comprises instructions for: displaying an affordance on a touch-sensitive display, the affordance representing a weather application; detecting a contact on the affordance; in response to detecting the contact on the affordance: launching the weather application, and displaying a plurality of regions representing different geographic locations, the regions arranged along a vertical column, including a first region representing a first location and a second region representing a second location, the first region abutting the second region; detecting a contact on the first region; in response to detecting the contact on the first region: displaying a current temperature at the first location; detecting movement of a rotatable input mechanism; and in response to detecting the movement: displaying information selected from the group consisting of a temperature at the second location, the plurality of regions, a forecasted temperature, and additional weather information.

In some embodiments, a device comprises a touch-sensitive display; a rotatable input mechanism; one or more processors; and memory storing instructions that, when executed by the one or more processors, cause the one or more processors to: display an affordance on the touch-sensitive display, the affordance representing a weather application; detect a contact on the affordance; in response to detecting the contact on the affordance: launch the weather application, and display a plurality of regions representing different geographic locations, the regions arranged along a vertical column, including a first region representing a first location and a second region representing a second location, the first region abutting the second region; detect a contact on the first region; in response to detecting the contact on the first region: display a current temperature at the first location; detect movement of the rotatable input mechanism; and in response to detecting the movement: display information selected from the group consisting of a temperature at the second location, the plurality of regions, a forecasted temperature, and additional weather information.

In some embodiments, a device comprises means for displaying an affordance on a touch-sensitive display, the affordance representing a weather application; means for detecting a contact on the affordance; means responsive to detecting the contact on the affordance for launching the weather application, and means responsive to detecting the contact on the affordance for displaying a plurality of regions representing different geographic locations, the regions arranged along a vertical column, including a first region representing a first location and a second region representing a second location, the first region abutting the second region; means for detecting a contact on the first region; means responsive to detecting the contact on the first region for displaying a current temperature at the first location; means for detecting movement of a rotatable input mechanism; and means responsive to detecting the movement for displaying information selected from the group consisting of a temperature at the second location, the plurality of regions, a forecasted temperature, and additional weather information.

In some embodiments, an electronic device comprises a touch-sensitive display unit; a rotatable input mechanism unit; and a processing unit coupled to the touch-sensitive display unit and the rotatable input mechanism unit, the processing unit configured to: enable display of an affordance on the touch-sensitive display unit, the affordance representing a weather application; detect a contact on the affordance; in response to detecting the contact on the affordance: launch the weather application, and enable display of a plurality of regions representing different geographic locations, the regions arranged along a vertical column, including a first region representing a first location and a second region representing a second location, the first region abutting the second region; detect a contact on the first region; in response to detecting the contact on the first region, enable display of a current temperature at the first location; detect movement of the rotatable input mechanism unit; and in response to detecting the movement, enable display of information selected from the group consisting of a temperature at the second location, the plurality of regions, a forecasted temperature for the first location, and additional weather information for the first location.

In some embodiments, a method of providing weather information comprises: at an electronic device with a touch-sensitive display and a rotatable input mechanism: displaying an image representing a weather condition for a first time of day; displaying an affordance at a first position, the first position corresponding to the first time; detecting movement of the rotatable input mechanism; and in response to detecting the movement: moving the affordance from the first position to a second position corresponding to a second time of the day, and updating the image to represent a weather condition for the second time of the day.

In some embodiments, a non-transitory computer-readable storage medium comprises instructions for: displaying an image representing a weather condition for a first time of day; displaying an affordance at a first position, the first position corresponding to the first time; detecting movement of a rotatable input mechanism; and in response to detecting the movement: moving the affordance from the first position to a second position corresponding to a second time of the day, and updating the image to represent a weather condition for the second time of the day.

In some embodiments, a transitory computer-readable storage medium comprises instructions for: displaying an image representing a weather condition for a first time of day; displaying an affordance at a first position, the first position corresponding to the first time; detecting movement of a rotatable input mechanism; and in response to detecting the movement: moving the affordance from the first position to a second position corresponding to a second time of the day, and updating the image to represent a weather condition for the second time of the day.

In some embodiments, a device comprises a touch-sensitive display; a rotatable input mechanism; one or more processors; and memory storing instructions that, when executed by the one or more processors, cause the one or more processors to: display an image representing a weather condition for a first time of day; display an affordance at a first position, the first position corresponding to the first time; detect movement of the rotatable input mechanism; and in response to detecting the movement: move the affordance from the first position to a second position corresponding to a second time of the day, and update the image to represent a weather condition for the second time of the day.

In some embodiments, a device comprises means for displaying an image representing a weather condition for a first time of day; means for displaying an affordance at a first position, the first position corresponding to the first time; means for detecting movement of a rotatable input mechanism; and means responsive to detecting the movement for moving the affordance from the first position to a second position corresponding to a second time of the day, and means responsive to detecting the movement for updating the image to represent a weather condition for the second time of the day.

In some embodiments, an electronic device comprises a touch-sensitive display unit; a rotatable input mechanism unit; and a processing unit coupled to the touch-sensitive display unit and the rotatable input mechanism unit, the processing unit configured to: enable display of an image representing a weather condition for a first time of day; enable display of an affordance at a first position, the first position corresponding to the first time; detect movement of the rotatable input mechanism unit; and in response to detecting the movement: move the affordance from the first position to a second position corresponding to a second time of the day, and update the image to represent a weather condition for the second time of the day.

In some embodiments, a method of providing weather information comprises: at an electronic device obtaining, via wireless communication, weather information for a location comprising a current weather condition and a forecasted weather condition; and displaying a clock having a clock face, where the clock face comprises a first hour marker and a second hour marker, where the first hour marker comprises a first image indicative of the current weather condition, and where the second hour marker comprises a second image indicative of the forecasted weather condition.

In some embodiments, a non-transitory computer-readable storage medium comprises instructions for: obtaining, via wireless communication, weather information for a location comprising a current weather condition and a forecasted weather condition; and displaying a clock having a clock face, where the clock face comprises a first hour marker and a second hour marker, where the first hour marker comprises a first image indicative of the current weather condition, and where the second hour marker comprises a second image indicative of the forecasted weather condition.

In some embodiments, a transitory computer-readable storage medium comprises instructions for: obtaining, via wireless communication, weather information for a location comprising a current weather condition and a forecasted weather condition; and displaying a clock having a clock face, where the clock face comprises a first hour marker and a second hour marker, where the first hour marker comprises a first image indicative of the current weather condition, and where the second hour marker comprises a second image indicative of the forecasted weather condition.

In some embodiments, a device comprises a touch-sensitive display; one or more processors; and memory storing instructions that, when executed by the one or more processors, cause the one or more processors to: obtain, via wireless communication, weather information for a location comprising a current weather condition and a forecasted weather condition; and display a clock having a clock face, where the clock face comprises a first hour marker and a second hour marker, where the first hour marker comprises a first image indicative of the current weather condition, and where the second hour marker comprises a second image indicative of the forecasted weather condition.

In some embodiments, a device comprises means for obtaining, via wireless communication, weather information for a location comprising a current weather condition and a forecasted weather condition; and means for displaying a clock having a clock face, where the clock face comprises a first hour marker and a second hour marker, where the first hour marker comprises a first image indicative of the current weather condition, and where the second hour marker comprises a second image indicative of the forecasted weather condition.

In some embodiments, an electronic device comprises a touch-sensitive display unit; and a processing unit coupled to the touch-sensitive display unit, the processing unit configured to: obtain, via wireless communication, weather information for a location comprising a current weather condition and a forecasted weather condition; and enable display on the display unit of a clock having a clock face, wherein the clock face comprises a first hour marker and a second hour marker, wherein the first hour marker comprises a first image indicative of the current weather condition, and wherein the second hour marker comprises a second image indicative of the forecasted weather condition.

Thus, devices are provided with more efficient and less cumbersome methods and interfaces for providing weather information, thereby increasing the effectiveness, efficiency, and user satisfaction with such devices. Such methods and interfaces may complement or replace other methods for providing weather information.

DESCRIPTION OF THE FIGURES

FIGS. 4A and 4B illustrate an exemplary user interface for a menu of applications on a portable multifunction device in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 15 is a flow diagram illustrating a process for providing weather information.

FIG. 19 is a flow diagram illustrating a process for providing weather information.

FIG. 20 is a flow diagram illustrating a process for providing weather information.

FIG. 30 is a flow diagram illustrating a process for providing weather information.

DETAILED DESCRIPTION

Figure 1A:
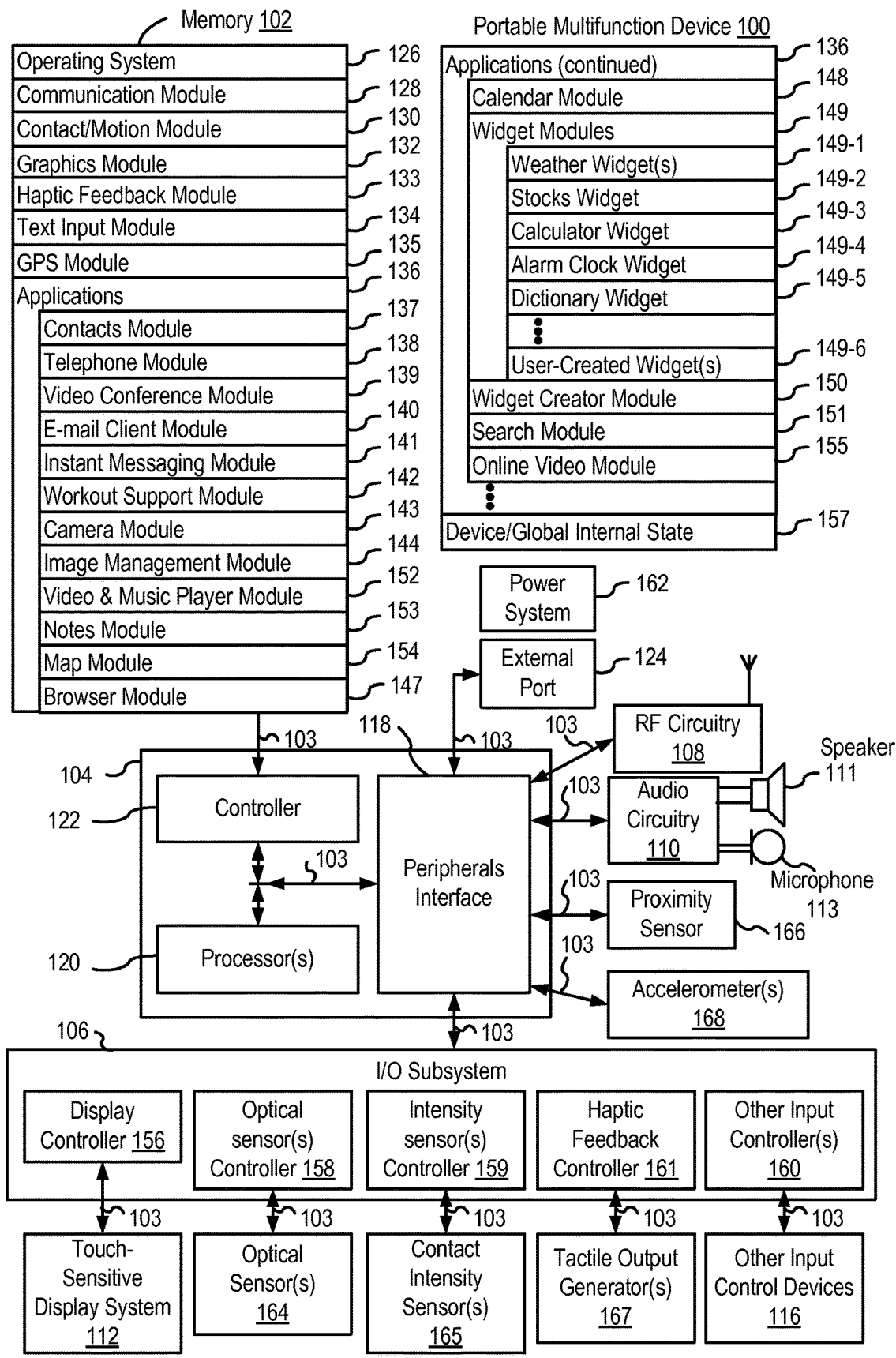
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

As discussed above, a user may wish to obtain various types of weather information and weather alerts from a reduced-size portable electronic device. Such information may include weather conditions (e.g., temperature, precipitation, sunshine, cloud cover, wind, and so forth), weather at a specific time of day, weather at a specific location, and weather forecasted for a specific time and location. It is desirable to provide this information to a user in a way that is conveniently accessible and comprehensive, yet also clear, concise, and usable when displayed on portable electronic devices.

Below, FIGS. 1A-1B, 2, 3, 4A-4B, and 5A-5B provide a description of exemplary devices for performing the techniques for providing weather information to a user. FIGS. 6-13 illustrate exemplary user interfaces for providing weather information on these exemplary devices. The user interfaces in the figures are also used to illustrate the processes described below, including the processes in FIGS. 14-20 and 30.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; U.S. patent application Ser. No. 11/240,788, "Proximity Detector In Handheld Device"; U.S. patent application Ser. No. 11/620,702, "Using Ambient Light Sensor To Augment Proximity Sensor Output"; U.S. patent application Ser. No. 11/586,862, "Automated Response To And Sensing Of User Activity In Portable Devices"; and U.S. patent application Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
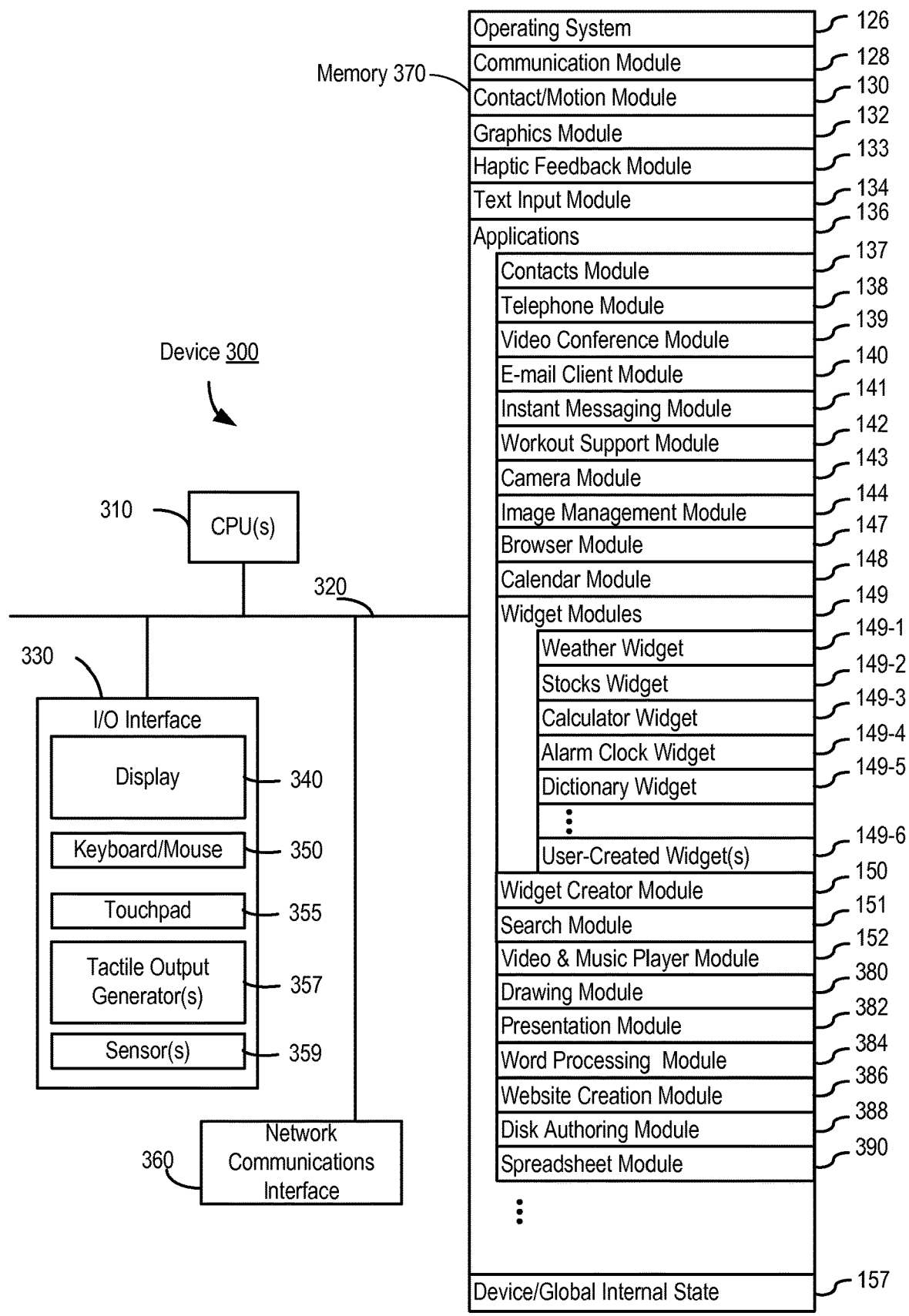
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including, without limitation, text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web-page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
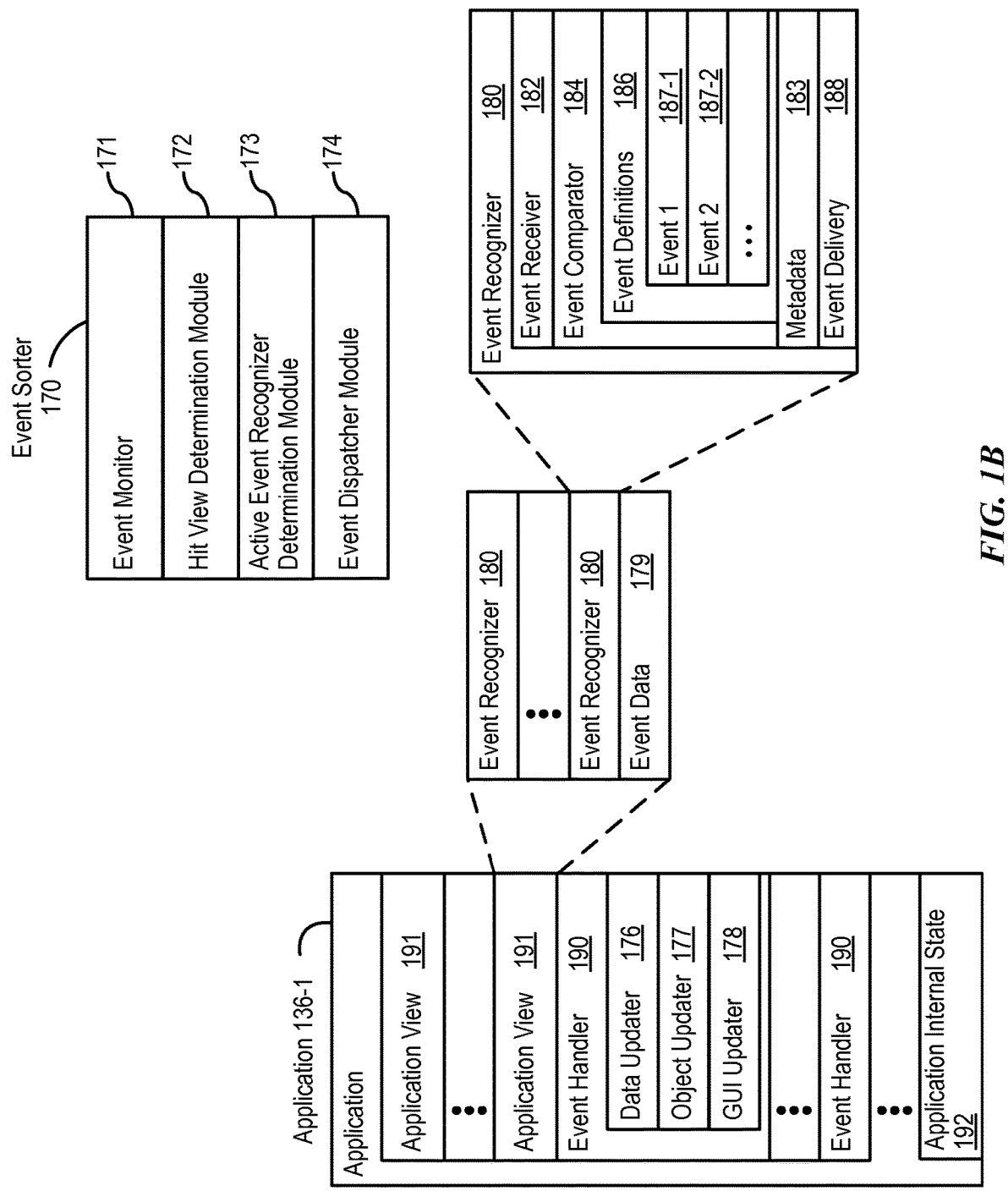
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

Figure 2:
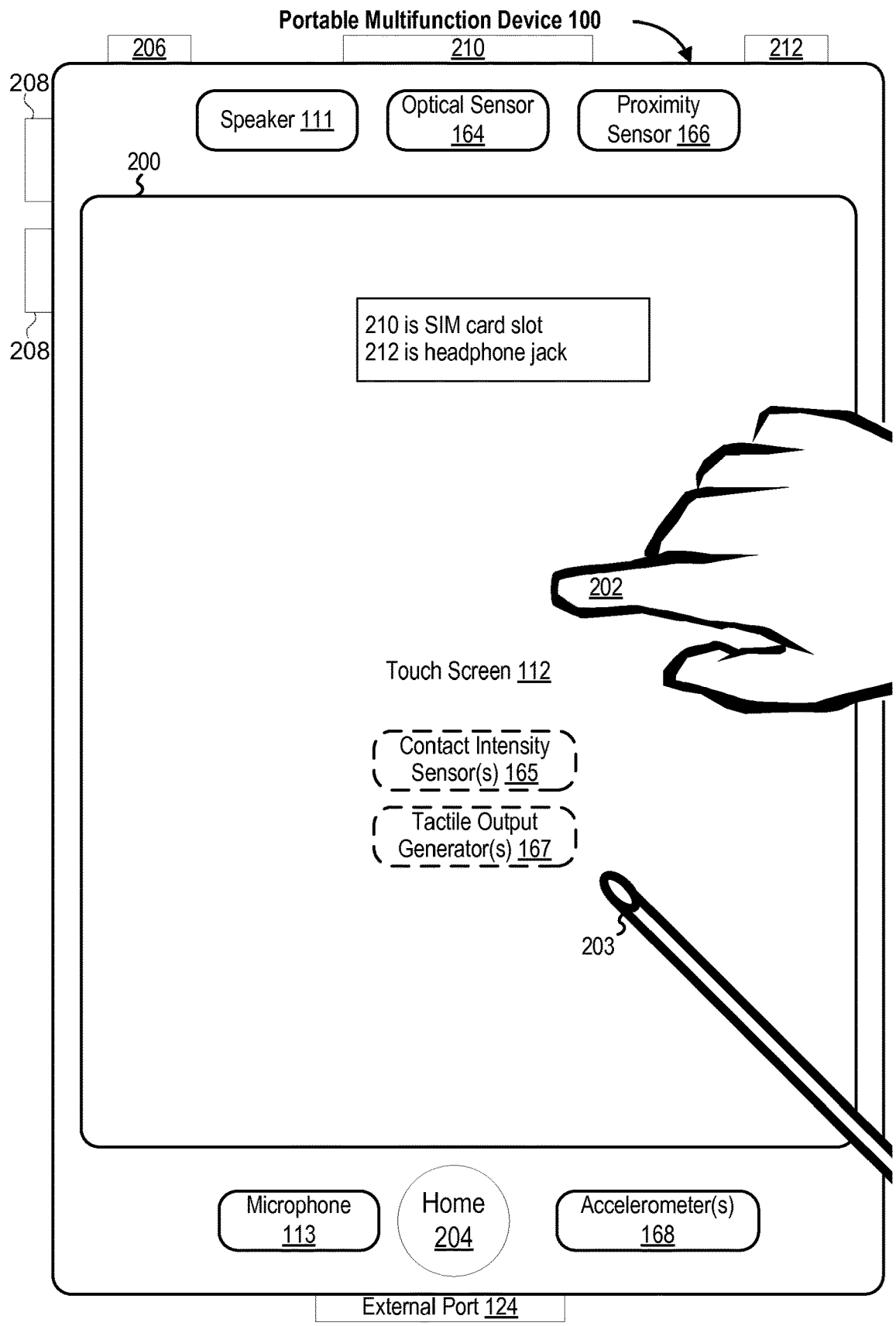
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
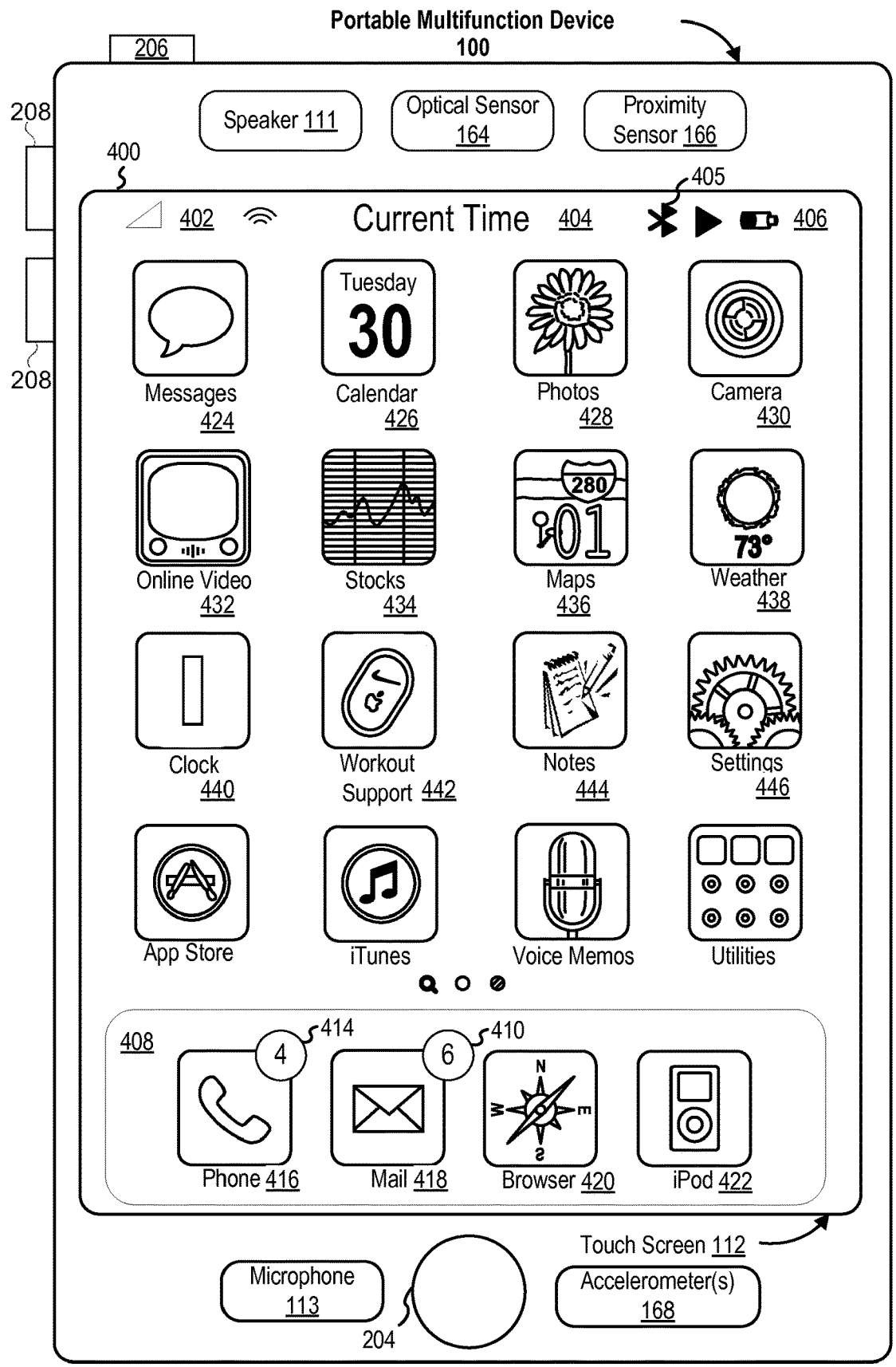

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
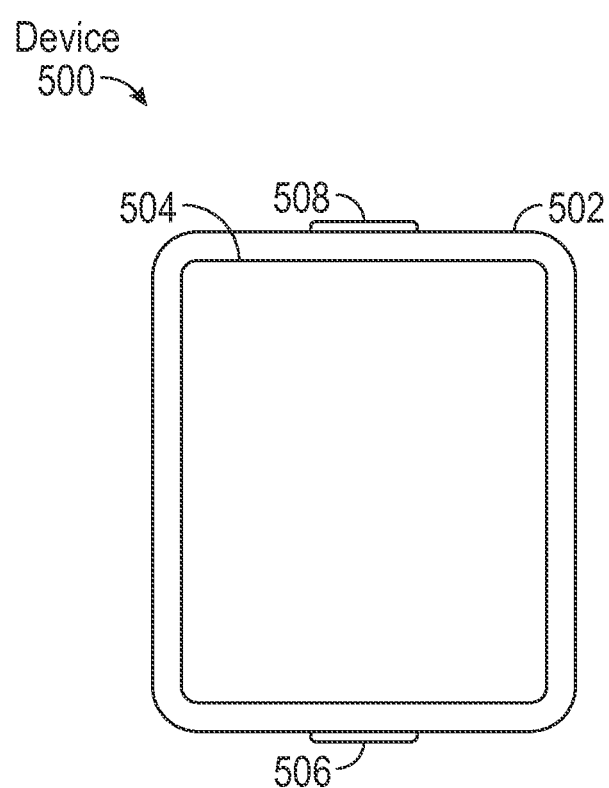
FIG. 5A is a block diagram illustrating a portable multifunction device with a touch-sensitive display and a rotatable input mechanism in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
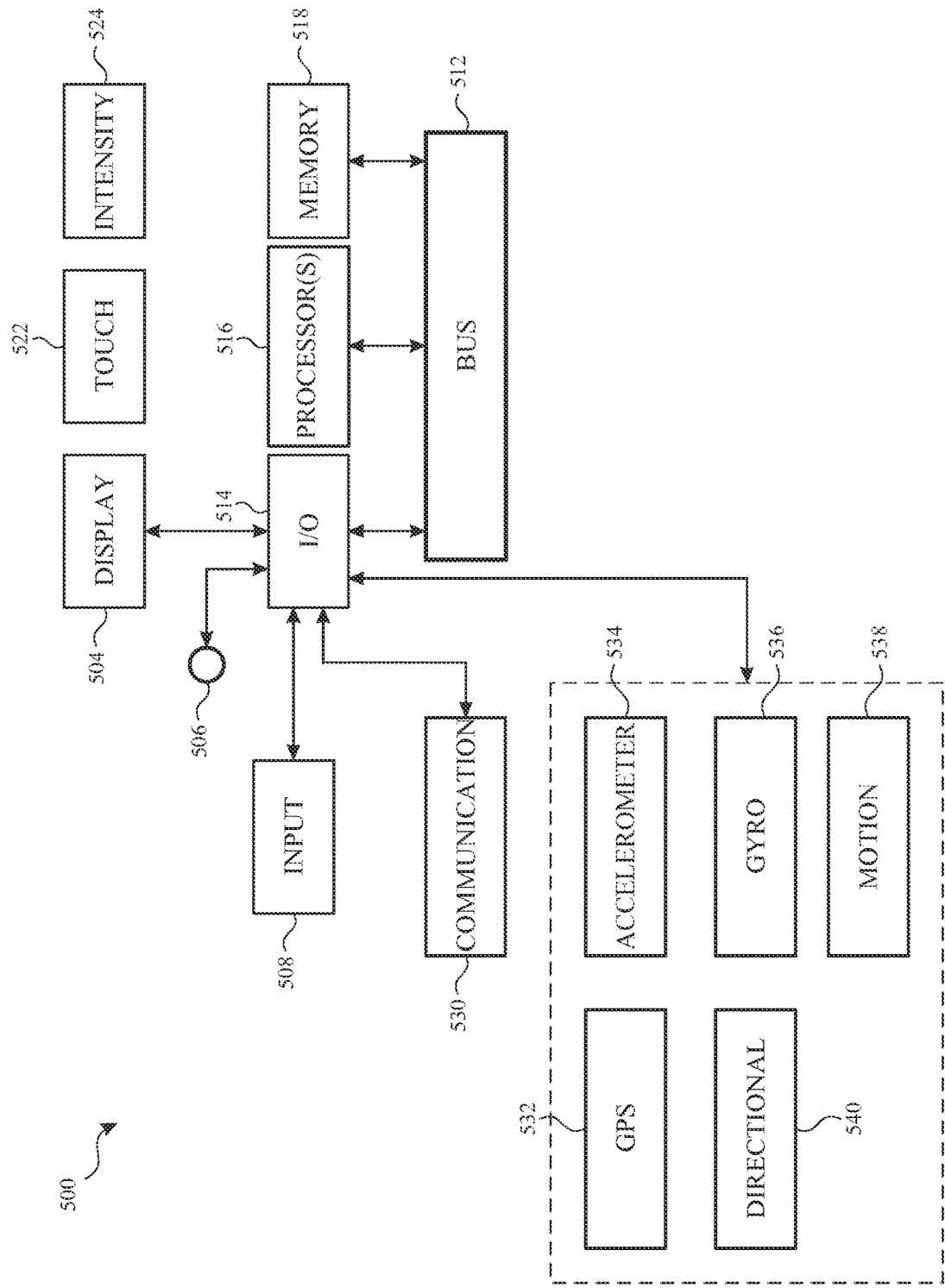
FIG. 5B illustrates a portable multifunction device having a touch-sensitive display and a rotatable input mechanism in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer readable storage medium, for storing computer-executable instructions, which, when executed by one or more computer processors 516, for example, can cause the computer processors to perform the techniques described above, including processes 1400-2000 and 3000 (FIGS. 14-20 and 30). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector" so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

an active application, which is currently displayed on a display screen of the device that the application is being used on;

a background application (or background processes) which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

As used herein, the term "closed application" refers to a software application without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that may be implemented on a multifunction device with a display and a touch-sensitive surface, such as devices 100, 300, and/or 500 (FIGS. 1A, 3A, and/or 5A), to provide weather information to a user on a reduced-size device.

1. Weather User Interfaces

The user interfaces for providing weather information (also referred to as "weather user interfaces") described below are illustrated by exemplary sequences of screens that one or more of devices 100, 300, and/or 500 can display in response to detecting various user inputs. In these sequences, the arrows indicate the order in which the screens are displayed, and the text shown above the arrows indicates exemplary inputs detected by the device. The device may respond similarly to different inputs; not all possible inputs that can result in the depicted sequence of screens are shown.

Figure 6:
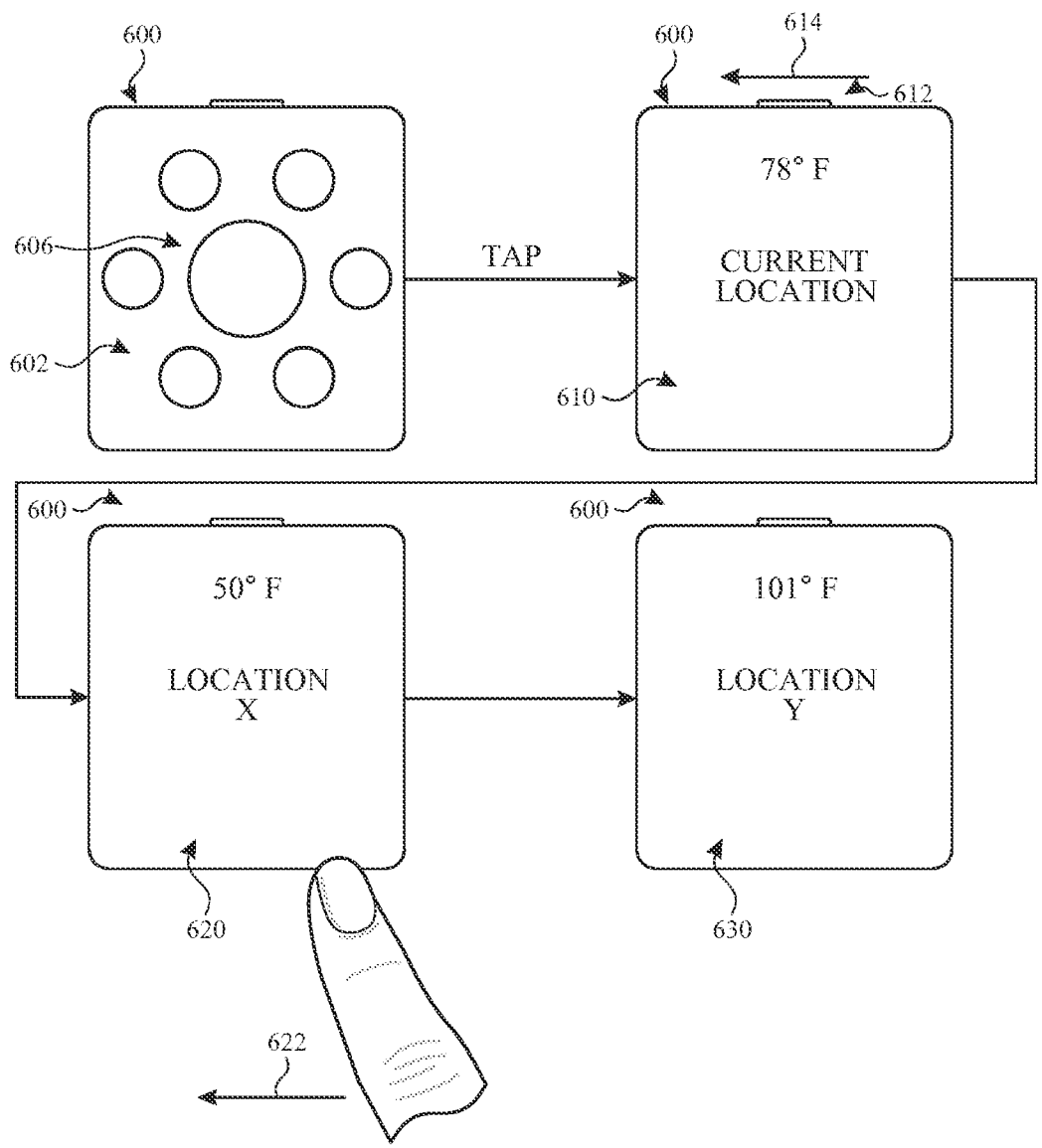
FIG. 6 illustrates exemplary user interfaces for providing weather information.

FIG. 6 shows exemplary user interface screen 602 that device 600 can display on touchscreen 604. Device 600 may be multifunction device 500 in some embodiments. Screen 602 can be, for example, a home screen that appears when the display of device 600 is powered on, or that appears in response to user input on device 600. Screen 602 displays affordances that may be used to launch software applications installed on device 600.

As used here, the term "affordance" refers to a user-interactive graphical user interface object that may be displayed on the display screen of device 100, 300, and/or 500 (FIGS. 1, 3, and 5A). For example, an image (e.g., icon), a button, and text may each constitute an affordance.

Affordance 606 may correspond to a weather application in that the weather application may launch in response to a user's selection of affordance 606. A weather application provides weather information. Weather information may include weather conditions such as, for example, temperature, precipitation, sunshine, cloud cover, wind (including direction and/or speed), barometric pressure, humidity, hazardous or inclement weather conditions, combinations thereof, and so forth.

As described in more detail below, weather information may reflect current weather conditions, forecasted weather conditions, or historical weather conditions. Weather information may reflect weather conditions at a current location of the device, or a different location. A location different from the current location may be a user- or system-designated location. A user-designated location is identified by a user. A system-designated location is identified by the system. A device may determine its current location using a GPS sensor and/or a WiFi location sensor.

To access weather information, device 600 may retrieve weather information from an external server. In some embodiments, device 600 may retrieve weather information from a weather service, such as The Weather Channel, Accuweather, The National Weather Service, Yahoo!™ Weather, Weather Underground, and the like.

A user may select (e.g., make touch contact) with affordance 606 to launch the weather application. In response to a user's selection of the affordance device 600 may launch the weather application and display a user interface screen conveying weather information for a time and location of interest.

Attention is now directed to how weather information may be displayed in various embodiments with reference to FIG. 6. In some embodiments, device 600 may display at least a portion of user interface screen 610 that includes indications of a first location and a temperature at the first location. "Indications" may include text, symbols, images, and/or combinations thereof that convey information, particularly weather information for a geographic location and/or a specific time. In some embodiments, the specific time may be the current time. In some embodiments, temperature may indicate the actual atmospheric temperature. In some embodiments, temperature may indicate an apparent temperature, such as a perceived temperature based on the atmospheric temperature, humidity, wind, cloud cover, and so forth.

User interface screen 610 may be too large to be displayed completely on-screen at one time. When a first portion of user interface screen 610 is displayed, user may rotate rotatable input mechanism 612 in a particular direction (e.g., rotation 614) to scroll the displayed portion of user interface screen 610 to display the second portion.

In some embodiments, scrolling the first user interface screen may include translating the first user interface screen on-screen. In some embodiments, the extent of rotation may be proportional to the amount of scrolling of the display (e.g., on-screen translation). In this scenario, a smaller rotation may scroll the displayed portion of the user interface screen less than a larger rotation. Relating the extent of rotation of the rotatable input mechanism 612 allows the user to precisely control which content(s) of the user interface screen are to be viewed.

While the first portion of user interface screen 610 is displayed, a user may swipe the touchscreen to display at least a portion of a user interface screen 620 that includes indications of a second location and a temperature at the second location. In some embodiments, the swipe may be a horizontal finger swipe, e.g., swipe 622, which causes device 600 to display indications of a third location and a temperature at the third location on screen 630. In this way, device 600 user navigation between weather information corresponding to different locations. In addition, a user may rotate rotatable input mechanism 612 in a particular direction (e.g., rotation 614) to scroll the displayed portion of user interface screen 620 to display a second portion.

Advantageously, allowing the user to navigate the application in multiple ways through different inputs, such as rotating the rotatable input mechanism and swiping the touch-sensitive display, increases the number of potential user interactions with the device and sustains the man-machine interaction. This is particularly important for a device with a reduced-size user interface. Since a reduced size decreases the size of the user interface, rather than relying solely on the user touching displayed user interface objects, these embodiments allow for information-dense and interactive applications by increasing the combinations of possible user interactions. In addition, incremental touch movements such as scrolling may be difficult on smaller device, particularly for larger fingers that may block much of the screen. A rotatable input mechanism solves this problem by allowing incremental movements without relying on user touches, thus enhancing the man-machine interface.

In some embodiments, the second part of user interface screen 610 or 620 may include a forecasted temperature for the indicated location. A forecasted temperature may include, for example, the temperature forecasted for the next hour, the next day, or a weekly forecast.

In some embodiments, the first location indicated on user interface screen 610 is the current location of device 600. In some embodiments, the second location indicated by user interface screen 620 is distinct from the current location of device 600. In this scenario, the second location may be user-designated, for example a location of interest designated by the user, or the second location may be system-designated, for example a major world city (e.g., New York, London, or Tokyo).

In some embodiments, while the second part of user interface screen 610 or 620 is displayed, a user may rotate the rotatable input mechanism 612 in a direction opposite the particular direction to scroll the displayed portion of user interface screen 610 or 620 to display the first portion. For example, a rotation of the rotatable input mechanism 612 in a clockwise direction may scroll the user interface screen 610 or 620 to move the displayed part from the first portion to the second portion, and a rotation of the rotatable input mechanism 612 in a counter-clockwise direction may scroll the user interface screen 610 or 620 to move the displayed part from the second portion to the first portion, or vice versa.

In some embodiments, device 600 conveys the weather condition at a time and location of interest using images. Exemplary images may include affordances, animations, and icons. The images may be realistic, such as a photograph-quality representation, or may be stylized, such as a cartoon, icon, or other symbolic representation. The images may depict a weather condition using, for example, a sun, moon, stars, cloud, rain drop, snowflake, hail, lightning bolt, wavy or curved lines (indicating wind or breeze), and so forth. The images may depict a weather condition using an item associated with the weather condition, such as an umbrella, coat, boots, protective eyewear, sunglasses, mittens or gloves, scarf, and so forth. Any of these visual representations may further involve an on-screen animation.

In some embodiments, device 600 conveys the precipitation at a time and location of interest using images. The image may indicate the specific type of precipitation in a current weather condition, or it may generically represent any form of inclement weather. For example, the images may depict a type of precipitation, such as a rain drop, snowflake, hail, lightning bolt, and so forth. The images may depict an object typically used to cope with inclement weather, such as an umbrella, a coat, boots, protective eyewear, mittens or gloves, scarf, and so forth.

In some embodiments, device 600 may display the image indicative of weather information as a wallpaper. As used here, consistent with its accepted meaning in the art, the phrase "wallpaper" refers to the background of a user interface screen that is visually distinguishable from text and user interface objects also displayed in the user interface screen. For example, user interface screen 610 and/or 620 may include a wallpaper that visually indicates weather conditions in addition to the corresponding location and temperature. Current weather may include current weather conditions, such as precipitation, sunshine, cloud cover, wind, and so forth. Wallpaper may represent current weather graphically, for example through use of stylized or realistic renderings of a weather condition (e.g., a cloud icon or a realistic rendering of a cloud). In some embodiments, wallpaper may include a realistic representation, such as with a photograph, of a scene depicting similar weather to the indicated current weather.

Advantageously, the use of imagery as indications of weather conditions allows device 600 to display weather information to a user in clear and comprehensible manner, thereby improving the efficiency of the man-machine interface on a reduced-size device. Providing weather information graphically through imagery also affords the opportunity to combine graphical and textual elements to provide weather information as efficiently as possible. For example, user interface screen 610 and/or 620 could, in some embodiments, depict current weather conditions using a wallpaper and depict the corresponding location and temperature through text overlaid on the wallpaper, thereby preserving space on the display for text to indicate, for example, location and temperature, while the weather condition is communicated through imagery (e.g., a background wallpaper).

In some embodiments, user interface screen 610 and/or 620 may include an affordance indicating the currently displayed user interface screen and a position of the displayed user interface screen within a sequence of the user interface screens. For example, the affordance may indicate that user interface screen 620 is after user interface screen 610 in a sequence of user interface screens. The affordance may indicate this in various ways. For example, the affordance may depict a sequence of dots, the position of each indicating the sequence of the user interface screens, with the dot representing the currently displayed user interface screen highlighted (e.g., as a filled circle, when the other dots are not filled). This allows the user to navigate more easily through multiple user interface screens. As another example, the affordances may each appear tab-like to form, together, a tabbed display layout.

Figure 7:
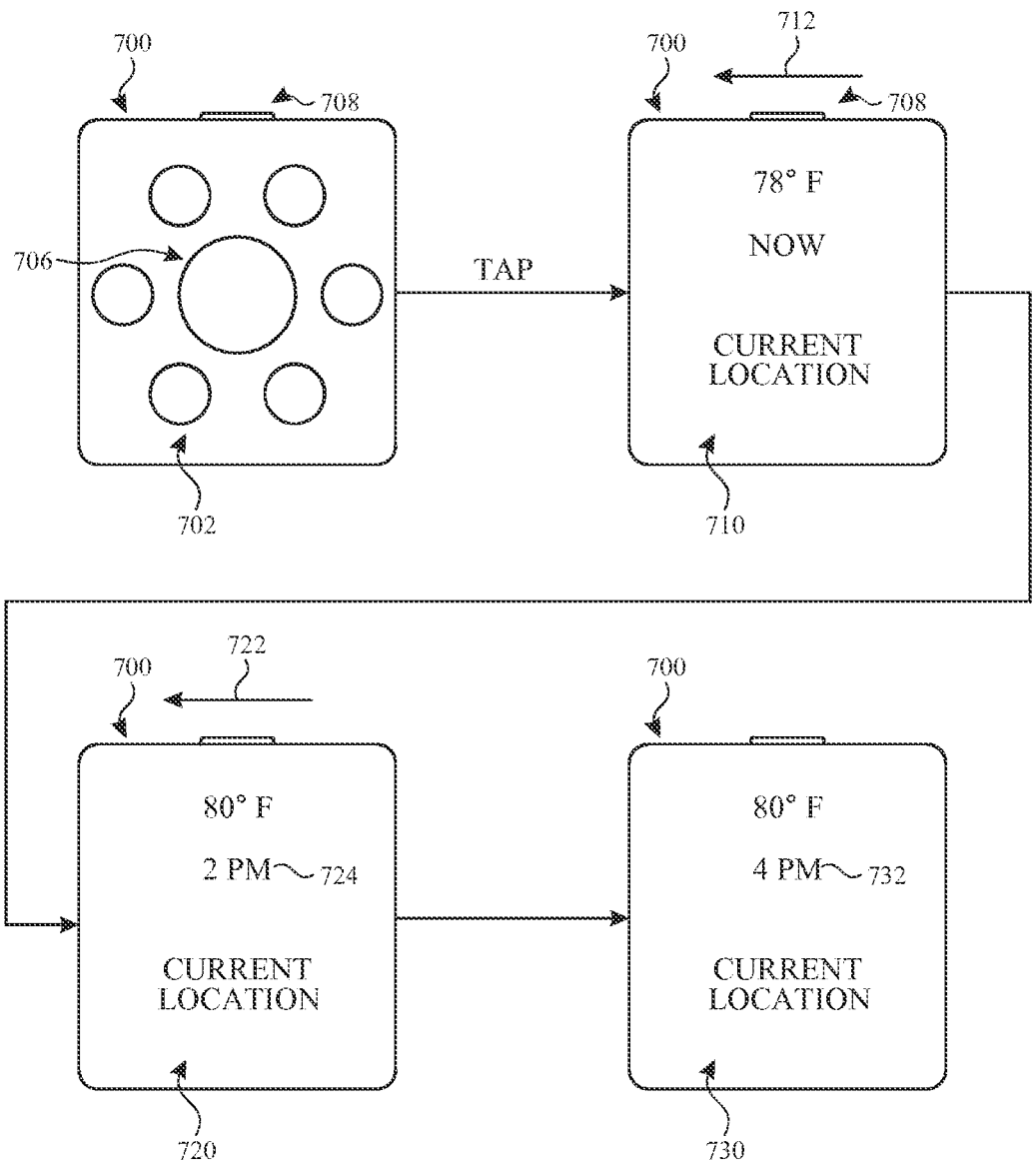
FIG. 7 illustrates exemplary user interfaces for providing weather information.

Attention is now directed to how weather information may be displayed in some embodiments, with reference to FIG. 7. FIG. 7 shows exemplary user interface screen 702 that device 700 can display on touchscreen 704. In some embodiments, device 700 is device 500 (FIG. 5). As discussed above in reference to FIG. 6, screen 702 can be, for example, a home screen that appears when the display of device 700 is powered on, or that appears in response to user input on device 700. Screen 702 has affordances corresponding to software applications that are available on device 700. A user may make contact with affordance 706 to launch the weather application. This causes device 700 to display a first user interface screen 710 that includes indications of a location and a current temperature at the location. In some embodiments, the location may be the current location of device 700.

In the illustrated embodiment, a user may access weather information for different times of day using rotatable input mechanism 708. While user interface screen 710 is displayed, a user may rotate rotatable input mechanism 708 (e.g., rotation 712). In response to the movement of the rotatable input mechanism, device 700 may display a forecasted temperature for the location. In some embodiments, device 700 may display the forecasted temperature by replacing the display of user interface screen 710 with a display of user interface screen 720.

In some embodiments, while the forecasted temperature is displayed, a user may rotate rotatable input mechanism 708 (e.g., rotation 722). In response to the movement of the rotatable input mechanism, device 700 may display a second forecasted temperature for the location. In some embodiments, device 700 may display the second forecasted temperature by replacing the display of user interface screen 720 with a display of user interface screen 730. In some embodiments, device 700 may display a time corresponding to the time of the displayed current or forecasted temperature (e.g., as shown by time 724 or time 732).

In some embodiments, the first and second forecasted temperatures differ by a predetermined time interval. For example, if current time is noon, user interface screen 710 may display indications of the time, the location, and the temperature at the location at noon. In this example, if the time of the first forecasted temperature is 2 pm, user interface screen 720 may display indications of the location and the forecasted temperature for the location at 2 pm (depicted by time 724). In this example, if the predetermined time interval is two hours, user interface screen 730 may display indications of the location and the second forecasted temperature for the location at 4 pm (depicted by time 732). In some embodiments, the predetermined interval is two hours. In some embodiments, the predetermined interval is one hour.

In some embodiments, device 700 may obtain a time of sunset for the location and, while the second forecasted temperature is displayed, a user may rotate rotatable input mechanism 708. In response to the movement of the rotatable input mechanism, device 700 may display a forecasted temperature for the location at the time of sunset.

The time of sunset for a location on a day may be obtained from an external server. In some embodiments, device 700 may obtain the time of sunset for the location on the current day from a weather service, such as The Weather Channel, Accuweather, The National Weather Service, Yahoo!™ Weather, Weather Underground, and the like. In some embodiments, device 700 may obtain the time of sunset for the location on the current day from organizations such as the United States Naval Observatory or the National Oceanic and Atmospheric Administration.

In some embodiments, device 700 may obtain a time of sunrise for the current day or the next calendar day for the location and, while a forecasted temperature for the location is displayed, a user may rotate rotatable input mechanism 708. In response to the movement of the rotatable input mechanism, device 700 may display a forecasted temperature for the location at the time of sunrise. In some embodiments, a user may rotate the rotatable input mechanism to display the forecasted temperature at sunrise for the next calendar day. In some embodiments, a user may rotate the rotatable input mechanism to display the forecasted or historical temperature at sunrise for the current day.

The time of sunrise for a location on a day may be obtained from an external server. In some embodiments, device 700 may obtain the time of sunrise for the location on the current day from a weather service, such as The Weather Channel, Accuweather, The National Weather Service, Yahoo!™ Weather, Weather Underground, and the like. In some embodiments, device 700 may obtain the time of sunrise for the location on the current day from organizations such as the United States Naval Observatory or the National Oceanic and Atmospheric Administration.

In some embodiments, device 700 may display a visual representation of forecasted weather at the location (e.g., on any or all of user interface screens 710, 720, and 730). In some embodiments, the visual representation includes an affordance that represents forecasted weather, and the position of the affordance within the displayed user interface screen varies based on the time being forecasted. In some embodiments, the affordance may be displayed at a position along the circumference of a circle centered on the displayed user interface screen, i.e., as with a clock face. In these examples, the position of the affordance along the circumference of the circle may indicate time, similar to a position indicated by the hour hand of a clock.

In these examples, the position of the affordance depicts the time being forecasted in a way familiar to the user (e.g., like a clock face) to provide information in a way that is intuitive and comprehensible to the user, thus improving the man-machine interface. Using the position of the affordance to depict time allows the user to immediately understand the time of day and the weather conditions forecasted for that time. Using the affordance and its position to visually represent forecasted weather and the time being forecasted is also particularly advantageous for a reduced-size device because it provides these data to the user at a glance in an easily understandable way without relying upon text or other visual objects that may be difficult to discern on a reduced-size display. These embodiments of a user interface for providing weather information allow for a more efficient man-machine interface on a device for which the visual interface is smaller, such as a device having a reduced-size display.

In some embodiments, while a temperature for the location is displayed, a user may swipe the touch-sensitive display of touchscreen 704. In response to detecting the swipe, the device may display a current temperature for a second location distinct from the first location. In some embodiments, the swipe does not begin at the bezel of the device. In some embodiments, the swipe is a substantially horizontal swipe. In some embodiments, a substantially horizontal swipe is a swipe having a horizontal movement exceeding a vertical movement by a threshold value.

In some embodiments, the displayed user interface screen may include an affordance indicating the currently displayed location and a position of the displayed location within a sequence of locations. The affordance may indicate this in various ways. For example, the affordance may depict a sequence of dots, the position of each indicating the sequence of the locations, with the dot representing the currently displayed location highlighted (e.g., as a filled circle, when the other dots are not filled). As another example, the affordances may each appear tab-like to form, together, a tabbed display layout. This allows the user to navigate more easily through multiple locations.

Figure 8:
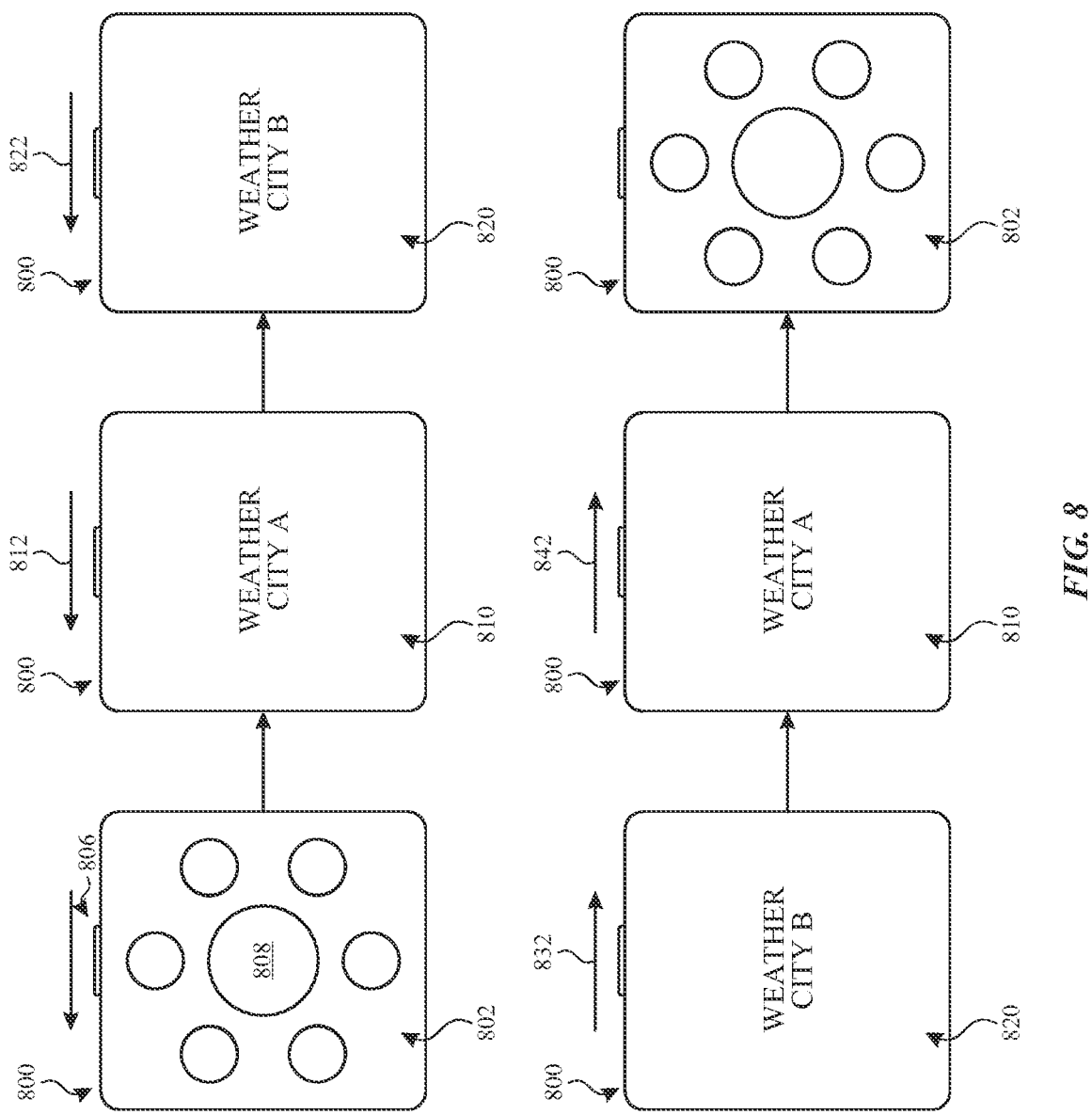
FIG. 8 illustrates exemplary user interfaces for providing weather information.

Attention is now directed to how weather information may be displayed in various embodiments with reference to FIG. 8. FIG. 8 shows exemplary user interface screen 802 that device 800 can display on touchscreen 804. In some embodiments, device 800 is device 500 (FIG. 5). In another embodiment of a user interface for providing weather information, a user may access weather information for different locations using rotatable input mechanism 806. A user may make contact with an affordance (e.g., affordance 808) to launch a weather application. This causes device 800 to display a first user interface screen (e.g., screen 810) that includes indications of a location and a current temperature at the location. While the user interface screen is displayed, a user may rotate rotatable input mechanism 806 (e.g., by rotation 812). In response to the movement of the rotatable input mechanism, device 800 may display a current temperature for a second location distinct from the first location, as shown on screen 820. In some embodiments, the movement of rotatable input mechanism 806 is movement in one direction, e.g., clockwise or counterclockwise. In some embodiments, the first location is a current location of device 800.

In some embodiments, while the indications of the second location and the current temperature at the second location are displayed, a user may rotate rotatable input mechanism 806 in an opposite direction. In response to detecting the movement of the rotatable input mechanism 806 in the opposite direction, device 800 may display the affordance (e.g., affordance 808). In some embodiments, a user may display indications of the temperature at the second location by rotating rotatable input mechanism 806 in the clockwise direction or display the affordance representing the weather application by rotating rotatable input mechanism 806 in the counterclockwise direction (or vice versa). FIG. 8 depicts this reversibility in sequence by showing the opposite display navigation prompted by, for example, rotation 812 in comparison with rotation 832.

In some embodiments, while the indications of the first location and the current temperature at the first location are displayed, a user may swipe the touch-sensitive display of touchscreen 804. In response to detecting the swipe, device 800 may scroll the displayed weather information, e.g., to reveal additional weather information. In some embodiments, device 800 may scroll the displayed weather information by translating the displayed information on the display of touchscreen 804 and displaying forecasted temperature for a future day for the displayed location. For example, device 800 may display the forecasted temperature for tomorrow at the displayed location. In another example, device 800 may display a weekly weather forecast (e.g., a forecasted temperature for each of the next 5 days, the next 6 days, the next 7 days, and the like) for the displayed location. In these scenarios, device 800 may display forecasted weather information that includes a forecasted temperature, a time for the forecasted temperature, a forecasted weather condition, and/or the likelihood of forecasted precipitation (typically expressed as a percentage, e.g., the percent chance of precipitation). Forecasted weather conditions may include, for example, weather conditions including precipitation, likelihood of precipitation, humidity, sunshine, cloud cover, wind (including direction and/or speed), barometric pressure, apparent temperature, and so forth.

In some embodiments, the displayed user interface screen may include an affordance indicating the currently displayed location and a position of the displayed location within a sequence of locations. The affordance may indicate this in various ways. For example, the affordance may depict a sequence of dots, the position of each indicating the sequence of the locations, with the dot representing the currently displayed location highlighted (e.g., as a filled circle, when the other dots are not filled). As another example, the affordances may each appear tab-like to form, together, a tabbed display layout. This allows the user to navigate more easily through multiple locations.

2. Displaying Weather Through Affordance on Home Screen

Figure 9:
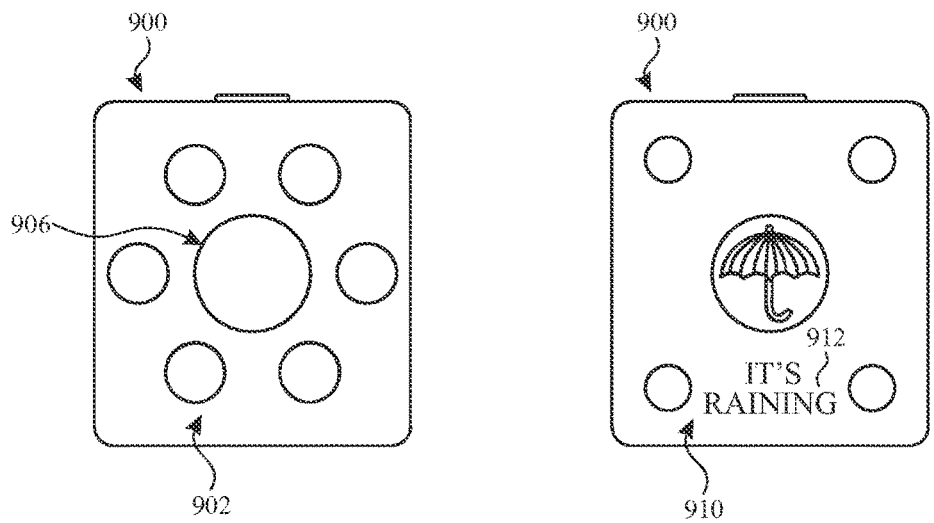
FIG. 9 illustrates exemplary user interfaces for providing weather information.

FIG. 9 shows exemplary user interface screen 902 that device 900 can display on touchscreen 904. In some embodiments, device 900 may be one or more of devices 100 (FIG. 1), 300 (FIG. 3), and/or 500 (FIG. 5). Screen 902 can be, for example, a home screen such as 702 (FIG. 7) in some embodiments. Screen 902 includes affordance 906 for launching the weather application.

Affordance 906 can itself provide weather information in some embodiments. In some embodiments, affordance 906 includes an image of the current weather at a designated location (e.g., the device's current location or user-designated location). In some embodiments, affordance 906 includes an image of the current or forecasted weather conditions at the location of an upcoming activity. Device 900 may obtain data representing an upcoming activity with an associated date and time. An activity may be user-defined or system-determined. Examples of user defined activities may include a user's calendar entries. In this scenario, device 900 may obtain data representing the upcoming activity by accessing a calendar application and obtaining data for the event (e.g., data representing any date(s) and/or time(s) of day associated with the calendar entry). Examples of system-determined activities may be activities that are frequently occurring, such as a commute, that may be tracked and identified by the electronic device. In this scenario, device 900 may obtain routine data for a user, such as the time of day a user typically leaves home for work, the time of day in which a user is typically commuting to or from work, the time of day in which a user is typically exercising, and the like. In either case (i.e., whether an activity is user-defined or system-determined), it is desirable for device 900 to obtain any data related to predicting a time in which the user may be traveling or outdoors so that device 900 may alert the user to current and/or forecasted weather conditions, particularly any inclement weather conditions. This allows the user to plan for the weather conditions accordingly, which may involve appropriately dressing for a particular weather condition, allowing for extra travel time for the activity on account of a particular weather condition, and so forth.

Device 900 may determine that the activity is to begin within a threshold amount of time and, if the upcoming activity is to begin within a threshold amount of time, display weather information based on the upcoming activity. A threshold amount of time within which an activity is to begin may include any amount of time during which a user may wish to receive information regarding weather conditions associated with the activity (e.g., advance notice for the activity). In some embodiments, a threshold amount of time may include 30 minutes, 1 hour, or 2 hours. In some embodiments, an activity that is to begin within a threshold amount of time may refer to an activity beginning on the current day. In some embodiments, an activity that is to begin within a threshold amount of time may refer to an activity beginning on the next day, so as to alert a user to potential weather conditions for an activity that is scheduled to begin the next morning.

To provide an alert to the user, device 900 may, for example, replace user interface screen 902, which depicts affordances representing applications, with user interface screen 910, which displays an affordance representing a weather alert. Such an affordance may include, for example, a text (e.g., text 912) indicating a weather condition and/or an affordance, symbol, image, or any other visual object that visually indicates a weather condition.

In some embodiments, device 900 may cause a haptic event with displaying the weather information. Causing a haptic event "with" displaying weather information may include causing a haptic event before, during, or after displaying weather information. In some embodiments, device 900 may cause a haptic event that begins when device 900 displays the weather information. In some embodiments, device 900 may cause a haptic event that begins just before device 900 displays the weather information. In some embodiments, device 900 may cause a haptic event that is substantially contemporaneous, with a slight delay, with displaying the weather information.

In some embodiments, displaying weather information based on an upcoming activity may include displaying current weather information for the location of the upcoming activity. In some embodiments, device 900 may obtain a location of an upcoming activity, obtain current weather information for the location of the upcoming activity, and display current weather information for the location of the upcoming activity. Device 900 may obtain a location of an upcoming activity in various ways. For example, if the upcoming activity is a calendar entry, device 900 may obtain a location associated with the calendar entry. If the upcoming activity is determined by routine data, device 900 may obtain a location for the routine data through a location sensor (e.g., a GPS sensor).

In some embodiments, displaying weather information based on an upcoming activity may include displaying forecasted weather information for the location of the upcoming activity. In some embodiments, device 900 may obtain a start time of an upcoming activity, obtain forecasted weather information for the start time of the upcoming activity, and display the forecasted weather information for the start time of the upcoming activity. Device 900 may obtain a start time of an upcoming activity in various ways. For example, if the upcoming activity is a calendar entry, device 900 may obtain a start time associated with the calendar entry. If the upcoming activity is determined by routine data, device 900 may obtain a start time for the routine data. Device 900 may further obtain a location associated with the upcoming activity in order to determine the forecasted weather conditions for the start time of the upcoming activity at the location of the upcoming activity.

In some embodiments, displaying weather information based on an upcoming activity may include displaying weather information for the current location. In some embodiments, device 900 may obtain a current location of the device, obtain weather information for the current location of the device, and display the weather information for the current location of the device. In some embodiments, device 900 may obtain a current location of the device using the location sensor. In some embodiments, weather information for the current location may include current weather information. In some embodiments, weather information for the current location may include forecasted weather information. For example, forecasted weather information may reflect forecasted weather information for a time based on the upcoming activity, such as a start time or any other time of interest in the duration of the activity.

In some embodiments, displaying weather information based on an upcoming activity may include displaying weather information for a geographic location in-between the current location and the location of the upcoming activity. In some embodiments, device 900 may obtain a current location of the device and a location of the upcoming activity, obtain weather information for a geographic location in-between the current location and the location of the upcoming activity, and display the weather information for the geographic location in-between the current location and the location of the upcoming activity. In this scenario, a user may wish to receive weather information related to travel between a current location and the location of an upcoming activity. For example, such information may reflect weather conditions on a user's route to an upcoming activity, or on a user's commute between work and home, and so forth. A geographic location in-between a current location and the location of an upcoming activity may include to any location between the two points. In some embodiments, the geographic location may be a location on a particular route between the current location and the location of the upcoming activity, such as a road or air traffic route. In some embodiments, the geographic location may be a location on the line between the current location and the location of the upcoming activity, e.g., as the crow flies. In some embodiments, the geographic location may be a city or other location of interest between the current location and the location of the upcoming activity.

In some embodiments, device 900 may determine whether obtained weather information represents inclement weather and display a visual indication of the inclement weather. In some embodiments, inclement weather may refer to precipitation, wind, extreme temperature (high or low), or any other severe or potentially hazardous weather condition. Inclement weather may include any such weather condition that has been observed, or it may include a warning, watch, or other notification issued for the possibility of any such weather condition.

A visual indication of inclement weather may include an affordance, text, symbol, image, or any other visual object. In some embodiments, visual indications may depict current weather by a visual representation that represents weather conditions, for example, a sun, moon, stars, cloud, rain drop, snowflake, hail, lightning bolt, wavy or curved lines (indicating wind or breeze), and so forth. In some embodiments, visual indications may depict current weather by a visual representation that represents an item associated with a weather condition, such as an umbrella, coat, boots, protective eyewear, sunglasses, mittens or gloves, scarf, and so forth. In some embodiments, visual indications may include text 912 that indicates inclement weather conditions. In some embodiments, text 912 may be displayed in its entirety at once, or it may be displayed by marquee scrolling.

In some embodiments, a user may remove the display of the visual indication of inclement weather by contacting the touch-sensitive display of touchscreen 904. In response to detecting the contact, device 900 may remove the display of the visual indication of inclement weather. A user may contact the touch-sensitive display by a swipe, tap, touch, or the like.

In some embodiments, a user may launch a weather application by contacting the touch-sensitive display of touchscreen 904. In response to detecting the contact, device 900 may launch a weather application. In some embodiments, a user may contact the display at the location of a displayed affordance indicating inclement weather to launch a weather application. Allowing the user to choose whether to remove the alert or launch a weather application and receive more detailed weather information sustains user's interaction with the device by customizing the user's level of interaction with the device.

3. Selecting from Multiple Locations to View Weather Information

Figure 10:
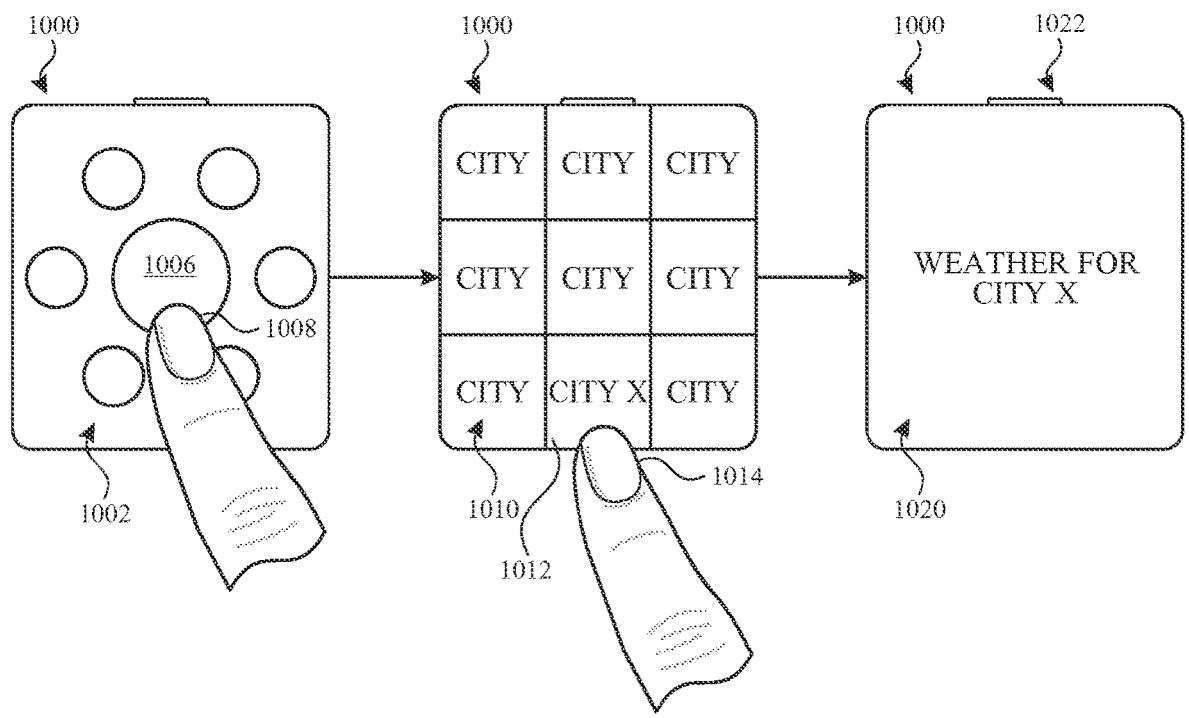
FIG. 10 illustrates exemplary user interfaces for providing weather information.

Turning now to FIG. 10, a user may wish to view weather information corresponding to one of multiple locations, such as a location selected from a set of designated locations. A designated location may be user-designated, for example a location of interest designated by the user or a current location, or a designated location may be system-designated, for example a major world city (e.g., New York, London, or Tokyo), or a location detected by the device.

FIG. 10 shows exemplary user interface screen 1002 that device 1000 can display on touchscreen 1004. As discussed above in reference to FIG. 7, screen 1002 can be, for example, a home screen that appears when the display of device 1000 is powered on, or that appears in response to user input on device 1000. Screen 1002 has affordances, such as affordance 1006. These affordances may correspond to software applications that are available on device 1000.

Affordance 1006 corresponds to a weather application. A user may make contact with affordance 1006 (e.g., by finger touch 1008) to launch the corresponding weather application. In response to detecting the contact, device 1000 may launch the weather application and display a grid on user interface screen 1010. A grid may include a plurality of grid portions representing different geographic locations. A "grid" layout refers to a layout in which objects are arranged along intersecting vertical columns and horizontal rows.

A user may select a location for which to view weather information by contacting a grid portion representing a first location. For example, a user may contact the display at grid portion 1012 to view weather information for the city represented by grid portion 1012. A contact on the display may include finger touch 1014. Each grid portion may include an indication of the location represented, such as a text or other visual indication (e.g., "city a" on screen 1010). In some embodiments, one of the grid portions represents a current location of the device. In some embodiments, the current location of the device is represented by the grid portion 1012 in the middle of screen.

In response to detecting the contact, device 1000 may cease to display the grid and display a current temperature at the first location, such as depicted in user interface screen 1020. In addition to the current temperature, device 1000 may optionally display any other weather information using any of the indications, such as affordances, text, visual representations, icons, symbols, wallpapers, and the like described herein.

In some embodiments, while the current temperature at the first location is displayed, a user may select a second location by rotating rotatable input mechanism 1022. In response to detecting the movement of rotatable input mechanism 1022, device 1000 may display a current temperature at the second location, where the grid portion representing the second location abuts the grid portion of the first location. This connects the layout of locations represented by the grid with the rotation of the rotatable input mechanism, allowing the user to control the order in which locations are selected. Advantageously, this connection makes selection of multiple locations through the combination of touch and the rotatable input mechanism predictable for the user, thereby sustaining user interaction with the device. This connection also prevents the user from having to spend time navigating between the display of the grid and the display of the weather conditions at a location, e.g., as would occur if the user had to select a location, return to the grid, select a second location, return to the grid, etc.

In some embodiments, while the current temperature at the first location is displayed, a user may return to the display of the grid by rotating rotatable input mechanism 1022. In response to detecting the movement of rotatable input mechanism 1022, device 1000 may display the grid. In some embodiments, a user may select a second location by rotating rotatable input mechanism 1022 in a particular direction and return to the display of the grid by rotating rotatable input mechanism 1022 in the opposite direction.

In some embodiments, while the current temperature at the first location is displayed, a user may view a forecasted temperature for the first location by rotating rotatable input mechanism 1022. In response to detecting the movement of rotatable input mechanism 1022, device 1000 may display a forecasted temperature for the first location. In this scenario, a user may select a location from the grid by contacting touchscreen 1004 to view current weather conditions (such as temperature), and use the rotatable input mechanism to view forecasted weather conditions for the same location. Forecasted weather conditions may include, for example, an hourly forecast for the current day, a weekly forecast for the current week, and so forth.

In some embodiments, while the current temperature at the first location is displayed, a user may view additional weather information for the first location by rotating rotatable input mechanism 1022. In response to detecting the movement of rotatable input mechanism 1022, device 1000 may scroll the display of the current temperature at the first location to display additional weather information for the first location. Additional weather information may include, for example, additional details of weather conditions such as precipitation, likelihood of precipitation, humidity, sunshine, cloud cover, wind (including direction and/or speed), barometric pressure, apparent temperature, and so forth. In some embodiments, a user may scroll from the current temperature to the additional information by rotating rotatable input mechanism 1022 in a particular direction and scroll from the additional information to the current temperature by rotating rotatable input mechanism 1022 in the opposite direction.

In some embodiments, while the current temperature at the first location is displayed, a user may select a second location by swiping touchscreen 1004. In response to detecting the swipe, device 1000 may display the current temperature at the second location. In some embodiments, the swipe does not begin at the bezel of device 1000.

In some embodiments, while the current temperature at the first location is displayed, a user may view additional weather information for the first location by swiping touchscreen 1004. In response to detecting the swipe, device 1000 may scroll the displayed first user interface screen to reveal additional weather information for the first location. In some embodiments, the swipe does not begin at the bezel of device 1000.

In some embodiments, displaying the current temperature of a location may include displaying an affordance indicating the location of the currently displayed temperature and a position of the displayed location within a sequence of locations represented in the grid. The affordance may indicate this in various ways. For example, the affordance may depict a sequence of dots, the position of each indicating the sequence of the locations, with the dot representing the currently displayed location highlighted (e.g., as a filled circle, when the other dots are not filled). As another example, the affordances may each appear tab-like to form, together, a tabbed display layout. This allows the user to navigate more easily through multiple locations.

Figure 11:
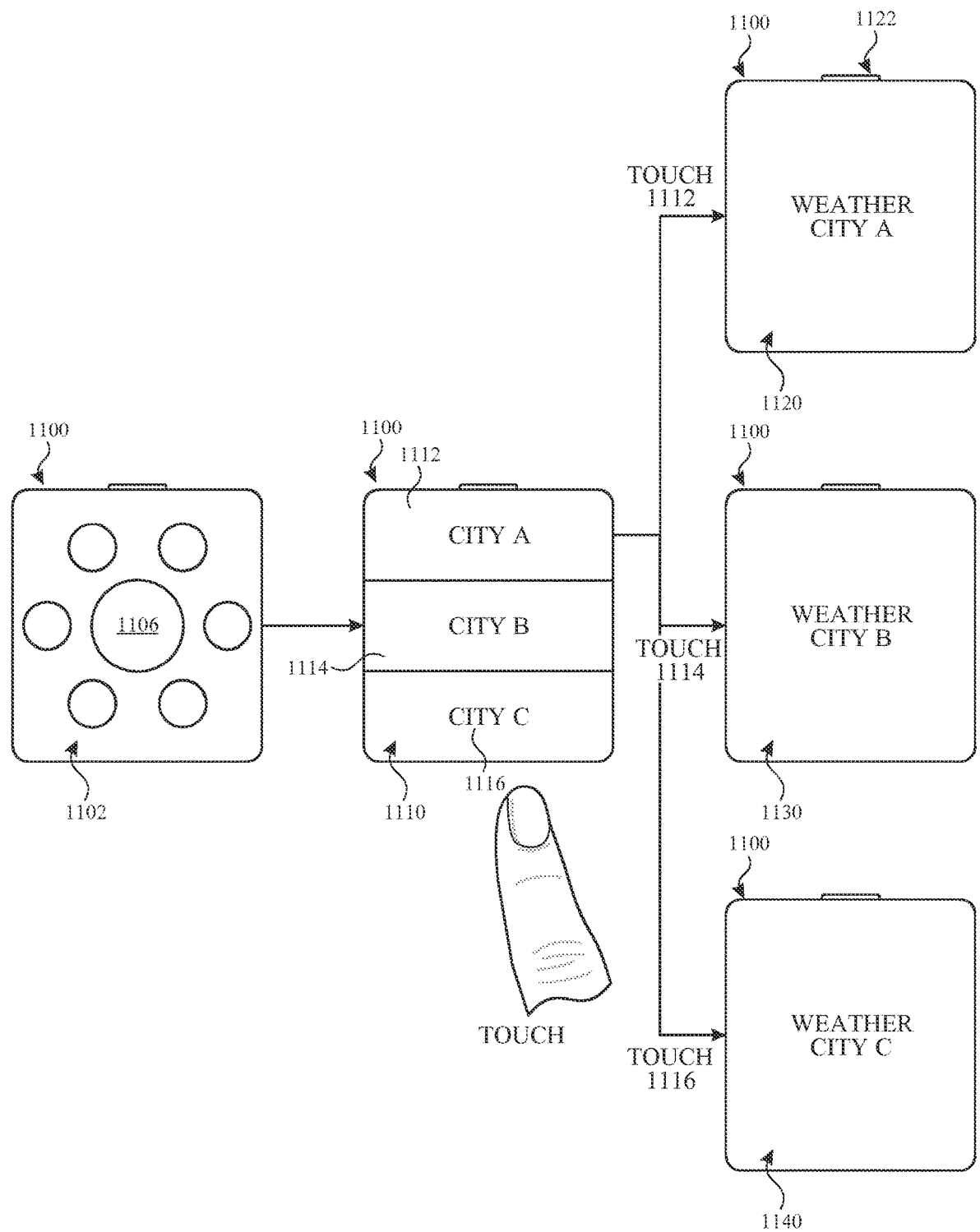
FIG. 11 illustrates exemplary user interfaces for providing weather information.

FIG. 11 shows another layout that allows a user to view weather information for multiple locations. FIG. 11 shows exemplary user interface screen 1102 that device 1100 can display on touchscreen 1104. In some embodiments, device 1100 is device 500 (FIG. 5). As discussed above in reference to FIG. 7, screen 1102 can be, for example, a home screen that appears when the display of device 1100 is powered on, or that appears in response to user input on device 1100. Screen 1102 has affordances, such as affordance 1106. These affordances may correspond to software applications that are available on device 1100.

Affordance 1106 corresponds to a weather application. A user may make contact with affordance 1106 to launch the corresponding weather application. In response to detecting the contact, device 1100 may launch the weather application and display a plurality of regions on user interface screen 1110, each region representing a different geographic location. A region is a contiguous display area that is visually distinguishable from the background of the weather application. The regions may be arranged along a vertical column, such as regions 1112, 1114, and 1116 as shown on user interface screen 1110.

A user may select a location for which to view weather information by contacting a region representing a first location. For example, a user may contact the display at region 1112 to view weather information for the city represented by region 1112. A contact on the display may include a finger touch. Each region may include an indication of the location represented, such as a text or other visual indication (e.g., "city A" on screen 1110). In some embodiments, one of the regions represents a current location of the device. In some embodiments, the current location of the device is represented by the region at the top of screen 1110 ("city A" represented by region 1112 in this example).

In response to detecting the contact, device 1100 may display a current temperature at the first location. In some embodiments, device 1100 ceases the display of the plurality of regions. For example, as shown in FIG. 11, a user may touch region 1112 to display a current temperature at city A on user interface screen 1120, touch region 1114 to display a current temperature at city B on user interface screen 1130, or touch region 1116 to display a current temperature at city C on user interface screen 1140. In addition to displaying the current temperature, any or all of screens 1120, 1130, and 1140 may optionally include any other weather information using any of the indications, such as affordances, text, visual representations, icons, symbols, wallpapers, and the like described herein.

In some embodiments, while the current temperature at the first location is displayed, a user may select a second location by rotating rotatable input mechanism 1122. In response to detecting the movement of rotatable input mechanism 1122, device 1100 may display a current temperature at the second location, where the region representing the second location abuts the region of the first location. For illustrative purposes, if a first region (e.g., region 1112) represents a first location (in this scenario, "city A"), a second location (in this scenario, "city B") may be represented by a second region that abuts the first region (in this scenario, region 1114). Similar to the grid of FIG. 10 as discussed above, this connects the layout of locations represented by the regions with the rotation of the rotatable input mechanism, allowing the user to control the order in which locations are selected and preventing the user from having to spend time navigating between the display of the plurality of regions and the display of the weather conditions at a location.

In some embodiments, while the current temperature at the first location is displayed, a user may return to the display of the plurality of regions by rotating rotatable input mechanism 1122. In response to detecting the movement of rotatable input mechanism 1122, device 1100 may display the plurality of regions. In some embodiments, a user may select a second location by rotating rotatable input mechanism 1122 in a particular direction and return to the display of the plurality of regions by rotating rotatable input mechanism 1122 in the opposite direction.

In some embodiments, while the current temperature at the first location is displayed, a user may view a forecasted temperature for the first location by rotating rotatable input mechanism 1122. In response to detecting the movement of rotatable input mechanism 1122, device 1100 may display a forecasted temperature for the first location. In this scenario, a user may select a location from the plurality of regions by contacting touchscreen 1104 to view current weather conditions (such as temperature), and use the rotatable input mechanism to view forecasted weather conditions for the same location. Forecasted weather conditions may include, for example, an hourly forecast for the current day, a weekly forecast for the current week, and so forth.

In some embodiments, while the current temperature at the first location is displayed, a user may view additional weather information for the first location by rotating rotatable input mechanism 1122. In response to detecting the movement of rotatable input mechanism 1122, device 1100 may scroll the display of the current temperature at the first location to display additional weather information for the first location. Additional weather information may include, for example, additional details of weather conditions such as precipitation, likelihood of precipitation, humidity, sunshine, cloud cover, wind (including direction and/or speed), barometric pressure, apparent temperature, and so forth. In some embodiments, a user may scroll from the current temperature to the additional information by rotating rotatable input mechanism 1122 in a particular direction and scroll from the additional information to the current temperature by rotating rotatable input mechanism 1122 in the opposite direction.

In some embodiments, while the current temperature at the first location is displayed, a user may select a second location by swiping touchscreen 1104. In response to detecting the swipe, device 1100 may display a current temperature at the second location. In some embodiments, the swipe does not begin at the bezel of device 1100.

In some embodiments, while the current temperature at the first location is displayed, a user may view additional weather information for the first location by swiping touchscreen 1104. In response to detecting the swipe, device 1100 may scroll the displayed first user interface screen to reveal additional weather information for the first location. In some embodiments, the swipe does not begin at the bezel of device 1100.

In some embodiments, displaying the current temperature of a location may include displaying an affordance indicating the location of the currently displayed temperature and a position of the displayed location within a sequence of locations represented in the plurality of regions. The affordance may indicate this in various ways. For example, the affordance may depict a sequence of dots, the position of each indicating the sequence of the locations, with the dot representing the currently displayed location highlighted (e.g., as a filled circle, when the other dots are not filled). As another example, the affordances may each appear tab-like to form, together, a tabbed display layout. This allows the user to navigate more easily through multiple locations.

In some embodiments, displaying the plurality of regions may include displaying the plurality of regions as a vertical list. For example, the regions in the plurality may be arranged as the vertical list depicted by regions 1112, 1114, and 1116 on user interface screen 1110.

4. Weather User Interfaces that Depict Time Through Affordance Position

Figure 12:
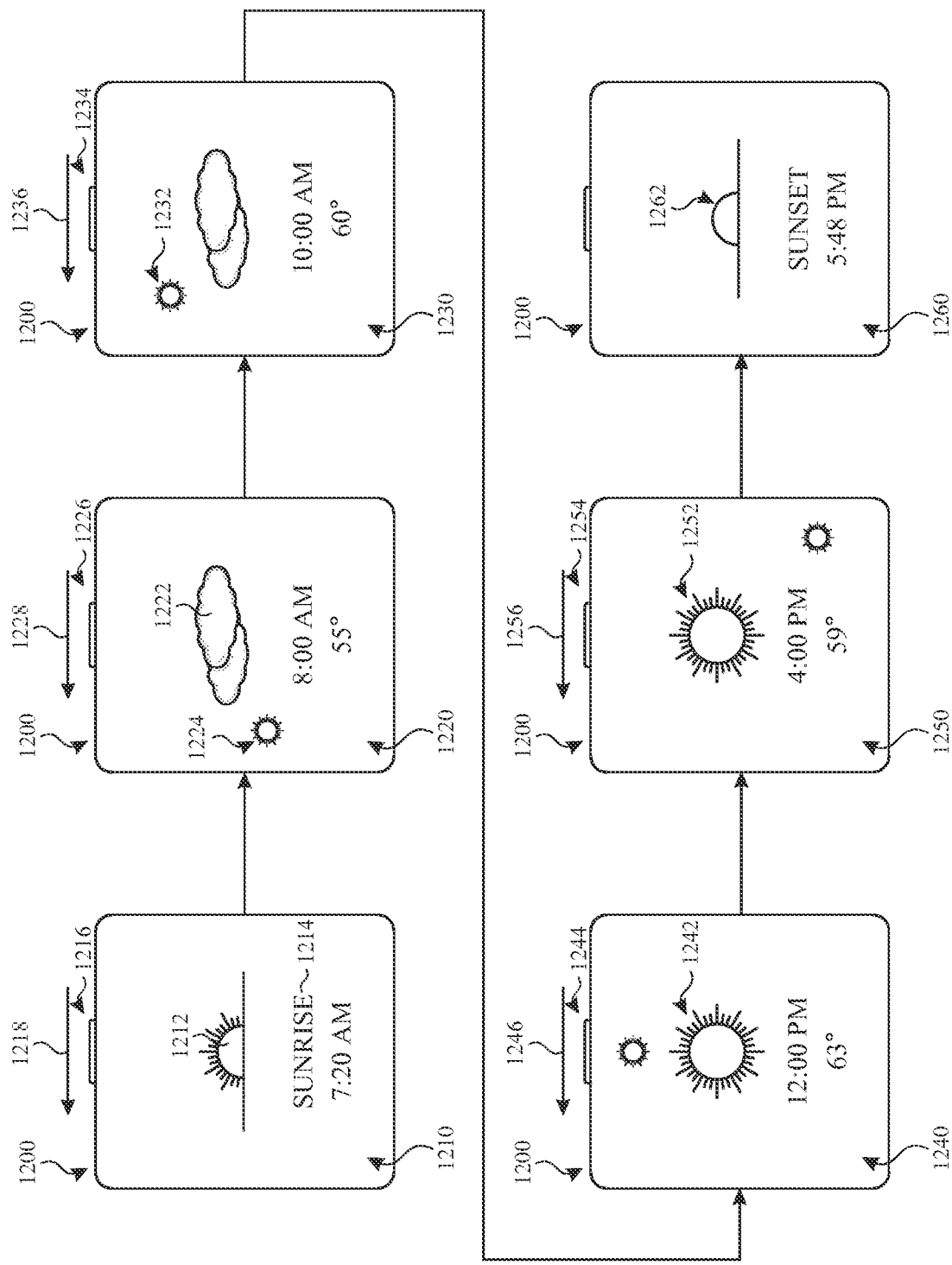
FIG. 12 illustrates exemplary user interfaces for providing weather information.

FIG. 12 depicts another embodiment of a user interface for providing weather information. In some embodiments, device 1200 is device 500 (FIG. 5). Device 1200 may display an image representing a weather condition for a first time of day, e.g., by displaying screen 1210 or 1220 on touchscreen 1202. For example, as shown in FIG. 12, screen 1210 indicates sunny conditions (by image 1212) at sunrise (by text 1214). Screen 1220 indicates cloudy conditions (by image 1222) forecasted for 8:00 am.

An image representing a weather condition may include a realistic image, such as a photograph-quality image, or a stylized image, such as a cartoon, icon, or other symbolic representation. Images may represent a weather condition by depicting, for example, a sun, moon, stars, cloud, rain drop, snowflake, hail, lightning bolt, wavy or curved lines (indicating wind or breeze), and so forth. Images may also represent a weather condition by depicting an item associated with a weather condition, such as an umbrella, coat, boots, protective eyewear, sunglasses, mittens or gloves, scarf, and so forth. Any of these images may further include an animation.

Device 1200 may display an affordance at a first position corresponding to the first time. For example, as shown on screen 1220, affordance 1224 corresponds to 8:00 am. Therefore, a user seeing screen 1220 immediately understands the time of day being represented (through texts and affordance 1224) and the weather conditions forecasted for that time (through image 1222 and the temperature).

A user may view a weather condition for a second time of day by rotating a rotatable input mechanism, such as rotatable input mechanism 1216, 1226, 1234, 1244, or 1254. In response to detecting the movement of rotatable input mechanism 1216, device 1200 may move the affordance from the first position to a second position that corresponds to a second time of the day and update the image to represent a weather condition for the second time of day. As shown in FIG. 12, rotations 1218, 1228, 1236, 1246, and 1256 allow the user to view user interface screens 1220, 1230, 1240, 1250, and 1260, respectively. Each screen depicts a forecasted weather condition for the corresponding time of day (see, e.g., images 1222, 1232, 1242, 1252, and 1262).

Taking screens 1220 and 1230 as an example, a user views the forecasted weather corresponding to 8:00 am through screen 1220. Screen 1220 displays affordance 1224 to indicate a time of day (this is further depicted by the text "8:00 am," but indicating the time of day through both text and image is an optional feature). Screen 1220 also includes image 1222 to indicate cloudy conditions forecasted for the depicted time of day. A forecasted temperature is also provided, but this is an optional feature. By rotating rotatable input mechanism 1226, a user is able to view the forecasted weather corresponding to 10:00 am through screen 1230. Screen 1230 displays affordance 1232 to indicate a time of day and the image (a cloud) to indicate cloudy conditions forecasted for that time of day (along with an optional indication of the forecasted temperature). The position of 1232 has been updated as compared to the position of affordance 1224 to indicate the passage of time.

In some embodiments, device 1200 may move the affordance by displaying an animation translating the affordance from the first position to the second position. In the example of screens 1220 and 1230, an animation may depict the translation of affordance 1224 at the first position to affordance 1232 at the second position. The translation may occur along the circumference of a circle that encircles the image representing the weather condition. That is, affordances 1224 and 1232 may be translated along an arc of the perimeter of a circle that encircles the depicted cloud image.

In some embodiments, the circle that encircles the image representing the weather condition corresponds to a circular clock face, and a position of the affordance along the circumference of the circle corresponds to a time as defined by the clock face. This allows the user to readily determine the indicated time of day by comparing the position of the affordance to a familiar clock face depiction of time. In some embodiments, the position of the affordance may indicate the time of day by occupying the same position on the clock face as the position depicted by an hour hand at that time of day.

In some embodiments, device 1200 may obtain a time of sunset for the day. As described previously, the time of sunset for a day may be obtained from an external server. In some embodiments, device 1200 may obtain the time of sunset for the day from a weather service, such as The Weather Channel, Accuweather, The National Weather Service, Yahoo!™ Weather, Weather Underground, and the like. In some embodiments, device 1200 may obtain the time of sunset for the day from organizations such as the United States Naval Observatory or the National Oceanic and Atmospheric Administration. In some embodiments, determining a time of sunset for the day includes determining a location of device 1200 (such as by using a location sensor, e.g., a GPS sensor) and determining a time of sunset for the day at the location.

A user may view a weather condition for sunset by rotating rotatable input mechanism 1254. In response to detecting one or more movements of rotatable input mechanism 1254, device 1200 may move the affordance to a third position corresponding to the time of sunset and update the image to represent sunset. For example, using screens 1240, 1250, and 1260 as an example, a user may progress from 12:00 pm to 4:00 pm to sunset by rotations 1246 and 1256. Sunset is represented on screen 1260 by image 1262. In this example, the user may rotate rotatable input mechanism 1254 once to progress from 4:00 pm to sunset, going from screen 1250 to 1260, and the user may rotate rotatable input mechanism 1244 twice to progress from 12:00 pm to sunset, going from screen 1240 to 1250 to 1260. The intervals between represented times of day may vary, particularly in moving from sunrise to another time of day and in moving from a time of day to sunset.

In some embodiments, the clock face includes a portion representing nighttime and a portion representing daytime. For example, the portion representing nighttime may include all times depicted by the clock face between sunset and sunrise of the following day, and the portion representing daytime may include all times depicted by the clock face between sunrise and sunset. Device 1200 may determine the portions of the clock face representing daytime and nighttime, for example, by obtaining times for sunset and sunrise as discussed above. The portions representing nighttime and daytime may have distinct visual appearances.

In some embodiments, device 1200 displays a visual representation of the sun when the affordance is positioned along the daytime portion and a visual representation of the moon when the affordance is positioned along the nighttime portion. In some embodiments, the image is an image of a sun, a cloud, or a moon. For example, the image may represent daytime by depicting a sun, or nighttime by depicting a moon. As described above, the image may represent a weather condition, e.g., by depicting a cloud or any of the other representations of a weather condition described herein.

In some embodiments, the affordance is a sun, a cloud, or a moon. In some embodiments, the affordance indicates whether the indicated time is during daytime or nighttime by depicting a sun for daytime or a cloud for nighttime. In some embodiments, the affordance indicates a weather condition, such as a cloud or any of the other representations of a weather condition described herein.

In some embodiments, the image is at the origin of the circle, and a position on the circle at $\pi/2$ radians (e.g., top) represents noon. In some embodiments, the image is at the origin of the circle, and a position on the circle at 90° represents noon. In some embodiments, the image is at the origin of the circle, and a position at the apex of the circle on the vertical axis of the display represents noon. As used here, the vertical axis of the display lies on the display surface of the display.

Figure 13A:
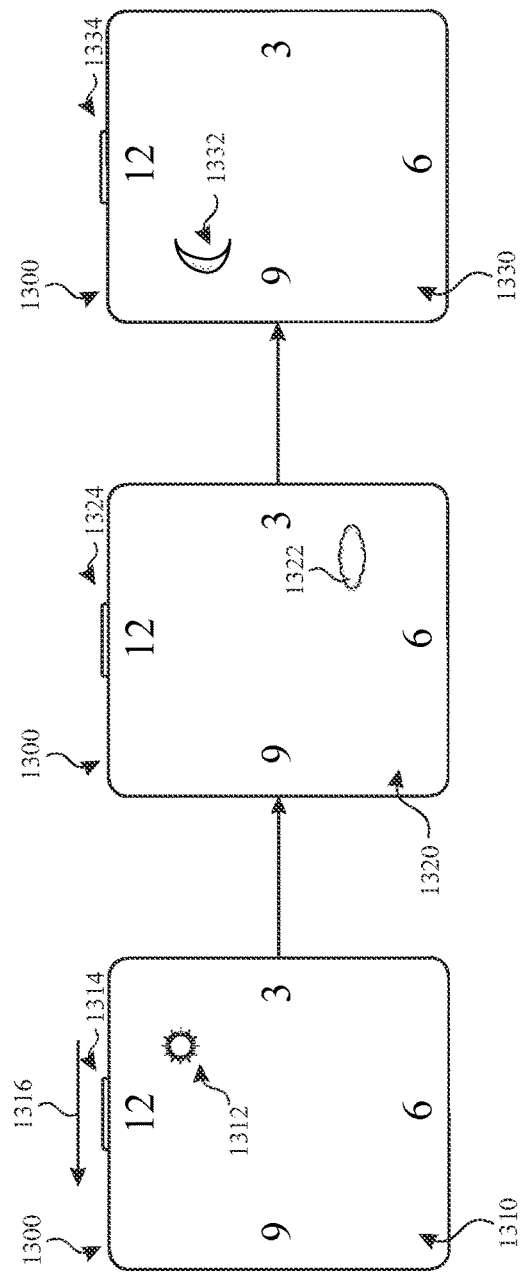
FIG. 13A illustrates exemplary user interfaces for providing weather information.

FIG. 13A depicts another embodiment of a user interface for providing weather information. In some embodiments, device 1300 is device 500 (FIG. 5). Device 1300 may display an image representing a current weather condition for a current time of day, e.g., by displaying screen 1310 having affordance 1312 on touchscreen 1302.

In some embodiments, the position of an affordance is used to represent the current time. In the illustrated example, affordance 1312 indicates a current time of day via its position on screen 1310, e.g., 1:30. As shown in FIG. 13A, one or more numerical indications of time may also be displayed on screen 1310. The user may therefore determine the current time of day by the position of affordance 1312 on screen 1310, optionally aided by one or more numerical indications of time arranged at position(s) on screen 1310 as on a clock face. In some embodiments, the visual appearance of an affordance is used to represent the weather at the displayed time. In the illustrated example, affordance 1312 graphically indicates a current weather condition by depicting the visual appearance of a sun for sunny conditions. The user may therefore recognize the current weather condition (and the current time) by perceiving affordance 1312 and its position on screen 1310.

In some embodiments, a user may view a forecasted weather condition for another time of day by providing a user input, such as a rotation of rotatable input mechanism 1314. In response to detecting one or more movements of rotatable input mechanism 1314 (e.g., rotation 1316), device 1300 may display a second time of day and the forecasted weather for the second time of day on screen 1320. Compared to screen 1310, screen 1320 shows the user that the depicted time has changed (in this example, 4:30) by moving the affordance to a new position, such as the position of affordance 1322. In addition, affordance 1322 indicates a different weather condition (overcast or cloudy conditions) by depicting a cloud. The user may therefore view a forecasted weather condition for a future time of day by providing an input, such as a rotation of the rotatable input mechanism. Optionally, affordance 1322 may return to its previous position (indicative of the current time) after some period of idleness if no further user input is detected.

In some embodiments, a user may view a forecasted weather condition for another time of day by providing a user input, such as by touching and swiping affordance 1322 to a different position on the clock face represented by screen 1330. In response to detecting a touch contact on the position of affordance 1322 followed by a movement of the touch towards the position of affordance 1332, device 1300 may display a third time of day and the forecasted weather for the third time of day on screen 1330. Compared to screen 1320, screen 1330 shows the user that the depicted time has changed (in this example, 10:30), and affordance 1332 indicates that the third time of day is during nighttime by depicting a moon. Affordance 1332 also indicates that the forecasted weather conditions are clear by depicting a moon with no cloud cover. Optionally, affordance 1322 may return to its previous position (indicative of the current time) after some period of idleness if no further user input is detected.

In some embodiments, a displayed affordance (e.g., affordances 1312, 1322, and 1332) may indicate whether the time shown by the affordance position corresponds to daytime, nighttime, sunrise, or sunset by depicting one or more graphical indications such as a sun, moon, stars, and/or horizon line. In some embodiments, a displayed affordance (e.g., affordances 1312, 1322, and 1332) may further indicate the represented time by the color of the affordance (e.g., a warm color such as red for daytime, cool color such as blue for nighttime, purple for sunset, orange for sunrise, and so forth). That is, device 1300 may use the same (or similar) affordance to indicate the same (or similar) weather condition forecasted for different times of day by imparting the affordance with different colors. These features allow a user to quickly discern the time and weather condition being shown (whether current or forecasted).

Figure 13B:
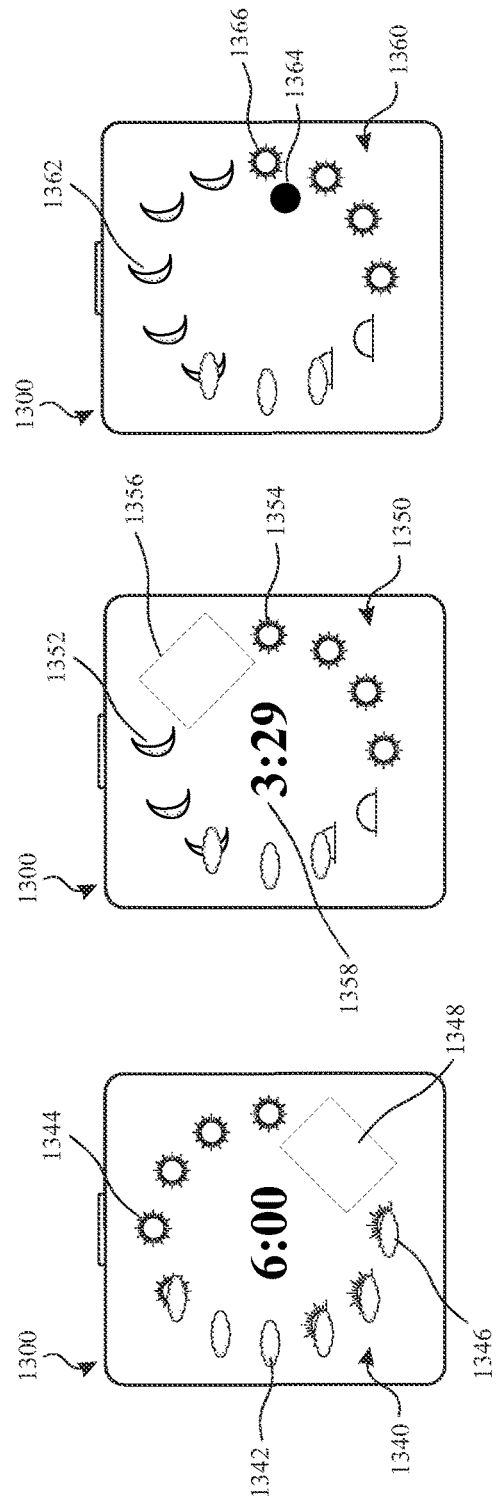
FIG. 13B illustrates exemplary user interfaces for providing weather information.

FIG. 13B depicts another embodiment of a user interface for providing weather information via device 1300. As shown, device 1300 may display multiple affordances arranged at positions on screen 1340 as on a clock face. The positions of the displayed affordances may correspond to different times of the day. For example, the position of affordance 1342 may correspond to 9 o'clock, and the position of affordance 1344 may correspond to 12 o'clock. In addition, the visual appearance of the displayed affordances may correspond to current, historic, or forecasted weather. For example, affordance 1342 may depict a sun to indicate sunny weather at 12 o'clock, and affordance 1346 may depict a cloud partially covering a sun along a horizon line to indicate a cloudy sunrise at about 6 o'clock.

In the illustrated example, portion 1348 of screen 1340 does not have affordances indicative of weather. This omission may be used to provide visual emphasis of the current time, in some embodiments. Restated, affordance(s) representing hours of the day immediately preceding the current hour may be omitted from display. As shown, screen 1340 illustrates the current time as 6 o'clock, and no affordance (indicative of weather) is displayed at the 5 o'clock and 4 o'clock positions of screen 1340. Restated, the first displayed affordance (1346) adjacent an opening (1348) along the clock face of screen 1340 is indicative of the current hour. In some embodiments (not illustrated), all twelve hour markers on a clock face have corresponding affordances indicating weather at those hours.

In some embodiments, the visual appearances of displayed weather affordances are indicative of the times they represent. For example, screen 1350 also has multiple affordances arranged on screen as on a clock face. In contrast to screen 1340, some of the affordances (e.g., 1352) shown in screen 1350 depict the visual appearance of a moon to clarify whether the represented hour corresponds to nighttime or day time. For example, affordance 1352 depicts a moon to clarify that it represents clear weather midnight, not noon. Similarly, affordance 1354 depicts a sun to clarify that sunny weather is expected for three o'clock in the afternoon (as opposed to night). As before, no affordance is displayed within on-screen portion 1356 to signal discontinuity between midnight (represented by affordance 1352) and the current hour of 3 pm (as represented by affordance 1354 and text 1358). In some embodiments (not illustrated), all twelve hour markers on a clock face have corresponding affordances indicating weather at those hours.

In some embodiments, the current time is indicated by the position of a user interface object on the display (e.g., an affordance not indicative of weather, such as a dot or other shape). For example, screen 1360 displays affordances of weather (e.g., affordance 1362) at 12 positions, as on a clock face. Displayed user interface object 1364 (e.g., a dot or other shape) is displayed adjacent to the affordance (e.g., affordance 1366) that indicates the current time. User interface object 1364 allows device 1300 to display current or forecasted weather for twelve hours while indicating the current time on the visual display. Screen 1360 may optionally include a separate indication of the current time, in addition to user interface object 1364, such as text 1358 on screen 1350.

In any of the exemplary embodiments described herein in which weather information is displayed, a user may provide a user input to change the type of weather information that is displayed. Types of weather information may include current or forecasted precipitation (e.g., likelihood, type, and/or amount of precipitation); current or forecasted temperature (e.g., air/absolute temperature or apparent temperature); and a current or forecasted weather condition (e.g., humidity, sunshine, cloud cover, wind direction, wind speed, barometric pressure, and so forth). For example, in FIG. 13B, device 1300 is displaying screen 1340, which displays a weather condition (in this case, cloud cover) associated with each hour. The user may provide a user input to switch the display to show a temperature associated with each hour. The user may provide a second user input to switch the display to show a likelihood of precipitation associated with each hour. This allows the user to easily toggle what type of weather information is displayed. In some embodiments, the device may display a first type of weather information and receive a user input. In response to receiving the user input, the device may update the display to display a second type of weather information that is different from the type class of weather information.

In some embodiments, the user input may be a touch gesture (e.g., a tap) on a touch-sensitive surface or touch-sensitive display. In some embodiments, the user input may be a contact on a touch-sensitive surface or touch-sensitive display, and in response to detecting the contact, the device may determine whether a characteristic intensity of the contact exceeds an intensity threshold. In accordance with a determination that the characteristic intensity of the contact exceeds the intensity threshold, the device may update the display to display a second class of weather information that is different from the first class of weather information. In accordance with a determination that the characteristic intensity of the contact does not exceed the intensity threshold, the device may forego updating the display.

Figure 14:
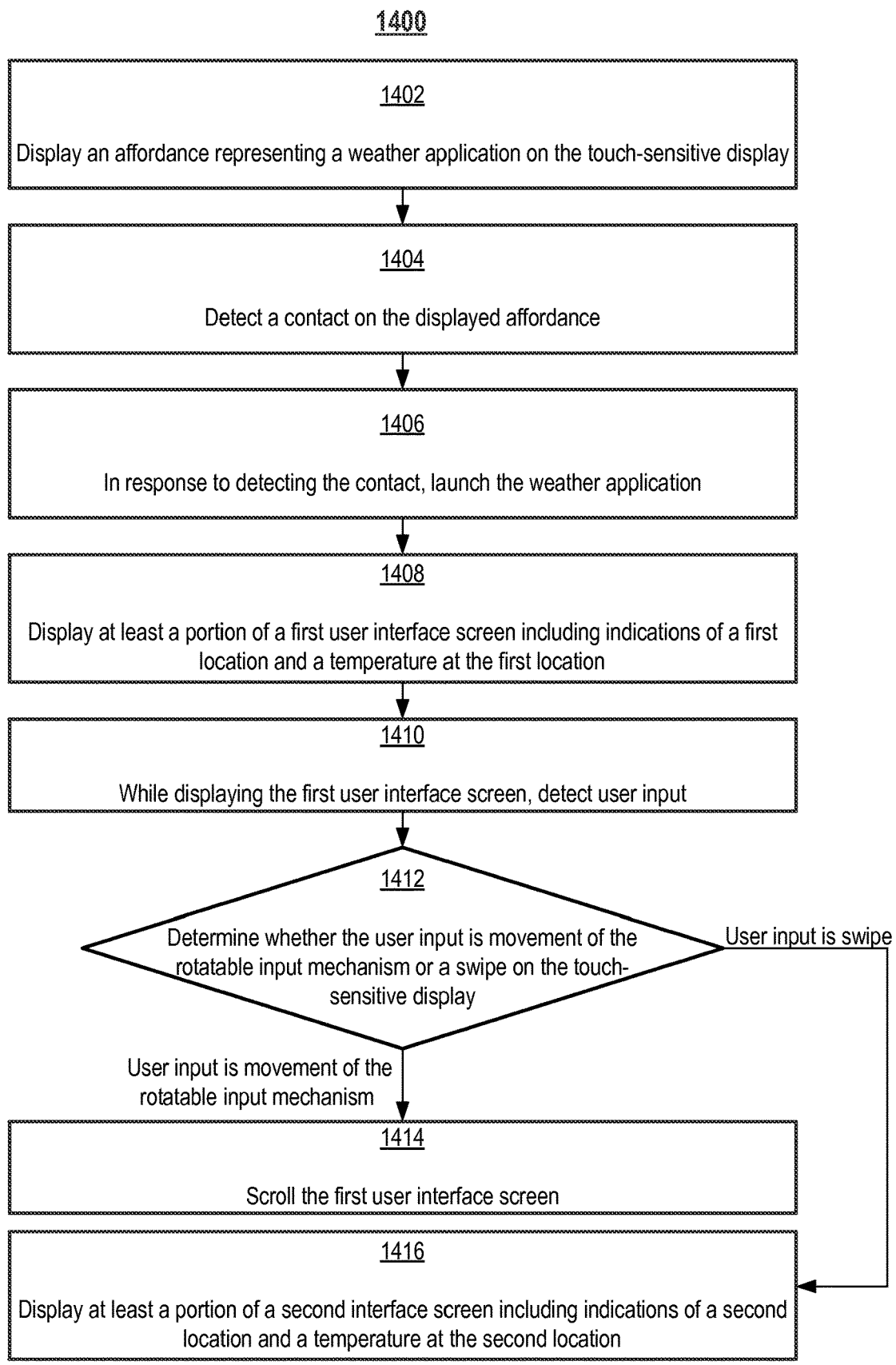
FIG. 14 is a flow diagram illustrating a process for providing weather information.

FIG. 14 is a flow diagram illustrating process 1400 for providing weather information. In some embodiments, process 1400 may be performed at an electronic device with a touch-sensitive display and a rotatable input mechanism, such as device 500 (FIG. 5). At block 1402, an affordance representing a weather application is displayed. At block 1404, a contact on the displayed affordance is detected. At block 1406, responsive at least in part to detecting the contact, the weather application is launched. At block 1408, at least a portion of a first user interface screen including indications of a first location and a temperature at the first location is displayed. At block 1410, while the first user interface screen is displayed, user input is detected. At block 1412, a determination is made as to whether the user input is movement of the rotatable input mechanism or a swipe on the touch-sensitive display. At block 1414, in accordance with the determination that the user input is movement of the rotatable input mechanism, the first user interface screen is scrolled. At block 1416, in accordance with the determination that the user input is a swipe, at least a portion of a second interface screen including indications of a second location and a temperature at the second location is displayed.

FIG. 15 is a flow diagram illustrating process 1500 for providing weather information. In some embodiments, process 1500 may be performed at an electronic device with a touch-sensitive display and a rotatable input mechanism, such as device 500 (FIG. 5). At block 1502, an affordance representing a weather application is displayed. At block 1504, a contact on the displayed affordance is detected. At block 1506, responsive at least in part to detecting the contact, the weather application is launched. At block 1508, indications of a location and a current temperature at the location are displayed. At block 1510, while the indications of the location and the current temperature are displayed, movement of the rotatable input mechanism is detected. At block 1512, responsive at least in part to detecting the movement of the rotatable input mechanism, a forecasted temperature for the location is displayed. Optionally, at block 1512, a swipe on the touch-sensitive display is detected. Optionally, at block 1512, responsive at least in part to detecting the swipe, a current temperature for a second location distinct from the first location is displayed.

Figure 16:
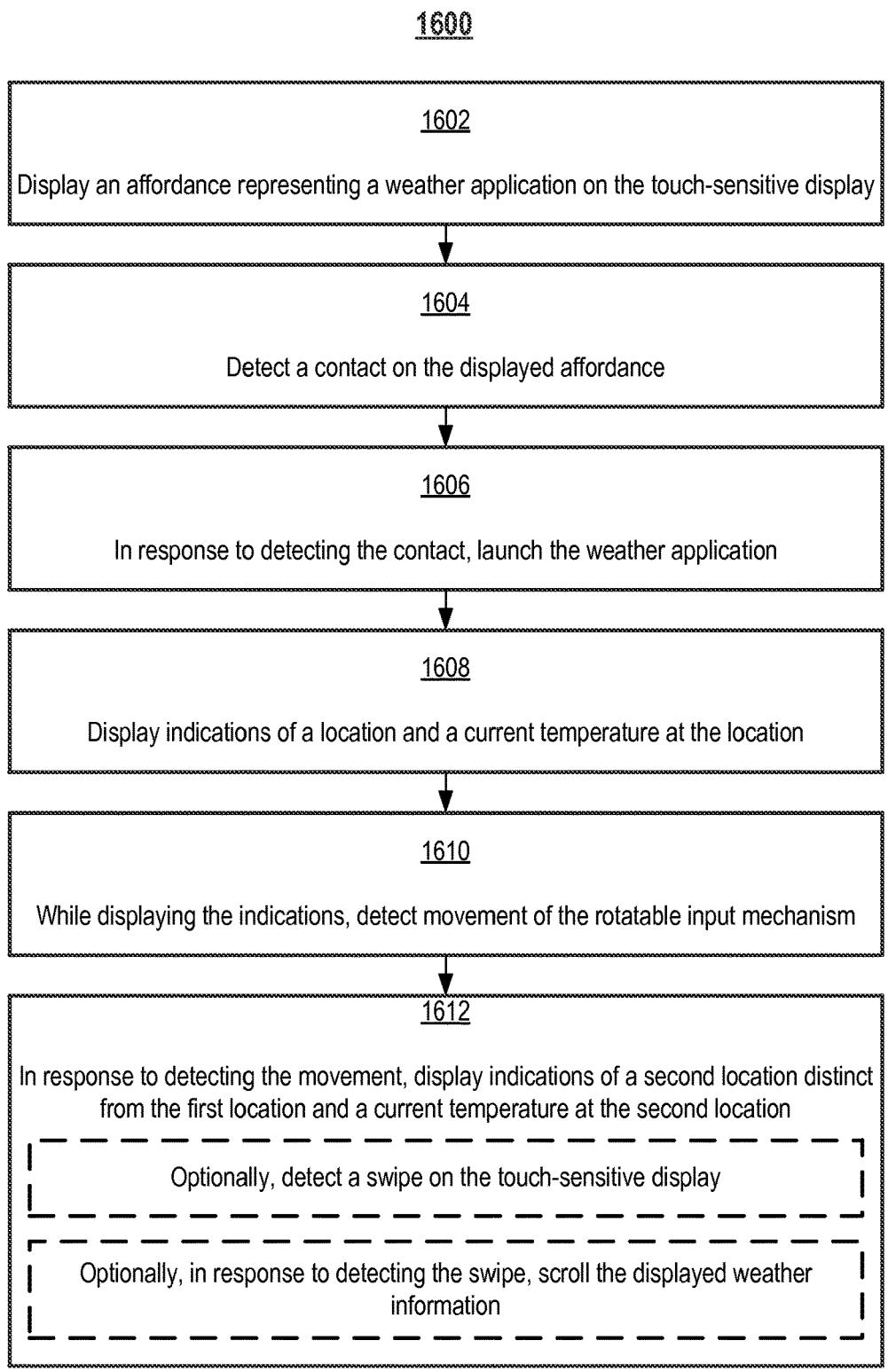
FIG. 16 is a flow diagram illustrating a process for providing weather information.

FIG. 16 is a flow diagram illustrating process 1600 for providing weather information. In some embodiments, process 1600 may be performed at an electronic device with a touch-sensitive display and a rotatable input mechanism, such as device 500 (FIG. 5). At block 1602, an affordance representing a weather application is displayed. At block 1604, a contact on the displayed affordance is detected. At block 1606, responsive at least in part to detecting the contact, the weather application is launched. At block 1608, indications of a first location and a current temperature at the first location are displayed. At block 1610, while displaying the indications of the first location and current temperature, movement of the rotatable input mechanism is detected. At block 1612, responsive at least in part to detecting the movement of the rotatable input mechanism, indications of a second location distinct from the first location and a current temperature at the second location are displayed. Optionally, at block 1612, while the indications of the first location and the current temperature at the first location are displayed, a swipe on the touch-sensitive display is detected. Optionally, at block 1612, responsive at least in part to detecting the swipe, the displayed weather information is scrolled.

Figure 17:
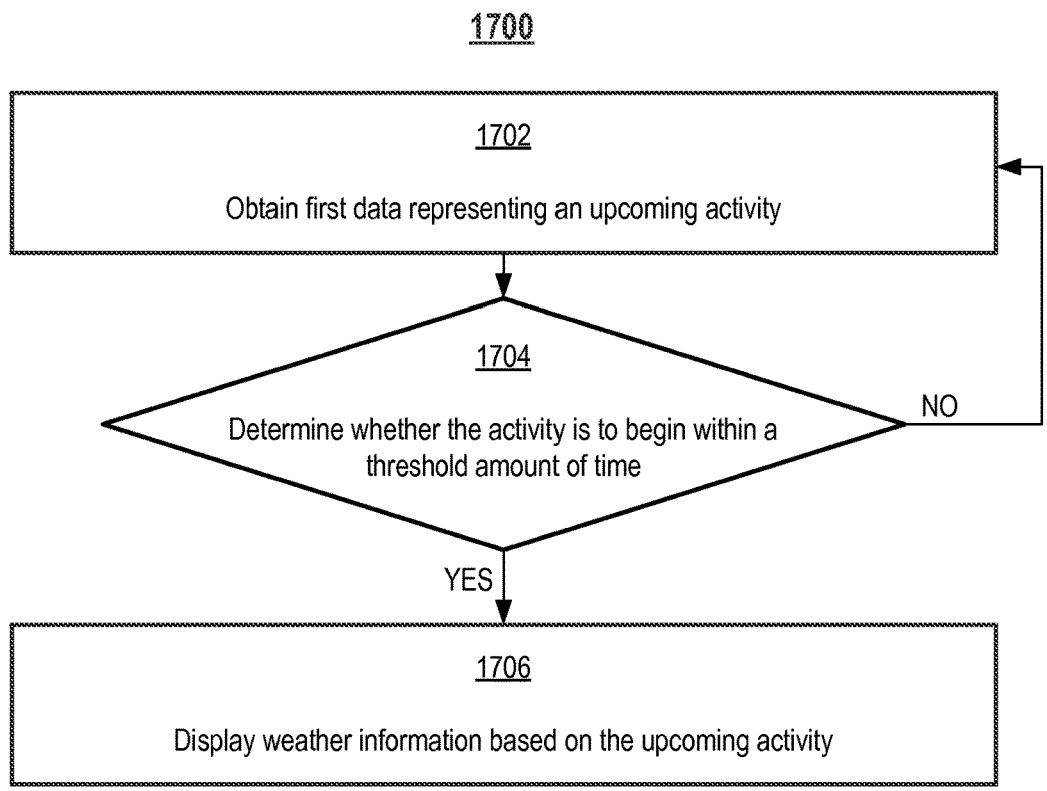
FIG. 17 is a flow diagram illustrating a process for providing weather information.

FIG. 17 is a flow diagram illustrating process 1700 for providing weather information. In some embodiments, process 1700 may be performed at an electronic device with a touch-sensitive display, such as device 100 (FIG. 1), device 300 (FIG. 3), and/or device 500 (FIG. 5). At block 1702, first data representing an upcoming activity is obtained. At block 1704, a determination is made as to whether the activity is to begin within a threshold amount of time. At block 1706, in accordance with the determination the upcoming activity is to begin within a threshold amount of time, weather information based on the upcoming activity is displayed.

Figure 18:
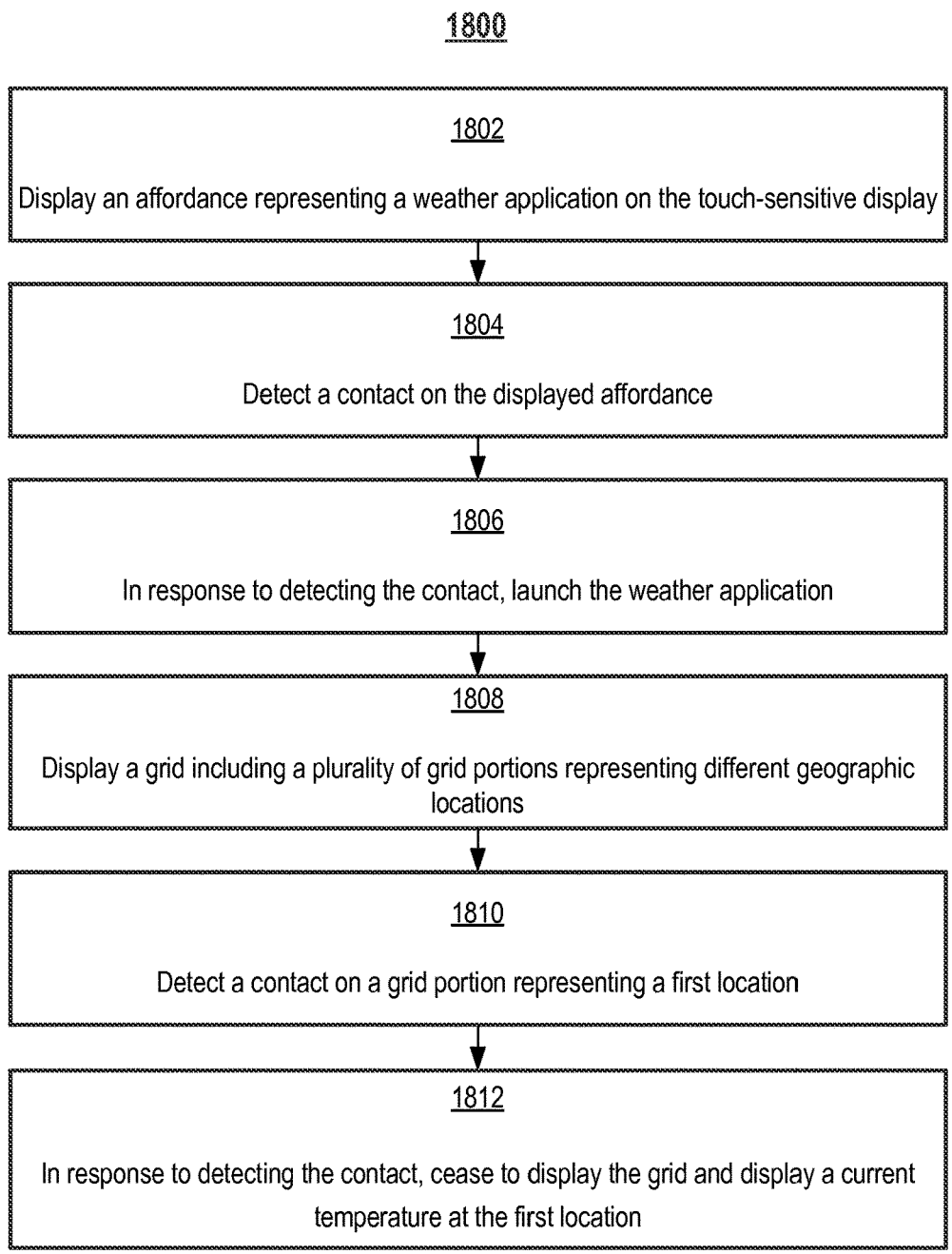
FIG. 18 is a flow diagram illustrating a process for providing weather information.

FIG. 18 is a flow diagram illustrating process 1800 for providing weather information. In some embodiments, process 1800 may be performed at an electronic device with a touch-sensitive display and a rotatable input mechanism, such as device 500 (FIG. 5). At block 1802, an affordance representing a weather application is displayed. At block 1804, a contact on the displayed affordance is detected. At block 1806, responsive at least in part to detecting the contact, the weather application is launched. At block 1808, a grid with a plurality of grid portions representing different geographic locations is displayed. At block 1810, a contact on a grid portion is detected. At block 1812, responsive at least in part to detecting the contact, the display of the grid is ceased and a current temperature at the first location is displayed.

FIG. 19 is a flow diagram illustrating process 1900 for providing weather information. In some embodiments, process 1900 may be performed at an electronic device with a touch-sensitive display and a rotatable input mechanism, such as device 500 (FIG. 5). At block 1902, an affordance representing a weather application is displayed. At block 1904, a contact on the displayed affordance is detected. At block 1906, responsive at least in part to detecting the contact, the weather application is launched. At block 1908, a plurality of regions representing different geographic locations is displayed. At block 1910, a contact on a first region representing a first location is detected. At block 1912, responsive at least in part to detecting the contact, a current temperature at the first location is displayed. At block 1914, movement of the rotatable input mechanism is detected. At block 1916, responsive at least in part to detecting the movement, information is displayed, the information representing a temperature at the second location, the plurality of regions, a forecasted temperature, or additional weather information.

FIG. 20 is a flow diagram illustrating process 2000 for providing weather information. In some embodiments, process 2000 may be performed at an electronic device with a touch-sensitive display and a rotatable input mechanism, such as device 500 (FIG. 5). At block 2002, an image representing a weather condition for a first time of day is displayed. At block 2004, an affordance is displayed at a first position corresponding to the first time. At block 2006, movement of the rotatable input mechanism is detected. At block 2008, responsive at least in part to detecting the movement, the affordance is moved from the first position to a second position corresponding to a second time of the day. At block 2010, the image is updated to represent a weather condition for the second time of the day.

It should be understood that the particular order in which the operations in FIGS. 14-20 have been described is exemplary and not intended to indicate that the described order is the only order in which the operations could be performed. One of ordinary skill in the art would recognize various ways to reorder the operations described herein. For brevity, these details are not repeated here. Additionally, it should be noted that aspects of processes 1400-2000 (FIGS. 14-20) may be incorporated with one another. For brevity, the permutations of user input techniques are not repeated.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3, 5A, and 5B) are all included within the scope of protection of the invention.

Figure 21:
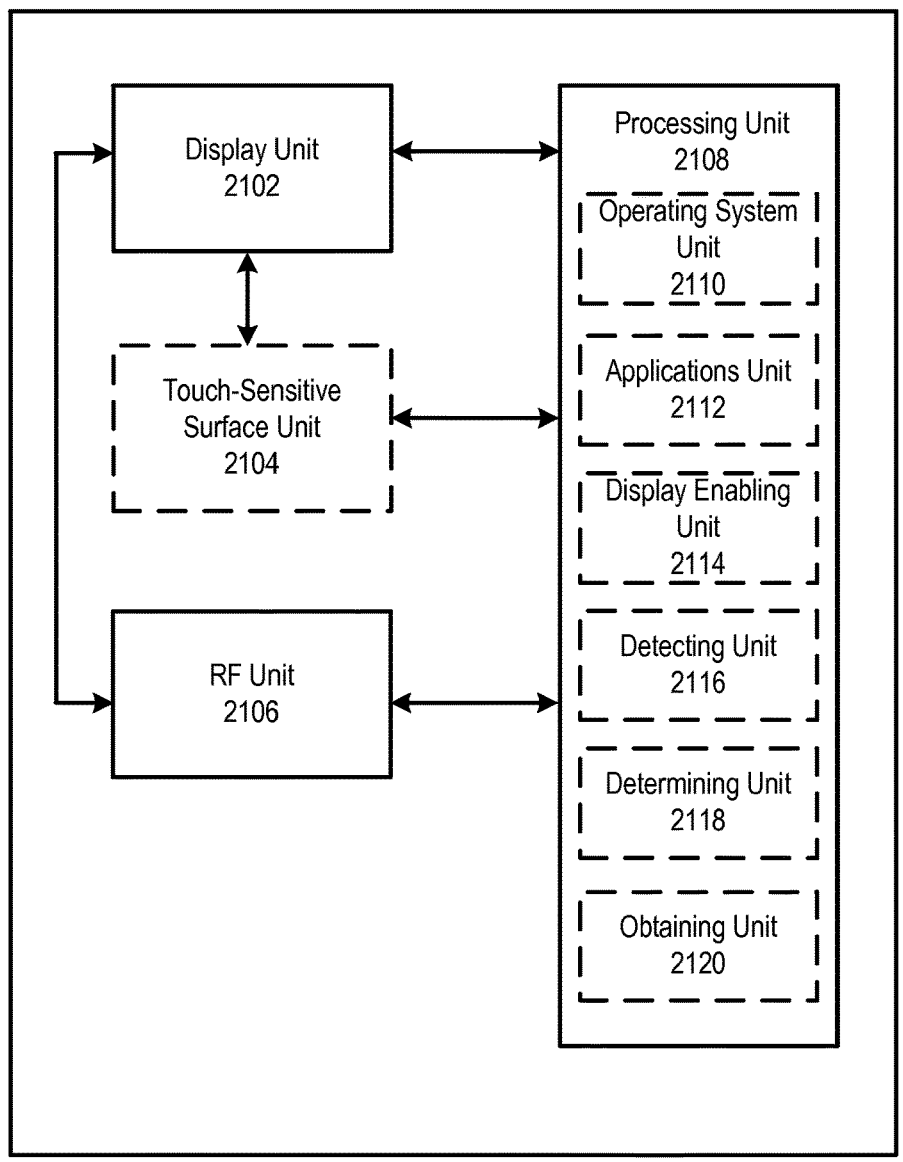
FIG. 21 is a functional block diagram of an electronic device in accordance with some embodiments.

FIG. 21 shows exemplary functional blocks of an electronic device 2100 that, in some embodiments, performs the features described above. As shown in FIG. 21, an electronic device 2100 includes a display unit 2102 configured to display graphical objects; a touch-sensitive surface unit 2104 configured to receive user gestures; one or more RF units 2106 configured to detect and communicate with external electronic devices; and a processing unit 2108 coupled to display unit 2102, touch-sensitive surface unit 2104, and RF unit(s) 2106. In some embodiments, processing unit 2108 is configured to support an operating system 2110 for launching and running one or more applications 2112.

In some embodiments, the processing unit 2108 includes a display enabling unit 2114, a detecting unit 2116, a determining unit 2118, and an obtaining unit 2120. In some embodiments, the display enabling unit 2114 is configured to cause a display of a user interface (or portions of a user interface) in conjunction with the display unit 2102. For example, the display enabling unit 2114 may be used for: displaying an affordance, displaying a user interface screen or a portion thereof, displaying a wallpaper, displaying indications (such as indications of temperature or location), displaying weather information, displaying a grid or a plurality of regions, and displaying an image. In some embodiments, the detecting unit 2116 is configured to receive input, e.g., through the use of touch-sensitive surface unit 2104. For example, the detecting unit 2116 may be used for: detecting a contact, detecting movement of the rotatable input mechanism, and detecting a swipe. In some embodiments, the determining unit 2118 is configured to make determinations. For example, determining unit 2118 may be used for: determining whether a user input is movement of the rotatable input mechanism or a swipe on the touch-sensitive display, and determining that an activity is to begin with a threshold amount of time. In some embodiments, the obtaining unit 2120 is configured to obtain information. For example, the obtaining unit 2120 may be used for: obtaining a current location of the electronic device from the location sensor, obtaining a time for sunset or sunrise for a location and/or a day, obtaining weather information, and obtaining data representing an upcoming activity. The units of FIG. 21 may be used to implement the various techniques and methods described above with respect to FIGS. 6-20.

The functional blocks of the device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

Figure 22:
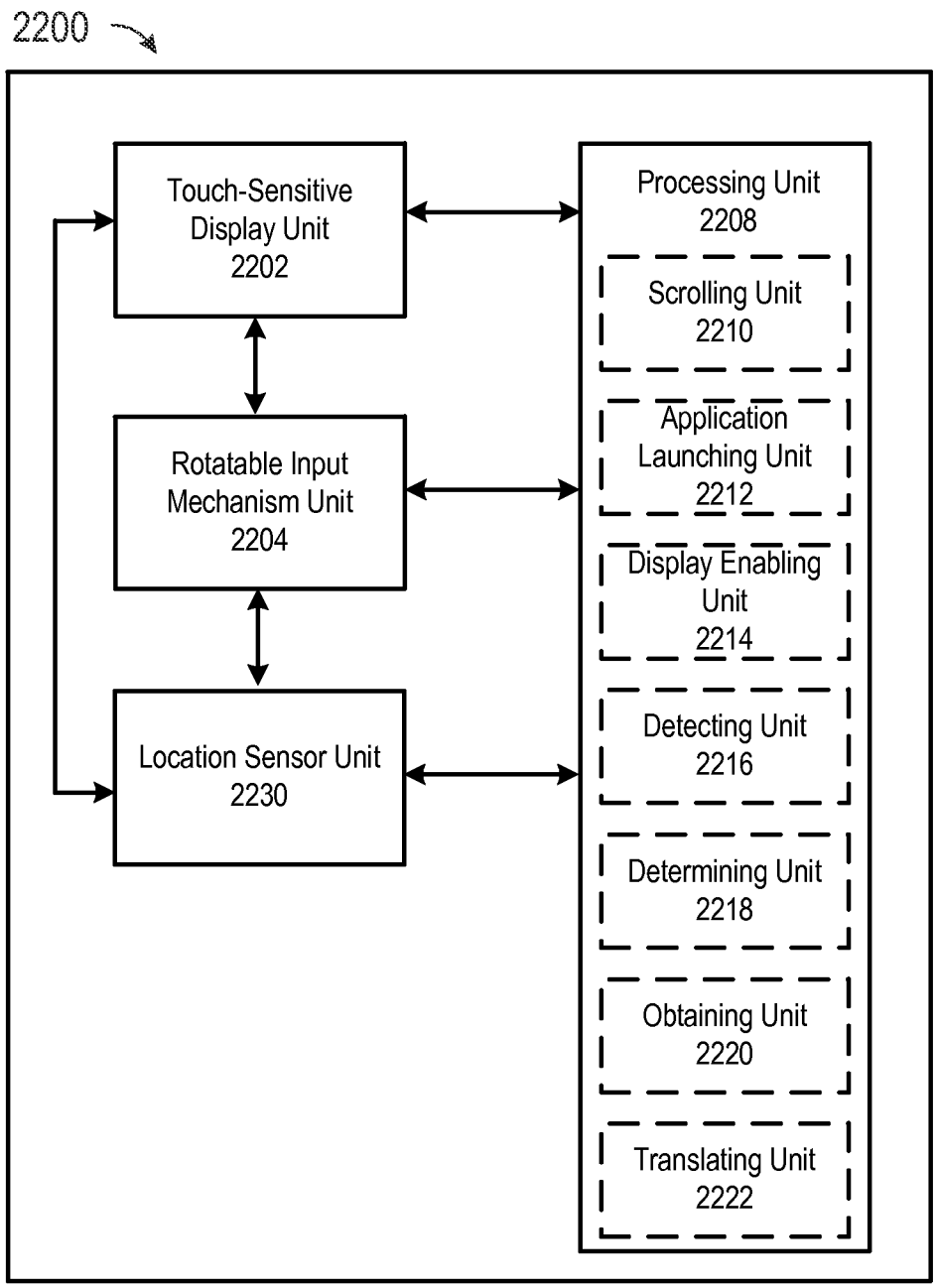
FIG. 22 is a functional block diagram of an electronic device in accordance with some embodiments.

In accordance with some embodiments, FIG. 22 shows an exemplary functional block diagram of an electronic device 2200 configured in accordance with the principles of the various described embodiments. In accordance with some embodiments, the functional blocks of electronic device 2200 are configured to perform the techniques described above. The functional blocks of the device 2200 are, optionally, implemented by hardware, software, or a combination of hardware and software to carry out the principles of the various described examples. It is understood by persons of skill in the art that the functional blocks described in FIG. 22 are, optionally, combined or separated into sub-blocks to implement the principles of the various described examples. Therefore, the description herein optionally supports any possible combination or separation or further definition of the functional blocks described herein.

As shown in FIG. 22, an electronic device 2200 includes a touch-sensitive display unit 2202 configured to receive contacts and configured to display a graphic user interface, a rotatable input mechanism unit 2204 configured to receive user input, and a processing unit 2208 coupled to the touch-sensitive display unit 2202 and the rotatable input mechanism unit 2204. In some embodiments, the processing unit 2208 includes a scrolling unit 2210, an application launching unit 2212, a display enabling unit 2214, a detecting unit 2216, a determining unit 2218, an obtaining unit 2220 and a translating unit 2222.

The processing unit 2208 is configured to enable display of (e.g., using the display enabling unit 2214) an affordance on the touch-sensitive display unit 2202, the affordance representing a weather application. The processing unit 2208 is further configured to detect (e.g., using the detecting unit 2216) a contact on the displayed affordance. The processing unit 2208 is further configured to, in response to detecting the contact: launch (e.g., using the application launching unit 2212) the weather application and enable display (e.g., using the display enabling unit 2214) of at least a portion of a first user interface screen including indications of a first location and a temperature at the first location. The processing unit 2208 is further configured to detect (e.g., using the detecting unit 2216) user input while displaying the first user interface screen. The processing unit 2208 is further configured to determine (e.g., using the determining unit 2218) whether the user input is movement of the rotatable input mechanism unit or a swipe on the touch-sensitive display unit. The processing unit 2208 is further configured to, in accordance with a determination that the user input is movement of the rotatable input mechanism unit, scroll (e.g., using the scrolling unit 2210) the first user interface screen. The processing unit 2208 is further configured to, in accordance with a determination that the user input is a swipe, enable display of (e.g., using a display enabling unit 2214) at least a portion of a second interface screen including indications of a second location and a temperature at the second location.

In some embodiments, the temperature at the first location is a current temperature at the first location and scrolling the first user interface screen comprises: translate (e.g., using the translating unit 2222) the first user interface screen on-screen and enable display (e.g., using the display enabling unit 2214) of a forecasted temperature for the first location, the forecasted temperature for a future day.

In some embodiments, the electronic device further comprises a location sensor 2230. In some embodiments, the processing unit 2208 is further configured to obtain (e.g., using an obtaining unit 2220) a current location of the electronic device from the location sensor. In some embodiments, the processing unit 2208 is further configured to enable display (e.g., using the display enabling unit 2214) of the current location and a current temperature at the current location, in response to detecting the contact on the displayed affordance.

In some embodiments, enabling display of the first user interface screen comprises enabling display (e.g., using the display enabling unit 2214) of a wallpaper, the wallpaper visually indicating weather condition at the first location.

In some embodiments, enabling display of the affordance comprises enabling display (e.g., using the display enabling unit 2214) of a visual representation of the current weather at the current location.

In some embodiments, enabling display (e.g., using the display enabling unit 2214) of the affordance comprises enabling display (e.g., using the display enabling unit 2214) of a visual representation of the current weather at a user-designated location.

In some embodiments, the visual representation indicates current precipitation.

In some embodiments, the first or the second user interface screen includes an affordance indicating the currently displayed user interface screen and a position of the displayed user interface screen within a sequence of the user interface screens.

The operation described above with reference to FIG. 14 is, optionally, implemented by components depicted in FIGS. 1A-1B or FIG. 22. For example, displaying operation 1402, detecting operation 1404, and determining operation 1412 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 23:
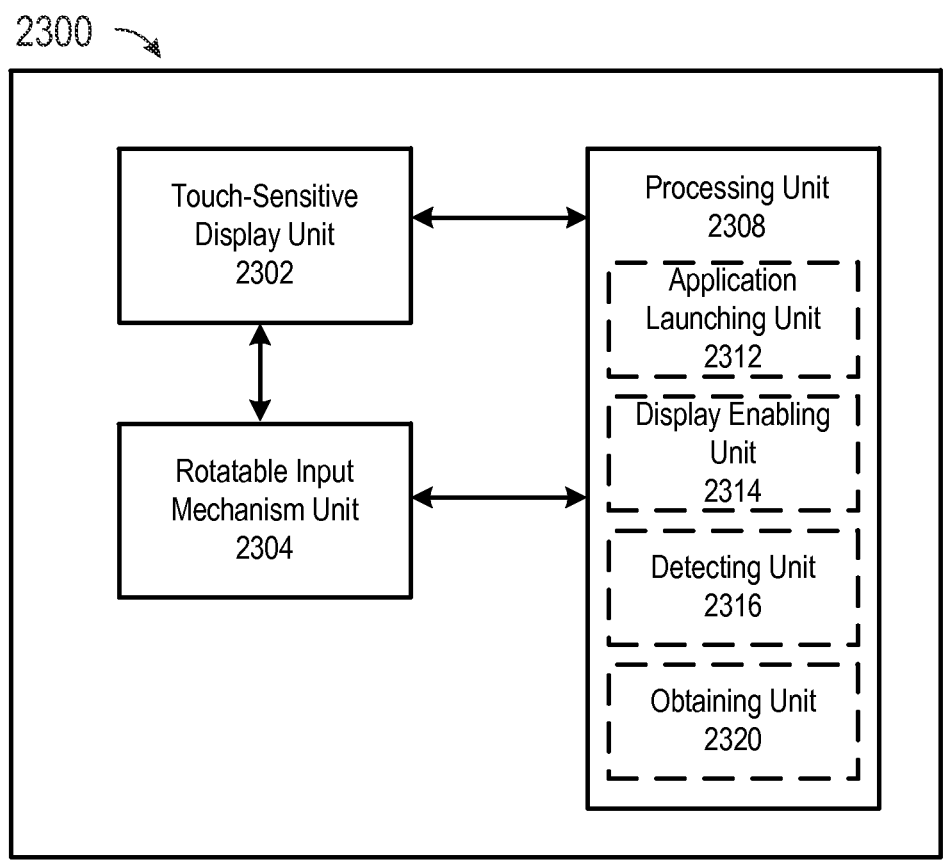
FIG. 23 is a functional block diagram of an electronic device in accordance with some embodiments.

In accordance with some embodiments, FIG. 23 shows an exemplary functional block diagram of an electronic device 2300 configured in accordance with the principles of the various described embodiments. In accordance with some embodiments, the functional blocks of electronic device 2300 are configured to perform the techniques described above. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes a touch-sensitive display unit 2302 configured to receive contacts and configured to display a graphic user interface, a rotatable input mechanism unit 2304 configured to receive user input, and a processing unit 2308 coupled to the touch-sensitive display unit 2302 and the rotatable input mechanism unit 2304. In some embodiments, the processing unit 2308 includes an application launching unit 2312, a display enabling unit 2314, a detecting unit 2316, and an obtaining unit 2320.

The processing unit 2308 is configured to enable display of (e.g., using a display enabling unit 2314) an affordance on the touch-sensitive display unit, the affordance representing a weather application. The processing unit 2308 is further configured to detect (e.g., using a detecting unit 2316) a contact on the displayed affordance. The processing unit 2308 is further configured to, in response to detecting the contact: launch (e.g., using the application launching unit 2312) the weather application, and enable display (e.g., using a display enabling unit 2314) of indications of a location and a current temperature at the location. The processing unit 2308 is further configured to, while displaying the indications of the location and the current temperature, detect (e.g., using a detecting unit 2316) movement of the rotatable input mechanism unit. The processing unit 2308 is further configured to, in response to detecting the movement, enable display (e.g., using the display enabling unit 2314) of a forecasted temperature for the location.

In some embodiments, the forecasted temperature is a first forecasted temperature. In some embodiments, the processing unit 2308 is further configured to, while displaying the first forecasted temperature, detect (e.g., using a detecting unit 2316) movement of the rotatable input mechanism unit. In some embodiments, the processing unit 2308 is further configured to, in response to detecting the movement, enable display (e.g., using the display enabling unit 2314) of a second forecasted temperature for the location.

In some embodiments, the first and the second forecasted temperatures differ by a predetermined time interval.

In some embodiments, the processing unit 2308 is further configured to obtain (e.g., using the obtaining unit 2320) a time of sunset for the location. In some embodiments, the processing unit 2308 is further configured to, while displaying the second forecasted temperature, detect (e.g., using a detecting unit 2316) one or more movements of the rotatable input mechanism unit. In some embodiments, the processing unit 2308 is further configured to, in response to detecting the one or more movements, enable display (e.g., using the display enabling unit 2314) of a forecasted temperature for the location at the time of sunset.

In some embodiments, the processing unit 2308 is further configured to obtain (e.g., using the obtaining unit 2320) a time of sunrise for the current day or the next calendar day. In some embodiments, the processing unit 2308 is further configured to, while displaying a temperature for the location, detect (e.g., using the detecting unit 2316) one or more movements of the rotatable input mechanism. In some embodiments, the processing unit 2308 is further configured to, in response to detecting the one or more movements, enable display (e.g., using the display enabling unit 2314) of a forecasted temperature for the location at the time of sunrise.

In some embodiments, the processing unit 2308 is further configured to enable display (e.g., using the display enabling unit 2314) of a visual representation of forecasted weather at the location, wherein the position of the displayed affordance varies based on the time being forecasted.

In some embodiments, the processing unit 2308 is further configured to, while displaying a temperature for the location, detect (e.g., using the detecting unit 2316) a swipe on the touch-sensitive display. In some embodiments, the processing unit 2308 is further configured to, in response to detecting the swipe, enable display (e.g., using the display enabling unit 2314) of a current temperature for a second location distinct from the first location.

In some embodiments, the swipe is a substantially horizontal swipe.

In some embodiments, the processing unit 2308 is further configured to enable display (e.g., using the display enabling unit 2314) of an affordance indicating the currently displayed location a position of the displayed location within a sequence of locations.

The operation described above with reference to FIG. 15 is, optionally, implemented by components depicted in FIGS. 1A-1B or FIG. 23. For example, displaying operation 1502 and detecting operation 1504 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24:
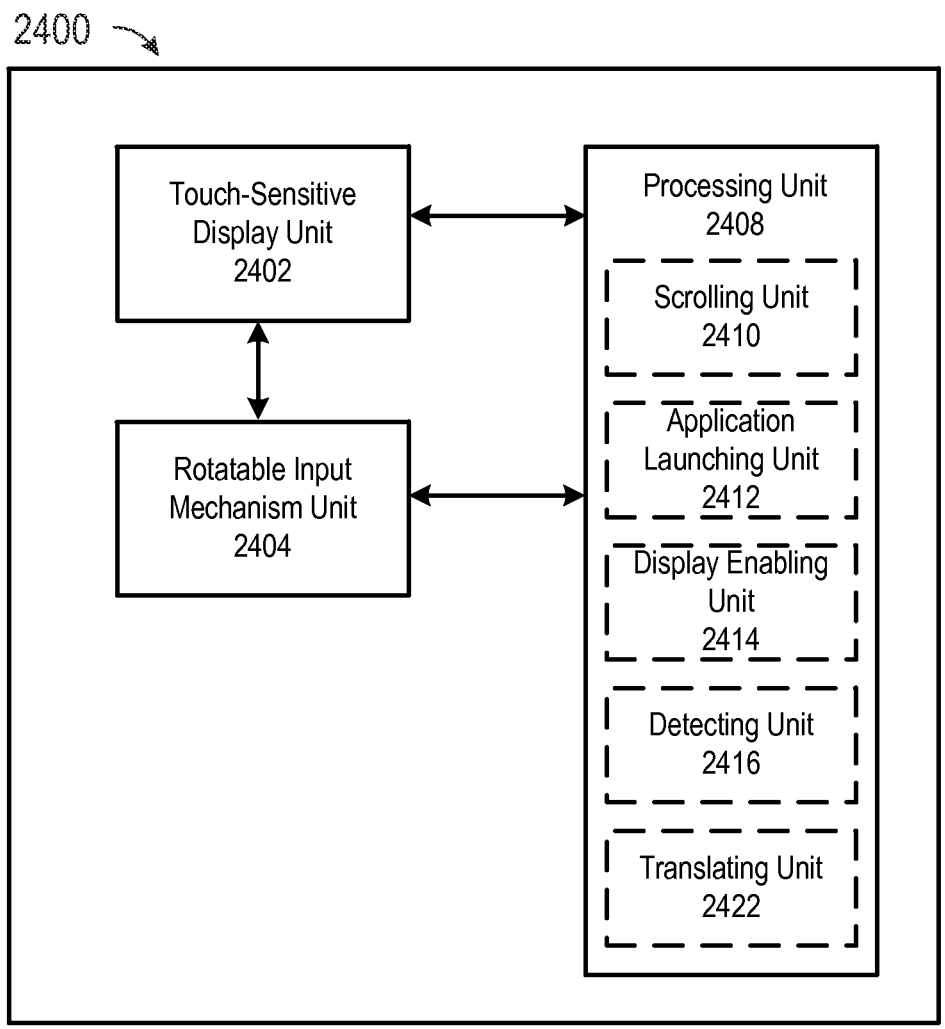
FIG. 24 is a functional block diagram of an electronic device in accordance with some embodiments.

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a touch-sensitive display unit 2402 configured to receive contacts and configured to display a graphic user interface, a rotatable input mechanism unit 2404 configured to receive user input, and a processing unit 2408 coupled to the touch-sensitive display unit 2402 and the rotatable input mechanism unit 2404. In some embodiments, the processing unit 2408 includes a scrolling unit 2410, an application launching unit 2412, a display enabling unit 2414, a detecting unit 2416, and a translating unit 2422.

The processing unit 2408 is configured to enable display of (e.g., using a display enabling unit 2414) an affordance on the touch-sensitive display unit, the affordance representing a weather application. The processing unit 2408 is further configured to detect (e.g., using the detecting unit 2416) a contact on the displayed affordance. The processing unit 2408 is further configured to, in response to detecting the contact, launch (e.g., using the application launching unit 2412) the weather application, and enable display (e.g., using the display enabling unit 2414) of indications of a first location and a current temperature at the first location. The processing unit 2408 is further configured to, while displaying the indications of the first location and current temperature, detect (e.g., using the detecting unit 2416) movement of the rotatable input mechanism unit. The processing unit 2408 is further configured to, in response to detecting the movement of the rotatable input mechanism, enable display (e.g., using the display enabling unit 2414) of indications of a second location distinct from the first location, and a current temperature at the second location.

In some embodiments, the movement of the rotatable input mechanism unit 2404 is movement in one direction. In some embodiments, the processing unit 2408 is further configured to, while displaying the indications of the second location and the current temperature at the second location, detect (e.g., using the detecting unit 2416) movement of the rotatable input mechanism unit in an opposite direction. In some embodiments, the processing unit 2408 is further configured to, in response to detecting the movement in the opposite direction, enable display (e.g., using the display enabling unit 2414) of the affordance representing the weather application.

In some embodiments, the processing unit 2408 is further configured to, while displaying the indications of the first location and the current temperature at the first location, detect (e.g., using the detecting unit 2416) a swipe on the touch-sensitive display unit. In some embodiments, the processing unit 2408 is further configured to, in response to detecting the swipe, scroll (e.g., using the scrolling unit 2410) the displayed weather information.

In some embodiments, scrolling the displayed weather information comprises: translating (e.g., using the translating unit 2422) the displayed information and enabling display (e.g., using the display enabling unit 2414) of a forecasted temperature for the displayed location, the forecasted temperature for a future day.

In some embodiments, the processing unit 2408 is further configured to enable display (e.g., using the display enabling unit 2414) of an affordance indicating the currently displayed location a position of the displayed location within a sequence of locations.

The operation described above with reference to FIG. 16 is, optionally, implemented by components depicted in FIGS. 1A-1B or FIG. 24. For example, displaying operation 1602 and detecting operation 1604 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
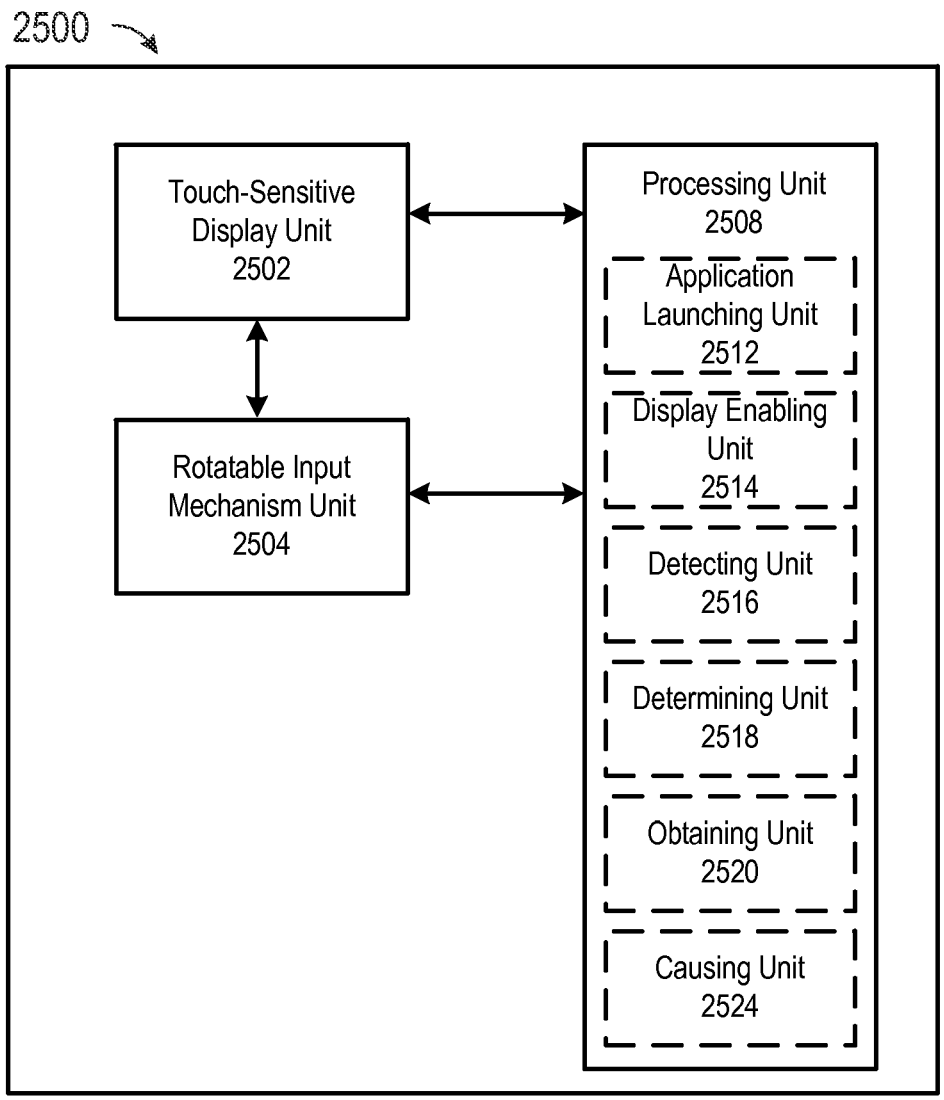
FIG. 25 is a functional block diagram of an electronic device in accordance with some embodiments.

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a touch-sensitive display unit 2502 configured to receive contacts and configure to display a graphic user interface, a rotatable input mechanism unit 2504 configured to receive user input, and a processing unit 2508 coupled to the touch-sensitive display unit 2502 and the rotatable input mechanism unit 2504. In some embodiments, the processing unit 2508 includes an application launching unit 2512, a display enabling unit 2514, a detecting unit 2516, a determining unit 2518, an obtaining unit 2520 and a causing unit 2524.

The processing unit 2508 is configured to obtain a (e.g., using obtaining unit 2520) first data representing an upcoming activity. The processing unit 2508 is further configured to determine (e.g., using a determining unit 2518) that the activity is to begin within a threshold amount of time. The processing unit 2508 is further configured to, in accordance with a determination the upcoming activity is to begin within a threshold amount of time, enable display (e.g., using the display enabling unit 2514) of weather information based on the upcoming activity.

In some embodiments, the processing unit 2508 is further configured to cause (e.g., using the causing unit 2524) a haptic event with displaying the weather information.

In some embodiments, the processing unit 2508 is further configured to obtain (e.g., using the obtaining unit 2520) a location of the upcoming activity. In some embodiments, the processing unit 2508 is further configured to obtain (e.g., using the obtaining unit 2520) current weather information for the location of the upcoming activity. In some embodiments, displaying weather information based on the upcoming activity comprises enable display (e.g., using the display enabling unit 2514) of the current weather information.

In some embodiments, the processing unit 2508 is further configured to obtain (e.g., using the obtaining unit 2520) a start time of the upcoming activity. In some embodiments, the processing unit 2508 is further configured to obtain (e.g., using the obtaining unit 2520) the forecasted weather information for the start time of the upcoming activity. In some embodiments, displaying weather information based on the upcoming activity comprises enable display (e.g., using the display enabling unit 2514) of the forecasted weather information.

In some embodiments, the processing unit 2508 is further configured to obtain (e.g., using the obtaining unit 2520) a current location of the electronic device. In some embodiments, the processing unit 2508 is further configured to obtain (e.g., using the obtaining unit 2520) weather information for the current location. In some embodiments, displaying weather information based on the upcoming activity comprises enable display (e.g., using the display enabling unit 2514) of the weather information for the current location.

In some embodiments, the processing unit 2508 is further configured to obtain (e.g., using the obtaining unit 2520) a current location of the electronic device and a location of the upcoming activity. In some embodiments, the processing unit 2508 is further configured to obtain (e.g., using the obtaining unit 2520) weather information for a geographic location in-between the current location and the location of the upcoming activity. In some embodiments, displaying weather information based on the upcoming activity comprises enable display (e.g., using the display enabling unit 2514) of the weather information for the geographic location in-between.

In some embodiments, the processing unit 2508 is further configured to determine (e.g., using an determining unit 2518) whether an obtained weather information represents inclement weather. In some embodiments, the processing unit 2508 is further configured to, in accordance with a determination that the obtained weather information represents inclement weather, enable display (e.g., using the display enabling unit 2514) of a visual indication of the inclement weather.

In some embodiments, the processing unit 2508 is further configured to, while the visual indication of inclement weather is displayed, detect (e.g., using the detecting unit 2516) a contact on the touch-sensitive display unit. In some embodiments, the processing unit 2508 is further configured to, in response to detecting the contact, remove the enable display (e.g., using the display enabling unit 2514) of the visual indication of inclement weather.

In some embodiments, the processing unit 2508 is further configured to, while the visual indication of inclement weather is displayed, detect (e.g., using the detecting unit 2516) a contact on the touch-sensitive display. In some embodiments, the processing unit 2508 is further configured to, in response to detecting the contact, launch (e.g., using the application launching unit 2512) a weather application.

The operations described above with reference to FIG. 17 are, optionally, implemented by components depicted in FIGS. 1A-1B or FIG. 25. For example, obtaining operation 1702, determining operation 1704, and displaying operation 1706 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
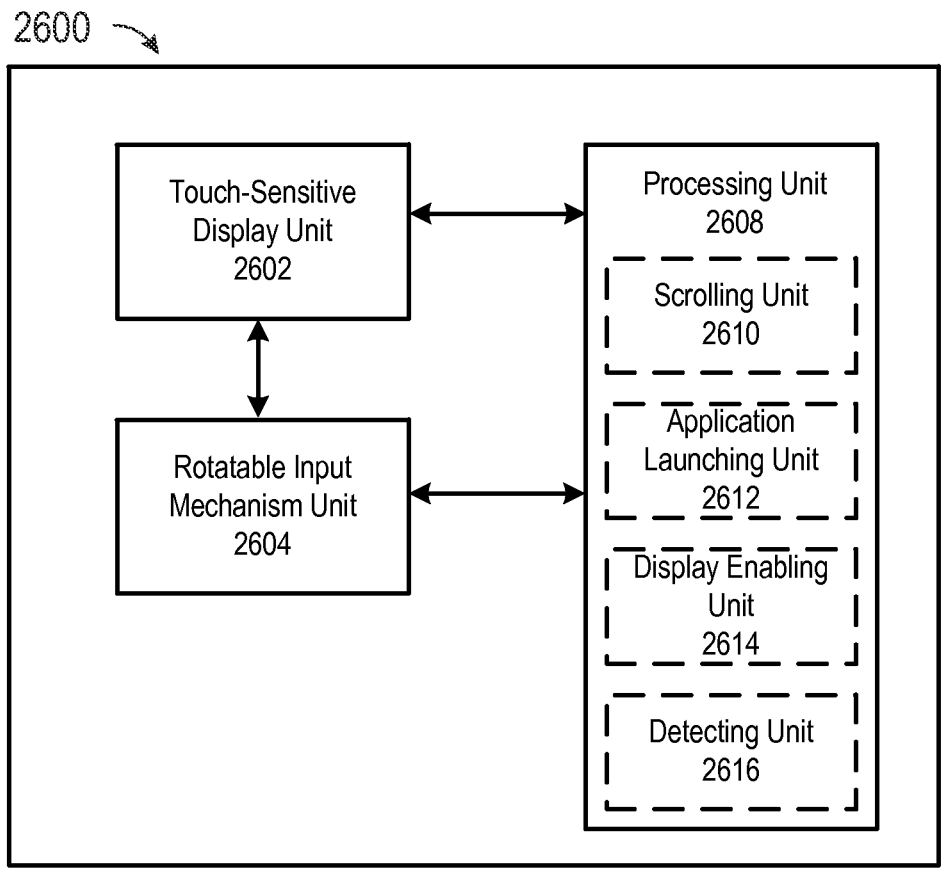
FIG. 26 is a functional block diagram of an electronic device in accordance with some embodiments.

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, an electronic device 2600 includes a touch-sensitive display unit 2602 configured to receive contacts and configured to display a graphic user interface, a rotatable input mechanism unit 2604 configured to receive user input, and a processing unit 2608 coupled to the touch-sensitive display unit 2602 and the rotatable input mechanism unit 2604. In some embodiments, the processing unit 2608 includes a scrolling unit 2610, an application launching unit 2612, a display enabling unit 2614, and a detecting unit 2616.

The processing unit 2608 is configured to enable display (e.g., using the display enabling unit 2614) of an affordance on the touch-sensitive display unit, the affordance representing a weather application. The processing unit 2608 is further configured to detect (e.g., using the detecting unit 2616) a contact on the affordance. The processing unit 2608 is further configured to, in response to detecting the contact on the affordance: launch (e.g., using the application launching unit 2610) the weather application, and enable display (e.g., using the display enabling unit 2614) of a grid comprising a plurality of grid portions representing different geographic locations, including a first grid portion representing a first location and a second grid portion representing a second location, the first grid portion abutting the second grid portion. The processing unit 2608 is further configured to detect (e.g., using the detecting unit 2616) a contact on the first grid portion. The processing unit 2608 is further configured to, in response to detecting the contact on the first grid portion: cease to enable display (e.g., using the display enabling unit 2614) of the grid, and enable display (e.g., using the display enabling unit 2614) of a current temperature at the first location.

In some embodiments, the electronic device comprises a rotatable input mechanism unit 2604 coupled to the processing unit 2608, and wherein the processing unit 2608 is further configured to, while the current temperature at the first location is displayed, detect (e.g., using the detecting unit 2616) movement of the rotatable input mechanism unit. In some embodiments, the processing unit 2608 is further configured to, in response to detecting the movement, enable display (e.g., using the display enabling unit 2614) of the current temperature at the second location.

In some embodiments, the electronic device comprises a rotatable input mechanism unit 2604 coupled to the processing unit 2608, and wherein the processing unit 2608 is further configured to, while the current temperature at the first location is displayed, detect (e.g., using the detecting unit 2616) movement of the rotatable input mechanism unit. In some embodiments, the processing unit 2608 is further configured to, in response to detecting the movement, enable display (e.g., using the display enabling unit 2614) of the grid.

In some embodiments, the electronic device comprises a rotatable input mechanism unit 2604 coupled to the processing unit 2608, and wherein the processing unit 2608 is further configured to, while the current temperature at the first location is displayed, detect (e.g., using the detecting unit 2616) movement of the rotatable input mechanism unit. In some embodiments, the processing unit 2608 is further configured to, in response to detecting the movement, enable display (e.g., using the display enabling unit 2614) of a forecasted temperature for the first location.

In some embodiments, the electronic device comprises a rotatable input mechanism unit 2604 coupled to the processing unit 2608, and wherein the processing unit 2608 is further configured to, while the current temperature at the first location is displayed, detect (e.g., using the detecting unit 2616) movement of the rotatable input mechanism unit. In some embodiments, the processing unit 2608 is further configured to, in response to detecting the movement, scroll (e.g., using the scrolling unit 2610) the display of the current temperature at the first location to reveal additional weather information for the first location.

In some embodiments, the processing unit 2608 is further configured to, while the current temperature at the first location is displayed, detect (e.g., using the detecting unit 2616) a swipe on the touch-sensitive display unit. In some embodiments, the processing unit 2608 is further configured to, in response to detecting the swipe, enable display (e.g., using the display enabling unit 2614) of the current temperature at the second location.

In some embodiments, the processing unit 2608 is further configured to, while the current temperature at the first location is displayed, detect (e.g., using the detecting unit 2616) a swipe on the touch-sensitive display unit. In some embodiments, the processing unit 2608 is further configured to, in response to detecting the swipe, scroll (e.g., using the scrolling unit 2610) the displayed first user interface screen to reveal additional weather information for the first location.

In some embodiments, displaying the current temperature of a location comprises enable display (e.g., using the display enabling unit 2614) of an affordance indicating the location for which a temperature is currently displayed, and a position of the location within a sequence of locations represented in the grid.

The operations described above with reference to FIG. 18 are, optionally, implemented by components depicted in FIGS. 1A-1B or FIG. 26. For example, displaying operation 1802 and detecting operation 1804 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
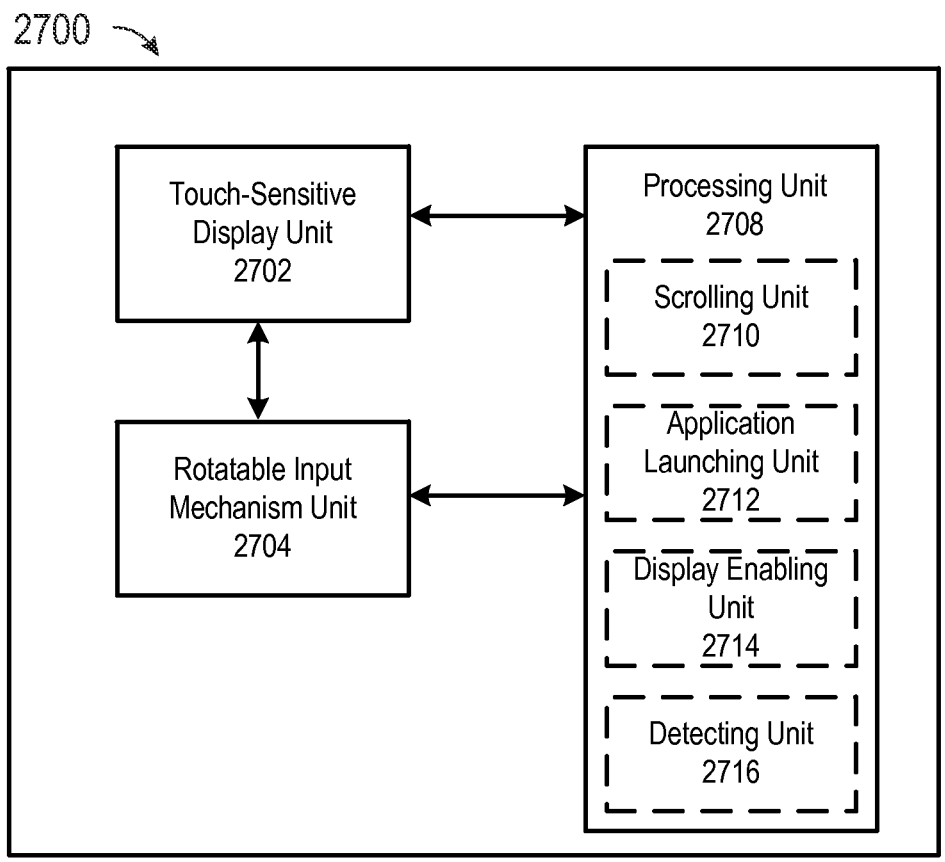
FIG. 27 is a functional block diagram of an electronic device in accordance with some embodiments.

In accordance with some embodiments, FIG. 27 shows an exemplary functional block diagram of an electronic device 2700 configured in accordance with the principles of the various described embodiments. In accordance with some embodiments, the functional blocks of electronic device 2700 are configured to perform the techniques described above. The functional blocks of the device 2700 are, optionally, implemented by hardware, software, or a combination of hardware and software to carry out the principles of the various described examples. It is understood by persons of skill in the art that the functional blocks described in FIG. 27 are, optionally, combined or separated into sub-blocks to implement the principles of the various described examples. Therefore, the description herein optionally supports any possible combination or separation or further definition of the functional blocks described herein.

As shown in FIG. 27, an electronic device 2700 includes a touch-sensitive display unit 2702 configured to receive contacts and to display a graphic user interface, a rotatable input mechanism unit 2704 configured to receive user input, and a processing unit 2708 coupled to the touch-sensitive display unit 2702 and the rotatable input mechanism unit 2704. In some embodiments, the processing unit 2708 includes a scrolling unit 2710, an application launching unit 2712, a display enabling unit 2714, and a detecting unit 2716.

The processing unit 2708 is configured to enable display (e.g., using the display enabling unit 2714) of an affordance on the touch-sensitive display unit, the affordance representing a weather application. The processing unit 2708 is further configured to detect (e.g., using the detecting unit 2716) a contact on the affordance. The processing unit 2708 is further configured to, in response to detecting the contact on the affordance: launch (e.g., using the applications launching unit 2712) the weather application, and enable display (e.g., using the display enabling unit 2714) of a plurality of regions representing different geographic locations, the regions arranged along a vertical column, including a first region representing a first location and a second region representing a second location, the first region abutting the second region. The processing unit 2708 is further configured to detect (e.g., using the detecting unit 2716) a contact on the first region. The processing unit 2708 is further configured to, in response to detecting the contact on the first region, enable display (e.g., using the display enabling unit 2714) of a current temperature at the first location. The processing unit 2708 is further configured to detect (e.g., using the detecting unit 2716) movement of the rotatable input mechanism unit. The processing unit 2708 is further configured to, in response to detecting the movement, enable display (e.g., using the display enabling unit 2714) of information selected from the group consisting of a temperature at the second location, the plurality of regions, a forecasted temperature for the first location, and additional weather information for the first location.

In some embodiments, enabling display of the information comprises enabling display (e.g., using the display enabling unit 2714) of a current temperature at the second location.

In some embodiments, enabling display of the information comprises enabling display (e.g., using the display enabling unit 2714) of the plurality of regions.

In some embodiments, enabling display of the information comprises enabling display (e.g., using the display enabling unit 2714) of a forecasted temperature for the first location.

In some embodiments, enabling display of the information comprises scrolling (e.g., using the scrolling unit 2710) the displayed first user interface screen to reveal additional weather information for the first location.

In some embodiments, the processing unit 2708 is further configured to, while displaying the current temperature at the first location, detect (e.g., using the detecting unit 2716) a swipe on the touch-sensitive display. In some embodiments, the processing unit 2708 is further configured to, in response to detecting the swipe, enable display (e.g., using the display enabling unit 2714) of a current temperature at the second location.

In some embodiments, the processing unit 2708 is further configured to, while displaying the current temperature at the first location, detect (e.g., using the detecting unit 2716) a swipe on the touch-sensitive display. In some embodiments, the processing unit 2708 is further configured to, in response to detecting the swipe, scroll (e.g., using the scrolling unit 2710) the displayed first user interface screen to reveal additional weather information for the first location.

In some embodiments, enabling display of a temperature at a location comprises enabling display (e.g., using the display enabling unit 2714) of an affordance indicating the currently displayed location and a position of the displayed location within a sequence of locations.

The operations described above with reference to FIG. 19 are, optionally, implemented by components depicted in FIGS. 1A-1B or FIG. 27. For example, displaying operation 1902 and detecting operation 1904 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28:
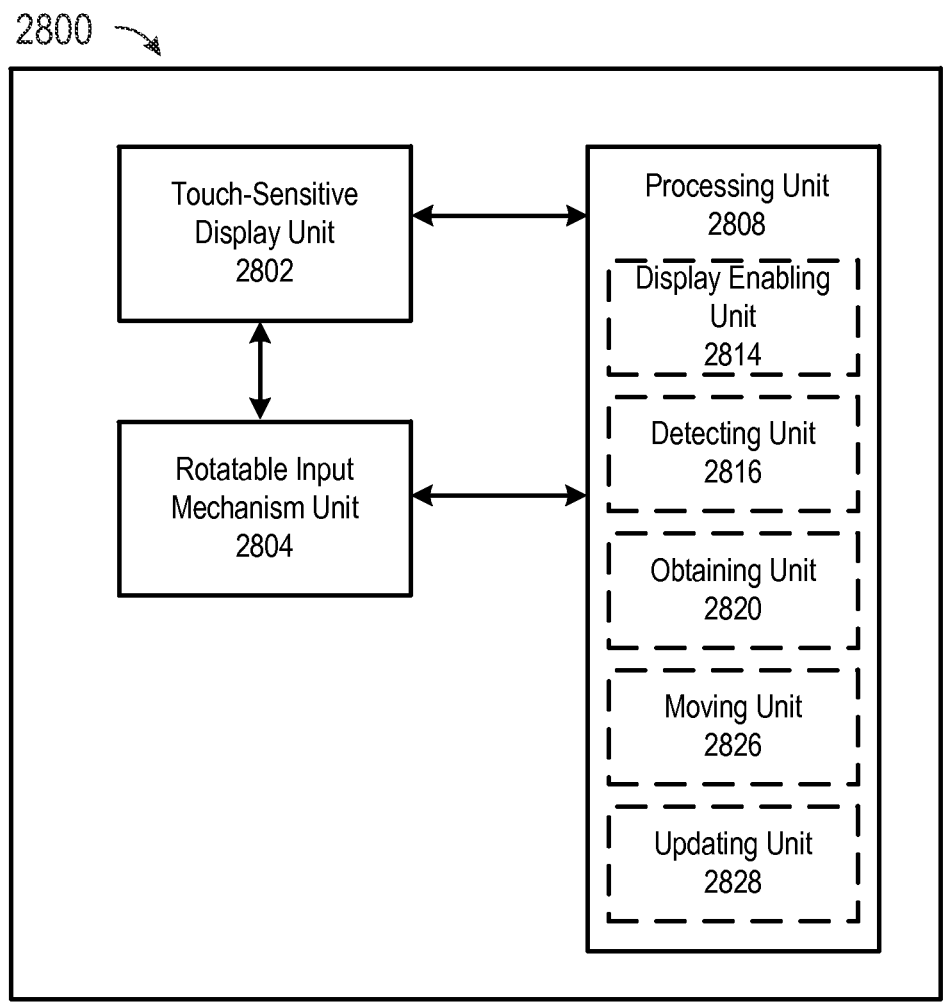
FIG. 28 is a functional block diagram of an electronic device in accordance with some embodiments.

In accordance with some embodiments, FIG. 28 shows an exemplary functional block diagram of an electronic device 2800 configured in accordance with the principles of the various described embodiments. In accordance with some embodiments, the functional blocks of electronic device 2800 are configured to perform the techniques described above. The functional blocks of the device 2800 are, optionally, implemented by hardware, software, or a combination of hardware and software to carry out the principles of the various described examples. It is understood by persons of skill in the art that the functional blocks described in FIG. 28 are, optionally, combined or separated into sub-blocks to implement the principles of the various described examples. Therefore, the description herein optionally supports any possible combination or separation or further definition of the functional blocks described herein.

As shown in FIG. 28, an electronic device 2800 includes a touch-sensitive display unit 2802 configured to receive contacts and configured to display a graphic user interface, a rotatable input mechanism unit 2804 configured to receive user input, and a processing unit 2808 coupled to the touch-sensitive display unit 2802 and the rotatable input mechanism unit 2804. In some embodiments, the processing unit 2808 includes a display enabling unit 2814, a detecting unit 2816, an obtaining unit 2820, a moving unit 2826, and an updating unit 2228.

The processing unit 2808 is configured to enable display (e.g., using the display enabling unit 2814) of an image representing a weather condition for a first time of day. The processing unit 2808 is further configured to enable display (e.g., using the display enabling unit 2814) of an affordance at a first position, the first position corresponding to the first time. The processing unit 2808 is further configured to detect (e.g., using the detecting unit 2816) movement of the rotatable input mechanism unit. The processing unit 2808 is further configured to, in response to detecting the movement: move (e.g., using the moving unit 2826) the affordance from the first position to a second position corresponding to a second time of the day, and update (e.g., using the update unit 2828) the image to represent a weather condition for the second time of the day.

In some embodiments, moving the affordance comprises: enabling display (e.g., using the display enabling unit 2814) of an animation translating the affordance from the first position to the second position, the translating along the circumference of a circle encircling the image representing the weather condition.

In some embodiments, the circle corresponds to a circular clock face, and a position of the affordance along the circumference of the circle corresponds to a time as defined by the circular clock face.

In some embodiments, the processing unit 2808 is further configured to obtain (e.g., using the obtaining unit 2820) a time of sunset for the day. In some embodiments, the processing unit 2808 is further configured to detect (e.g., using the detecting unit 2816) one or more movements of the rotatable input mechanism. In some embodiments, the processing unit 2808 is further configured to, in response to detecting the one or more movements: move (e.g., using the moving unit 2826) the affordance to a third position corresponding to the time of sunset, and update (e.g., using the update unit 2828) the image to represent sunset.

In some embodiments, the clock face includes a portion representing nighttime and a portion representing daytime, wherein enabling display of the affordance comprises: enabling display (e.g., using the display enabling unit 2814) of a visual representation of the sun when the affordance is positioned along the daytime portion, and enabling display (e.g., using the display enabling unit 2814) of a visual representation of the moon when the affordance is positioned along the nighttime portion.

In some embodiments, the image is selected from the group consisting of a sun, a cloud, and a moon.

In some embodiments, the image is at the origin of the circle, and a position on the circle at $\pi/2$ radians represents noon.

The operations described above with reference to FIG. 20 are, optionally, implemented by components depicted in FIGS. 1A-1B or FIG. 28. For example, displaying operation 2002, detecting operation 2006, and updating operation 2010 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 29:
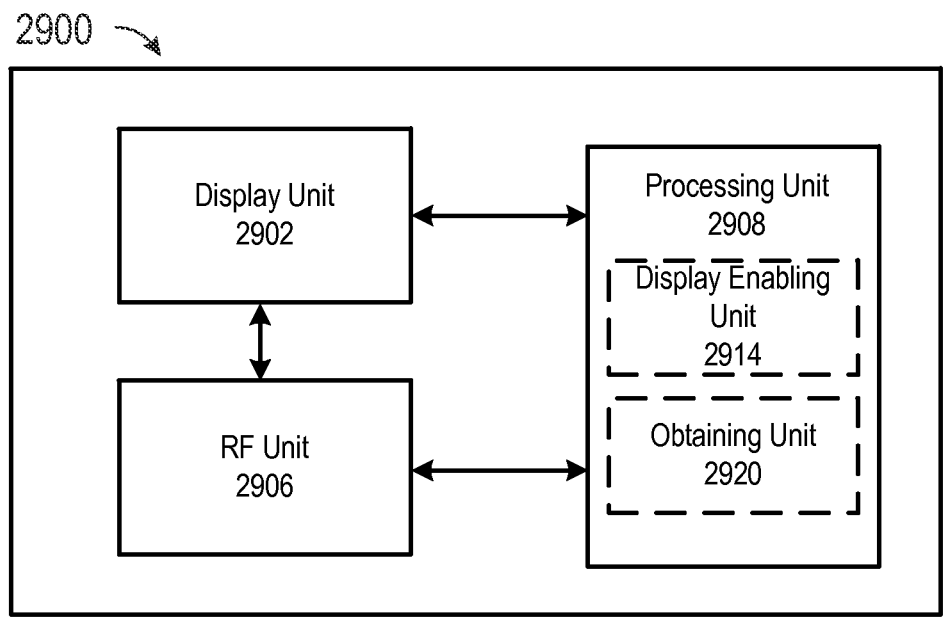
FIG. 29 is a functional block diagram of an electronic device in accordance with some embodiments.

In accordance with some embodiments, FIG. 29 shows an exemplary functional block diagram of an electronic device 2900 configured in accordance with the principles of the various described embodiments. In accordance with some embodiments, the functional blocks of electronic device 2900 are configured to perform the techniques described above. The functional blocks of the device 2900 are, optionally, implemented by hardware, software, or a combination of hardware and software to carry out the principles of the various described examples. It is understood by persons of skill in the art that the functional blocks described in FIG. 29 are, optionally, combined or separated into sub-blocks to implement the principles of the various described examples. Therefore, the description herein optionally supports any possible combination or separation or further definition of the functional blocks described herein.

As shown in FIG. 29, an electronic device 2900 includes a display unit 2902, a RF unit 2906, and a processing unit 2908. In some embodiments, the processing unit 2908 includes a display enabling unit 2914 and an obtaining unit 2920.

The processing unit 2908 is configured to obtain (e.g., using the obtaining unit 2920), via wireless communication (e.g., using RF unit 2906), weather information for a location comprising a current weather condition and a forecasted weather condition. The processing unit 2908 is further configured to enable display (e.g., using the display enabling unit 2914) on the display unit (e.g., display unit 2902) of a clock having a clock face, wherein the clock face comprises a first hour marker and a second hour marker, wherein the first hour marker comprises a first image indicative of the current weather condition, and wherein the second hour marker comprises a second image indicative of the forecasted weather condition.

The operations described below with reference to FIG. 30 are, optionally, implemented by components depicted in FIGS. 1A-1B or FIG. 29. For example, obtaining operation 3002 and displaying operation 3004 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 30 describes a flow diagram illustrating process 3000 for providing weather information. In some embodiments, process 3000 may be performed at an electronic device with a touch-sensitive display and a rotatable input mechanism, such as device 500 (FIG. 5) or device 1300 (FIG. 13). At block 3002, weather information for a location, comprising a current weather condition and a forecasted weather condition, is obtained via wireless communication. At block 3004, a clock is displayed having a clock face comprising a first hour marker and a second hour marker. The first hour marker comprises a first image indicative of the current weather condition and the second hour marker comprises a second image indicative of the forecasted weather condition. An exemplary embodiment of the step diagrammed in block 3004 is illustrated in FIG. 13B on the displayed screen 1350 of device 1300. Device 1300 is displaying on screen 1350 a clock, showing a current time of 3:29, with hour markers represented by affordances 1352 and 1354. In this example, affordance 1354 represents a sun, indicating that the current weather condition at 3:29 (e.g., the first hour marker) is sunny. Affordance 1352 (e.g., the second hour marker) represents a moon, indicating that the forecasted weather condition (e.g., forecasted for midnight) is a clear night.

It should be understood that the particular order in which the operations in FIGS. 14-20 and 30 have been described is exemplary and not intended to indicate that the described order is the only order in which the operations could be performed. One of ordinary skill in the art would recognize various ways to reorder the operations described herein. For brevity, these details are not repeated here. Additionally, it should be noted that aspects of processes 1400-2000 and 3000 (FIGS. 14-20 and 30) may be incorporated with one another. For brevity, the permutations of user input techniques are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:
1. An electronic device, comprising:
a touch-sensitive display;
a rotatable input mechanism;
one or more processors;
a memory; and
one or more programs, wherein the one or more programs are stored in the memory and configured to be executed by the one or more processors, the one or more programs including instructions for:
displaying an affordance on the touch-sensitive display, the affordance representing a weather application;
detecting a contact on the displayed affordance;
in response to detecting the contact:
launching the weather application; and
displaying at least a portion of a weather user interface including an indication of a first type of weather information for a plurality of units of time at a first location;
while displaying the weather user interface, detecting a user input; and
in response to detecting the user input:
in accordance with a determination that the user input is a rotational movement of the rotatable input mechanism, navigating through the weather user interface based on the rotational movement of the rotatable input mechanism to display additional weather information for the first location; and in accordance with a determination that the user input is a tap, transitioning from displaying the first type of weather information at the first location to displaying a second type of weather information for the plurality of the units of time at the first location.

2. The electronic device of claim 1, wherein navigating through the weather user interface based on the rotational movement of the rotatable input mechanism includes scrolling the weather user interface by an amount that is determined based on an extent of the rotational movement of the rotatable input mechanism.

3. The electronic device of claim 1, wherein navigating through the weather user interface based on the rotational movement of the rotatable input mechanism includes replacing a first user interface screen of the weather user interface with a second user interface screen of the weather user interface including the additional weather information for the first location.

4. The electronic device of claim 1, wherein the first type of weather information corresponds to temperature at the first location, and wherein navigating the weather user interface includes:
translating the weather user interface; and
displaying a forecasted temperature for the first location for a future day.

5. The electronic device of claim 1, wherein the electronic device includes a location sensor, the one or more programs including further instructions for:
obtaining a current location of the electronic device from the location sensor, wherein:
the first location is the current location; and
the first type of weather information includes a current temperature at the current location.

6. The electronic device of claim 1, wherein displaying the affordance comprises displaying a visual representation of a current weather at the first location.

7. The electronic device of claim 1, the one or more programs including further instructions for:
while displaying the weather user interface, displaying a wallpaper, wherein the wallpaper visually indicates a weather condition at the first location.

8. The electronic device of claim 1, wherein the weather user interface includes an affordance indicating:
a currently displayed user interface screen; and
a position of the currently displayed user interface screen within a sequence of user interface screens.

9. A non-transitory computer readable storage medium storing one or more programs configured to be executed by one or more processors of an electronic device with a touch-sensitive display and a rotatable input mechanism, the one or more programs including instructions for:
displaying an affordance on the touch-sensitive display, the affordance representing a weather application;
detecting a contact on the displayed affordance;
in response to detecting the contact:
launching the weather application; and
displaying at least a portion of a weather user interface including an indication of a first type of weather information for a plurality of units of time at a first location;

while displaying the weather user interface, detecting a user input; and
in response to detecting the user input:
in accordance with a determination that the user input is a rotational movement of the rotatable input mechanism, navigating through the weather user interface based on the rotational movement of the rotatable input mechanism to display additional weather information for the first location; and
in accordance with a determination that the user input is a tap, transitioning from displaying the first type of weather information at the first location to displaying a second type of weather information for the plurality of the units of time at the first location.

10. The non-transitory computer readable storage medium of claim 9, wherein navigating through the weather user interface based on the rotational movement of the rotatable input mechanism includes scrolling the weather user interface by an amount that is determined based on an extent of the rotational movement of the rotatable input mechanism.

11. The non-transitory computer readable storage medium of claim 9, wherein navigating through the weather user interface based on the rotational movement of the rotatable input mechanism includes replacing a first user interface screen of the weather user interface with a second user interface screen of the weather user interface including the additional weather information for the first location.

12. The non-transitory computer readable storage medium of claim 9, wherein the first type of weather information corresponds to temperature at the first location, and wherein navigating the weather user interface includes:
translating the weather user interface; and
displaying a forecasted temperature for the first location for a future day.

13. The non-transitory computer readable storage medium of claim 9, wherein the electronic device includes a location sensor, the one or more programs including further instructions for:
obtaining a current location of the electronic device from the location sensor, wherein:
the first location is the current location; and
the first type of weather information includes a current temperature at the current location.

14. The non-transitory computer readable storage medium of claim 9, wherein displaying the affordance comprises displaying a visual representation of a current weather at the first location.

15. The non-transitory computer readable storage medium of claim 9, the one or more programs including further instructions for:
while displaying the weather user interface, displaying a wallpaper, wherein the wallpaper visually indicates a weather condition at the first location.

16. The non-transitory computer readable storage medium of claim 9, wherein the weather user interface includes an affordance indicating:
a currently displayed user interface screen; and
a position of the currently displayed user interface screen within a sequence of user interface screens.

17. A method, comprising:
at an electronic device with a touch-sensitive display and a rotatable input mechanism:
displaying an affordance on the touch-sensitive display, the affordance representing a weather application;

detecting a contact on the displayed affordance;
in response to detecting the contact:
  launching the weather application; and
  displaying at least a portion of a weather user interface including an indication of a first type of weather information for a plurality of units of time at a first location;
while displaying the weather user interface, detecting a user input; and
in response to detecting the user input:
  in accordance with a determination that the user input is a rotational movement of the rotatable input mechanism, navigating through the weather user interface based on the rotational movement of the rotatable input mechanism to display additional weather information for the first location; and
  in accordance with a determination that the user input is a tap, transitioning from displaying the first type of weather information at the first location to displaying a second type of weather information for the plurality of the units of time at the first location.

18. The method of claim 17, wherein navigating through the weather user interface based on the rotational movement of the rotatable input mechanism includes scrolling the weather user interface by an amount that is determined based on an extent of the rotational movement of the rotatable input mechanism.

19. The method of claim 17, wherein navigating through the weather user interface based on the rotational movement of the rotatable input mechanism includes replacing a first user interface screen of the weather user interface with a second user interface screen of the weather user interface including the additional weather information for the first location.

20. The method of claim 17, wherein the first type of weather information corresponds to temperature at the first location, and wherein navigating the weather user interface includes:
  translating the weather user interface; and
  displaying a forecasted temperature for the first location for a future day.

21. The method of claim 17, wherein the electronic device includes a location sensor, the method further comprising:
  obtaining a current location of the electronic device from the location sensor, wherein:
    the first location is the current location; and
    the first type of weather information includes a current temperature at the current location.

22. The method of claim 17, wherein displaying the affordance comprises displaying a visual representation of a current weather at the first location.

23. The method of claim 17, further comprising:
  while displaying the weather user interface, displaying a wallpaper, wherein the wallpaper visually indicates a weather condition at the first location.

24. The method of claim 17, wherein the weather user interface includes an affordance indicating:
  a currently displayed user interface screen; and
  a position of the currently displayed user interface screen within a sequence of user interface screens.

* * * * *